(12) United States Patent
Collberg et al.

(10) Patent No.: US 6,668,325 B1
(45) Date of Patent: Dec. 23, 2003

(54) OBFUSCATION TECHNIQUES FOR ENHANCING SOFTWARE SECURITY

(75) Inventors: Christian Sven Collberg, Auckland (NZ); Clark David Thomborson, Auckland (NZ); Douglas Wai Kok Low, Auckland (NZ)

(73) Assignee: InterTrust Technologies, Santa Clara, CA (US)

( * ) Notice: Subject to any disclaimer, the term of this patent is extended or adjusted under 35 U.S.C. 154(b) by 0 days.

(21) Appl. No.: 09/095,346

(22) Filed: Jun. 9, 1998

(30) Foreign Application Priority Data

Jun. 9, 1997 (NZ) ................................................ 328057

(51) Int. Cl.$^7$ ............................................. G06F 12/14
(52) U.S. Cl. ...................................... 713/194; 713/200
(58) Field of Search ................................. 713/194, 167, 713/164, 200, 189, 193; 717/9, 1, 137, 147

(56) References Cited

U.S. PATENT DOCUMENTS

| | | |
|---|---|---|
| 4,644,493 A | 2/1987 | Chandra et al. |
| 4,827,508 A | 5/1989 | Shear |

(List continued on next page.)

FOREIGN PATENT DOCUMENTS

| | | | |
|---|---|---|---|
| AU | A-36815/97 | 2/1998 | |
| AU | A-36816/97 | 2/1998 | |
| AU | A-36840/97 | 2/1998 | |
| WO | WO 96/00859 | 1/1996 | |
| WO | WO 96/27155 | 9/1996 | |
| WO | WO 97 04394 | 2/1997 | ........... G06F/12/14 |
| WO | WO 97 33216 | 9/1997 | ............. G06F/1/00 |
| WO | WO 97/43761 | 11/1997 | |
| WO | WO 97/48203 | 12/1997 | |
| WO | WO 98/09209 | 3/1998 | |

OTHER PUBLICATIONS

Cohen, F. B.: "Operating System Protection Through Program Evolution," Computers & Security International Journal Devoted to the Study of Technical and Financial Aspects of Computer Security, vol. 12, No. 6, Oct. 1, 1993, pp. 565–584, XP000415701.

Aho, Alfred, et al., *Compilers, Principles, Techniques, and Tools*, Addison–Wesley, 1986.

Bacon, David, et al., "Compiler transformations for high–performance computing", *ACM Computing Surveys*, vol. 26, No. 4, Dec. 1994, pp. 345–420. http://www.acm.org/pubs/toc/Abstracts/0360–0300/197406.html.

Chidamber, Shyam, et al., "A metrics suite for object oriented design", *IEEE Transactions on Software Engineering*, vol. 20, No. 6, Jun. 1994, pp. 476–493.

(List continued on next page.)

*Primary Examiner*—Matthew Smithers
(74) *Attorney, Agent, or Firm*—Finnegan, Henderson, Farabow, Garrett & Dunner L.L.P.

(57) ABSTRACT

The present invention provides obfuscation techniques for enhancing software security. In one embodiment, a method for obfuscation techniques for enhancing software security includes selecting a subset of code (e.g., compiled source code of an application) to obfuscate, and obfuscating the selected subset of the code. The obfuscating includes applying an obfuscating transformation to the selected subset of the code. The transformed code can be weakly equivalent to the untransformed code. The applied transformation can be selected based on a desired level of security (e.g., resistance to reverse engineering). The applied transformation can include a control transformation that can be creating using opaque constructs, which can be constructed using aliasing and concurrency techniques. Accordingly, the code can be obfuscated for enhanced software security based on a desired level of obfuscation (e.g., based on a desired potency, resilience, and cost).

171 Claims, 27 Drawing Sheets

U.S. PATENT DOCUMENTS

| | | | |
|---|---|---|---|
| 4,866,769 A | | 9/1989 | Karp |
| 4,903,296 A | | 2/1990 | Chandra et al. |
| 4,965,724 A | | 10/1990 | Utsumi et al. |
| 5,224,160 A | | 6/1993 | Paulini et al. |
| 5,287,407 A | | 2/1994 | Holmes |
| 5,287,408 A | | 2/1994 | Samson |
| 5,287,510 A | | 2/1994 | Hall et al. |
| 5,367,685 A | | 11/1994 | Gosling |
| 5,396,631 A | | 3/1995 | Hayashi et al. |
| 5,481,708 A | | 1/1996 | Kukol |
| 5,499,333 A | | 3/1996 | Doudnikoff et al. |
| 5,535,391 A | | 7/1996 | Hejlsberg et al. |
| 5,559,884 A | | 9/1996 | Davidson et al. |
| 5,579,520 A | | 11/1996 | Bennett |
| 5,592,549 A | | 1/1997 | Nagel et al. |
| 5,596,732 A | | 1/1997 | Hosoi |
| 5,664,191 A | | 9/1997 | Davidson et al. |
| 5,724,425 A | | 3/1998 | Chang et al. |
| 5,745,569 A | | 4/1998 | Moskowitz et al. |
| 5,748,741 A | | 5/1998 | Johnson et al. |
| 5,805,895 A | | 9/1998 | Breternitz, Jr. et al. |
| 5,835,776 A | | 11/1998 | Tirumalai et al. |
| 5,892,899 A | * | 4/1999 | Aucsmith et al. ........... 713/200 |
| 5,950,505 A | | 9/1999 | Locher |
| 5,966,537 A | * | 10/1999 | Ravichandran ................ 717/9 |
| 6,006,328 A | | 12/1999 | Drake |
| 6,009,170 A | | 12/1999 | Sako et al. |
| 6,047,374 A | | 4/2000 | Barton |
| 6,102,966 A | | 8/2000 | Tyma |

OTHER PUBLICATIONS

Cifuentes, Cristina, et al., "Decompilation of binary programs", *Software—Practice & Experience,* vol. 25, No. 7, Jul. 1995, pp. 811–829.

Dean, Jeffrey, "Whole–Program Optimization of Object–Oriented Languages", PhD thesis, University of Washington, 1996.

Gosler, James, "Software Protection: Myth or Reality?", *CRYPTO'85 —Advances in Cryptology,* Aug. 1985, pp. 140–157.

Gosling, James, et al., *The Java Language Specification,* Addison–Wesley, 1996.

Halstead, M.H., *Elements of Software Science,* Elsevier North–Holland, 1977.

Harrison, Warren, et al., A complexity measure based on nesting level, *SIGPLAN Notices,* vol. 16, No. 3, 1981, pp. 63–74.

Henry, Sallie, et al., "Software structure metrics based on information flow", *IEEE Transactions on Software Engineering,* vol. 7, No. 5, Sep. 1981, pp. 510–518.

Herzberg, Amir, et al., "Public protection of software", *ACM Transactions on Computer Systems,* vol. 5, No. 4, Nov. 1987, pp. 371–393.

Horwitz, Susan, "Precise flow–insensitive May–Alias analysis is NP–hard", *TOPLAS,* vol. 19, No. 1, Jan. 1997, pp. 1–6.

Horwitz, Susan, "Interprocedural slicing using dependence graphs", *TOPLAS,* vol. 12, No. 1, Jan. 1990, pp. 26–60.

Jones, Neil, "An introduction to partial evaluation", *ACM Computing Surveys,* vol. 28, No. 3, Sep. 1996, pp. 480–503.

Knoop, Jens, et al., "Parallelism for free: Efficient and optimal bitvector analyses for parallel programs", *TOPLAS,* vol. 18, No. 3, May 1996, pp. 268–299.

LaDue, Mark, "HoseMocha", http://www.xynyx.demon.nl/java/HoseMocha.java, Jan. 1997.

Lyle, James, et al., "Unravel: A CASE tool to assist evaluation of high integrity software", vol. 1: Requirements and design & vol. 2: User Manual. Technical Report NISTIR 5691, U.S. Department of Commerce, Aug. 1995.

Macrakis, Stavros, "Protecting source code with ANDF", ftp://riftp.osf.org/pub/andf/andf_coll_papers/ProtectingSourceCode%.ps., Jan. 1993.

Apple's Quick Time lawsuit, http://www.macworld.com/pages/june.95/News.848.html and may.95/News.705.html, May–Jun. 1995.

McCabe, Thomas, "A complexity measure", *IEEE Transactions on Software Engineering,* vol. 2, No. 4, Dec. 1976, pp. 308–320.

Munson, John, et al., "Measurement of data structure complexity", *Journal of Systems Software,* vol. 20, 1993, pp. 217–225.

Opdyke, William, et al., "Creating abstract superclasses by refactoring", In Stan C. Kwasny and John F. Buck, editors, *Proceedings of the 21st Annual Conference on Computer Science,* New York, NY, Feb. 1993, pp. 66–73; ftp://st.cs.uiuc.edu/pub/papers/refactoring/refactoring–superclass%es.ps.

Oviedo, Enrique, "Control flow, data flow, and program complexity", *Proceedings of IEEE COMPSAC,* Nov. 1980, pp. 146–152.

Ramalingam, "The Undecidability of Aliasing", *TOPLAS,* vol. 16, No. 5, Sep. 1994, pp. 1467–1471.

Rugaber, Spencer, et al., "The interleaving problem in program understanding", In 2nd Working Conference on Reverse Engineering, Toronto, Ontario, Canada, Jul. 15, 1995, pp. 166–175, ftp.cc.gatech.edu//pub/groups/reverse/repository/interleaving.ps.

Samuelson, Pamela, "Reverse–Engineering Someone Else's Software: Is It Legal?", *IEEE Software,* Jan. 1990, pp. 90–96.

Taivalsaari, Antero, "On the notion of inheritance", *ACM Computing Surveys,* vol. 28, No. 3, Sep. 1996, pp. 438–479.

Tip, Frank, "A survey of program slicing techniques", *Journal of Programming Languages,* vol. 3, No. 3, Sep. 1995, pp. 121–189.

Hans Peter Van Vliet, Crema—The Java obfuscator, http://web.inter.nl.net/users/H.P.van.Vliet/crema.html, Jan. 1996.

Hans Peter Van Vliet, Mocha—The Java decompiler, http://web.inter.nl.net/users/H.P.van.Vliet/mocha.html, Jan. 1996.

Wilhelm, Uwe G., Cryptographically protected objects, http://lsewww.epfl.ch/wilhelm/CryPO.html, 1997, pp. 1–4.

Wills, Linda Mary, "Automated program recognition: A feasibility demonstration", *Artificial Intelligence,* vol. 45, No. 1–2, Sep. 1990, pp. 113–172.

Wolfe, Michael, *High Perfrormance Compilers for Parallel Computing,* Addison–Wesley, 1996.

Tyma, Paul, Turn your Java into Rocket Fuel, http://www.preEmptive.com.

"dot*fuscator*: Producing Smaller, More Secure .NET Applications", Version 1.1, PreEmptive Solutions, 2002, 14 pages.

Drape et al., "Transforming the .NET Intermediate Language Using Path Programming Logic", Oct. 6–8, 2002, ACM; pp. 1–12.*

PreEmptive Solutions, DashO Product Family Technical Overview, http://www.preemptive.com, pp. 1–4.*

PreEmptive Solutions, DashO Obfuscation, http://www.preemptive.com, pp. 1–4.*

Internet Archive, PreEmptive Solution outdated websites from Dec. 19, 1996 to Oct. 11, 1997, DashO Java Code Optimizer, hoot://web.archive.org/web/*/http://www.pre-Emptive.com/.*

Neil Aggarawal, "ObfuscatePro," JAMM Consulting, Inc., 1999, http://www.jammco. . . /com.jammconsulting.servlet?pageID–obfuscatepropage, 2 pages.

David Aucsmith, "Tamper Resistant Software: An Implementation, In Proc. International Workshop on Information Hiding," Lecture Notes in Computer Science, vol. 1174, 1996, pp. 317–333.

Joseph A. Bank, "Java Security," Jan. 25, 2002 http://swissnet.ai.mit.euc/~jbank/javapaper.html, 11 pages.

Shimshon Berkovits, et al., "Authentication for Mobile Agents," Mobile Agents and Security, Giovanni Vigna, Ed., Springer–Verlag, 1998, pp. 114–136.

Dan Boneh, et al., "Collusion Secure Fingerprinting for Digital Data," Proc. of Crypto '95, Springer LNCS 963, 1995, pp. 1–15.

David R. Chase, et al., "Analysis of Pointers and Structures," Pro. of the ACM, Sigplan Conference on Programming Language Design and Implementation, 1990, pp. 296–310.

Brad Chen, "Instrumentation and Optimization of Win32/Intel Executables Using Etch," Esenix Windows NT Workshop, 1997, 7 pages.

David M. Chess, "Security Isues in Mobile Code Systems," Mobile Agents and Security, Giovanni Vigna, Ed., Springer–Verlag, 1998, pp. 1–14.

Frederick B. Cohen, "Operating System Protection Through Program Evolution," 1992, http://all.net/books/IP/evolve.html.

Christian Collberg, et al., "A Taxonomy of Obfuscating Transformatiions," Technical Report 148, Dept. of Computer Science, University of Auckland, Jul. 1997, pp. 1–36.

Christian Collberg, et al., "Breaking Abstractions and Unstructuring Data Structures," IEEE Computer Society, 1998 Int't Conference on Computer Languages, May 14–16, 1998, pp. 23–38.

Christian Collberg, et al., "Manufacturing Cheap, Resillient, and Stealthy Opaque Constructs," In Proc. ACM Principles of Programming Languages, 1998, pp. 184–196.

Alain Deutsch, "Interprocedural May–Alias Analysis for Pointers: Beyond k–limiting," Proc. of the ACM, SIGPLAN 1994 Conference on Programming Language Design and Implementation (PLDI), Jun. 20–24, 1994, pp. 230–241.

Joseph Dominger–Ferrer, "Software Run Protection: A Cryptographic Issue, Advances in Cryptology," EUROCRYPT 90, May 21–24, 1990, I.B. Damgard, Ed., Lecture Notes in Computer Science; vol. 473, Springer–Verlag, 1991, pp. 474–480.

Nick Eastridge, "Jshrink–Remove Symbolic Info From Class," Newsgroup: comp.lang.java.announce, Jun. 7, 1997, 1 page.

Rakesh Ghiya, et al., "Is it a Tree, a DAG, or a Cyclig Graph? A shape Analysis for Heap–Directed Pointers in C," ACM Press, Conference Record of POPL 1996: The 23rd ACM SIGPLAN–SIGACT Symposium on Principles of Programming Languages, Jan. 21–24, 1996, pp. 1–15.

John Gorden, "C Obfuscator," Newsgroup: comp.lang.c, Jul. 25, 1990, 21 pages.

Laurie J. Hendren, et al., "Parallelizing Programs with Recursive Data Structures," IEEE Transactions on Parallel and Distributed Systems, vol. 1, No. 1, Jan. 1990, pp. 35–47.

Fritz Hohl, "Time Limited Blackbox Security: Protecting Mobile Agents from Malicious Hosts," Mobile Agents and Security, Giovanni Vigna, Ed., Lecture Notes in Computer Science; vol. 1419, Spinger–Verlag, 1998, pp. 92–113.

Chent–Hsueh A. Hsieh, et al., "Java Bytecode to Native Code Translation: The Caffeine Prototype and Preliminary Results," Proc. of the 29th Annual IEEE/ACM International Symposium on Microarchitecture, 1996, pp. 90–97.

Cheng–Hsueh A. Hsieh, et al., "Optimizing NET Compilers for improved Java Performance," IEEE Computer Society, 1997, pp. 67–75.

Deborah Jing–Hwa Hwang, "Function–Based Indexing for Object–Oriented Databases," Massachusetts Institute of Technology, Laboratory for Computer Science, Feb. 1994, 172 pages.

Yuuji Ichisugi, "Watermark for Software and its Insertion, Attacking, Evaluation and Implementation Methods" (in Japanese), Summer Symposium on Programming, Jul. 1997, pp. 57–64.

Rex Jaeschke, "Encrypting C Source for Distribution," Journal of C Language Translation, vol. 2, No. 1, 1990, pp. 71–80, http://jclt.iecc.com.

Benji Jasik, "SourceAgain, the Professional's Java Decompiler," Newsgroup: comp.lang.java.programmer, Oct. 2, 1997, http://www.ahpah.com/sourceagain/sourceagain.professional.html, 4 pages.

Eron Jokippi, "Jobe–The Java Obfuscator," Newsgroup: comp.lang.java.announce, Jan. 14, 1997, http://www.meurrens.org/ip–links/java/codeengineering/jobe–doc.html, 3 pages.

Sam Kho, "Graphical Class File Browser," Newsgroup: comp.lang.java.announce, Dec. 4, 1996, 1 page.

Svet Kovich, "Java Obfuscator, Unobfuscator," Newsgroup: comp.lang.java.announce, Dec. 25, 1997, 1 page.

Mark D. LaDue, "Hosemocha.Java," Mar. 20, 2002, http://www.cigital.com/hostile–applets/hosemocha.java, 3 pages.

Hongying Lai, "A Comparatitve Study of Java Obfuscators Available on the Internet," 415.780 Project Report, Computer Science Department, University of Auckland, Feb. 22, 2001, 115 pages, http.//www.cs.auckland.ac.nz/~cthombo/Students/hlai.

James R. Larus, et al., "EEL: Machine–Independent Executable Editing," Proc. of the 1995 ACM SIGPLAN Conference on Programming Language Design and Implementation, Jun. 18–21, 1995, pp. 291–300.

Don Libes, "Obfuscated C and Other Mysteries," John Wiley & Sons, Inc., 1993, 413 pages.

Tim Lindholm, et al., "The Java Virtual Machine Specification," Jan. 25, 2002, http://java.sun.com/docs/books/vmspec/html/vmspectoc.doc.html, 5 pages.

Douglas Low, "Java Control Flow Obfuscation," Thesis in Master of Science in Computer Science," University of Auckland, Mar. 19, 1998, 137 pages.

Douglas Low, "Protecting Java Code Via Code Obfuscation," ACM Crossroads, 1998, 6 pages, http://www.acm.org/crossroads/xrd4–3/codeob.html, 6 pages.

Stavros Macrakis, "Protecting Source Code with ANDF," Jan. 25, 1993, pp. 1–17.

Qusay H. Mahmoud, "Java Tip 22: Protect your Bytecodes from Reverse Engineering/Decompilation," JavaWorld, 1997, 4 pages, http://www.javaworld.com/javatips/jw–javatip22.html, 4 pages.

Masahiro Mambo, et al., "A Tentative Approach to Constructing tamper–Resistant Software," Proc. of the ACM, New Security Workshop, 1997, pp. 23–33.

Benoit Marchal, et al., "Java Decompilation and Reverse Engineering," Parts 1 and 2, Digital Cat's Fava Resource Center, www.google.com, 7 pages.

John J. Marciniak, "Encyclopedia of Software Engineering," John Wiley & sons, Inc., 1994 ISBN o–471–54004–8.

Bill McKeeman, "Journal of C. Language Translation," 1991, http://gorillman.com/mckeeman/writings/c flat.html, 31 pages.

Alfred J. Menzes et al., "Handbook of Applied Cryptography," CRC Press 1997, Chapter 6, pp. 191–222.

Sape Mullender, "Distributed Systems," Addison–Wesley, $2^{nd}$ Edition, 1993, ISBN 0–201–62427–3.

Godfrey Nolan, "Decompile Once, Run Anywhere," and Hanpeter van Vliet, "A Tercentennial," Web Techniques Magazine, vol. 2, Issue 9, Sep. 1997, 6 pages.

Landon Curt Noll, et al., "The International Obfuscated C Code Contest," 2002, 3 pages, www.au.ioccc.org, 3 pages.

Todd A. Proebsting, "A Robust Java–to–C Translation System," 2 pages.

Todd A. Proebsting, et al., "Krakotoa: Decompilation in Java, Does (Bytecode Reveal Source?)," Department of Computer Science, The University of Arizona, 1983, 13 pages.

Todd A. Proebsting, "Optimizing an ANSI C Interpreter with Superoperators," Symposium on Principles of Programming Languages, 1995, pp. 322–332.

Todd A. Proebsting, et al., "Toba: Java for Applications–A Way Ahead of Time (WAT) Compiler," Proceedings of the Third Conference on Object–Oriented Technologies and Systems (COOTS), 1997, pp. 1–13.

Gang Qu, et al., "Analysis of Watermarking Technique for Graph Coloring Problem," Computer Science Department, University of California, Los Angeles, California, 1998, 4 pages.

Robert Raud, "Zipping and Encrupting Utility," Newsgroup: comp.lang.java.announce, Jun. 23, 1997, 1 page.

R.L. Rivest, et al., "A Method for Obtaining Digital Signatures and Public–key Cryptosystems," Communications of the ACM, Feb. 1978, vol. 21, No. 2, pp. 120–126.

Thomas Sander, et al., "On Software Protection Via Function Hiding," International Computer Science Institute, 1998, pp. 1–12.

Tomas Sander, et al., "Protecting Mobile Agents Against Malicious Hosts," Mobile Agent Security, Lecture Notes, 1419, G. Vigna, Ed., Springer–Verlag, 1998, pp. 1–16.

Tomas Sander, et al., "Towrads Mobile Cryptography," IEEE Proc. of Secruity and Privacy, May 3–6, 1998, 10 pages.

Uwe Schoning, "Complexity Cores and Hard Problem Instances," Lecture Notes in Computer Science, Springer–Verlag, 1987, pp. 232–240.

Jens Schweikhardt, "Looking for Shround/Obfus," Newsgroup: comp.lang.c, Oct. 9, 1997, 1 page.

Bjarne Steensgaard, "Points–to–Analysis in Almost Linear Time," ACM Press, POPL 1996: ACM SIGPLAN–SIGACT Symposium on Principles of Programming Languages, Jan. 21–24, 1996, pp. 32–41.

Paul A. Suhler, et al., "Software Authorization Systems," IEEE Software, 1986, pp. 34–41.

Amitabh Srivastava, et al., "Atom: A System for Building Customized Program Analysis Tools," WRL Research Report 94/2, Mar. 1994, 23 pages.

K.B. Sriram, Obfuscator, 1996, http:linux.jinr.ru/usoft/www/www blackdown.org/kbs/hashjava.html. 5 pages.

William M. Waite, et al., "Compiler Construction," Springer–Verlag, 1984, pp. 329–332.

Chenxi Wang, et al., "Software Tampert Sesistance: Obstructing Static Analysis of Programs," Department of Computer Science, Univerisity of Virginia, pp. 1–18.

Mar, Welsh, "RetroGuard, Bytecode Obfuscator–Test," Newsgroup: alt.test.test, Jul. 11, 1998, 1 page.

Linda Mary Wills, "Automated Program Recognition: A Feasability Demonstration," Artificial Intelligence, 1990, pp. 113–171.

Xiaolan Zhang, et al., "System Support for Automatic Profiling and Optimization," The Proceedings of the $16^{th}$ Symposium on Operating Systems Principles, Oct. 1997, pp. 1–14.

"Call for Papers, Workshop on Information Hiding," Portland Oregon, Apr. 15–17, 1998, http://www.cl.cam.ac.uk/users/rjal4/ihws.html, 1 page.

"Crema, A Little Cloud In Your Java," Mar. 20, 2002, http://www.meurrens.org/p–links/java/codeengineering/crema/index.html, 3 pages.

"CybergraphiX," Feb. 27, 2002, http://vgr.com/cybergfx/boards.html, 4 pages.

"EtchDescription Instrumentation and Optimization of Win32/Intel Executables," Oct. 21, 2000, 5 pages.

"Fooling Disassemnblers (Protecting Applications Against Disassembly)," Feb. 27, 2002, http:/www.woodmann.com/fravia/snatfo.html, 3 pages.

Jars Automatic Resource Listing, search for "obfuscator," May 31, 2002, 12 pages.

"JavaBeans," Sun Microsystems, Jul. 24, 1997, 114 pages.

"Java Code Engineering & Reverse Engineering," Mar. 20, 2002, http://www.meurrens.org/ip–links/java/codeengineering/decomp.html, 11 pages.

"Java Obfuscator, Java Optimizer, Java Shrinker," Mar. 20, 2002, http://www.preemptive.com/tools/index.html, 4 pages.

"Java Security: Present and Near Future," IEEE Micro, 1997, pp. 14–19.

"Jamm Consulting," Dec. 28, 2000, http://www.jammconsulting.com/servlets/com.jammconsulting.servlet/productspage, 20 pages.

"JBuilder," Borland Jan. 25, 2002, http://www.borland.com/jbuilder/index.html, 17 pages.

"Jshrink: Java Shrinker and Obfuscator," Eastridge Technology, Dec. 28, 2000, http://www.e–t.com/ishrink.html, 2 pages.

"Keep your code under cover with J.Cloak!," Dec. 28, 2000, http://www.force5.com/cloak/projectcloak.html, 17 pages.

"Kimera Disassembler," Mar. 20, 2002, http://www–kimera.cs.washington.edu/disassmebler.html, 1 page.

"Loading and Overlays," Feb. 27, 2002, http://www.iec-c.com/linker/linker08.html, 12 pages.

"Microsoft VisualJ++," Mar. 28, 2002, http://msdn.microsoft.com/visualj/prodinfo/datasheet/default.asp, 4 pages.

"Mocha, the Java Decompiler," Mar. 20, 2002, http://www.brouhaha.com/~eric/computers/mocha.html, 3 pages.

"PreEmptive Solutions–Advanced Java ™ Obfuscation, Optimization, and Size Reduction," Dec. 28, 2000, http://www.preemptive.com, 6 pages.

"Programming Languages for the Java Virtual Machine," Mar. 28, 2002, http://grunge.cs.tu–berlin.de/~tolk/vmlanguages.html, pp. 1–18.

"REC–Reverse Engineering Compiler User's Manual," Mar. 20, 2002, http://www.backerstreet.com/rec/recman.html, 11 pages.

"Retrologic–Platform Neutral Solutions," Retroguard, Dec. 28, 2000, http://retrologic.com/main.html, 24 pages.

"SourceGuard 4.0," Dec. 28, 2000, http://www.4thpass.com/sourceguard, 53 pages.

"The World's Premier Browser, Email & Address Book Suite," Netscape Navigator 4, Mar. 28, 2002, http://home.netscape.com/browsers/4/index.html?cp+dowpod4x, 2 pages.

"Visual Café for Java Professional Development Edition, "Mar. 28, 2002, http://www.nsal.com/html/.symantec visual café pro.html, 2 pages.

"Welcome to Cloakware," Dec. 29. 2000, http://www.cloakware.com. 18 pages.

"Welcome to Journal of C Language Translation," Jan. 25, 2002, http://jcit.iecc.com, 1 page.

"WingDis User's Guide by Wingsoft," Dec. 20, 2000 http://www.wingsoft.com/wingdis.man.html, 3 pages.

"Zelix KlassMaster Java Obfuscator Change History," 2002, http://www.zelix.com/klassmaster, 7 pages.

"Zelix KlassMaster Java Obfuscator–Java Flow Obfuscation," http://www.zelix.com/klassmaster, 2 pages.

"Zelix KlassMaster," Dec. 28, 2000, http://www.zelix.com/klassmaster, 12 pages.

* cited by examiner

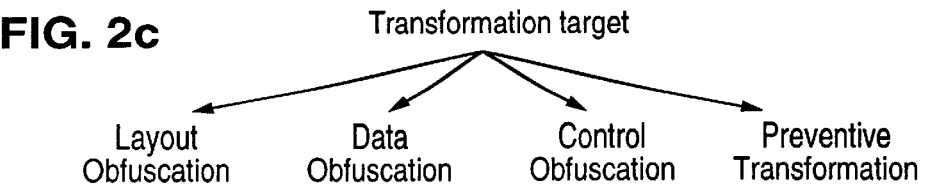
FIG. 2c
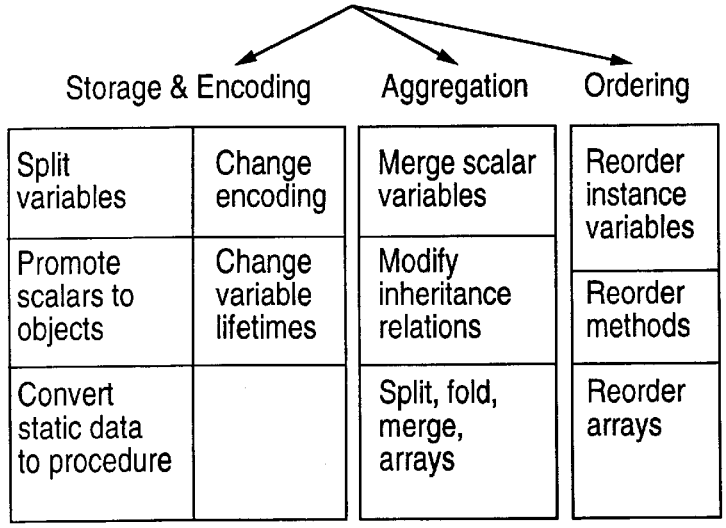
FIG. 2e Data Obfuscation
FIG. 2d Layout obfuscation
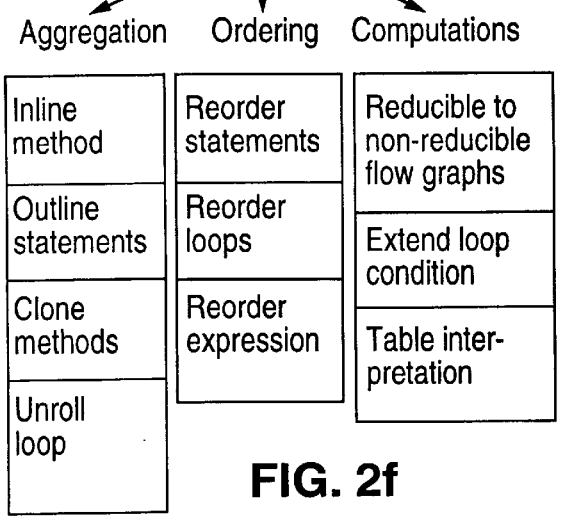
FIG. 2f
FIG. 2g

| METRIC | METRIC NAME | CITATION |
|---|---|---|
| $\mu_1$ | Program Length | Halstead |
| | $E(P)$ increases with the number of operators and operands in $P$. | |
| $\mu_2$ | Cyclomatic Complexity | McCabe |
| | $E(F)$ increases with the number of predicates in $F$. | |
| $\mu_3$ | Nesting Complexity | Harrison |
| | $E(F)$ increases with the nesting level of conditionals in $F$. | |
| $\mu_4$ | Data Flow Complexity | Oviedo |
| | $E(F)$ increases with the number of inter-basic block variable references in $F$. | |
| $\mu_5$ | Fan-in/out Complexity | Henry |
| | $E(F)$ increases with the number of formal parameters to $F$, and with the number of global data structures read or updated by $F$. | |
| $\mu_6$ | Data Structure Complexity | Munson |
| | $E(P)$ increases with the complexity of the static data structures declared in $P$. The complexity of a scalar variable is constant. The complexity of an array increases with the number of dimensions and with the complexity of the element type. The complexity of a record increases with the number and complexity of its fields. | |
| $\mu_7$ | OO Metric | Chidamber |
| | $E(C)$ increases with ($\mu_7^a$) the number of methods in $C_1$ ($\mu_7^b$) the depth (distance from the root) of $C$ in the inheritance tree, ($\mu_7^c$) the number of direct subclasses of $C_1$ ($\mu_7^d$) the number of other classes to which $C$ is coupled*, ($\mu_7^e$) the number of methods that can be executed in response to a message sent to an object of $C_1$ ($\mu_7^f$) the degree to which $C$'s methods do not reference the same set of instance variables. Note: $\mu_7^f$ measures cohesion; i.e., how strongly related the elements of a module are. | |

*Two classes are coupled if one uses the methods or instance variables of the other.

FIG. 7

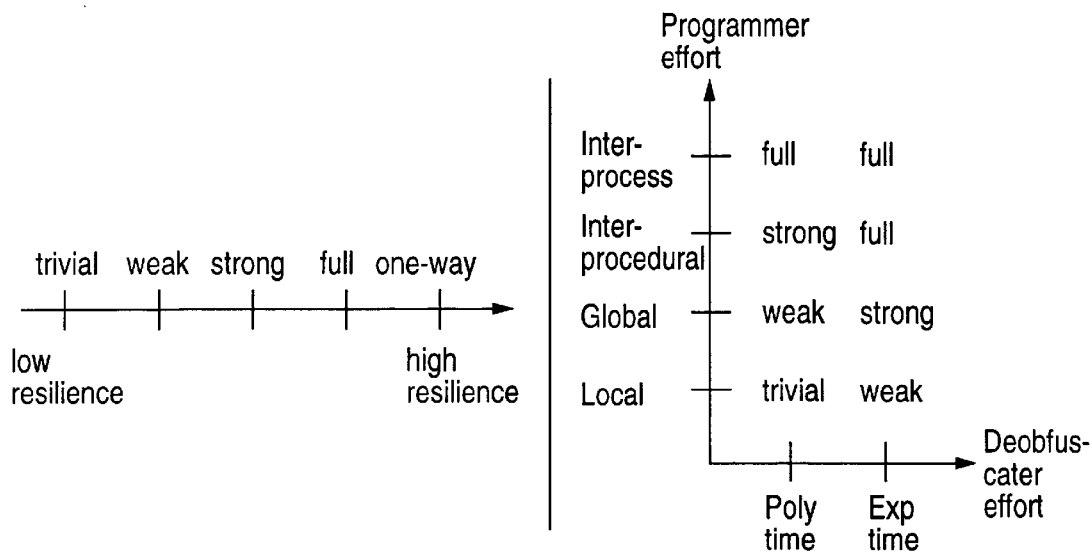
FIG. 8a  FIG. 8b
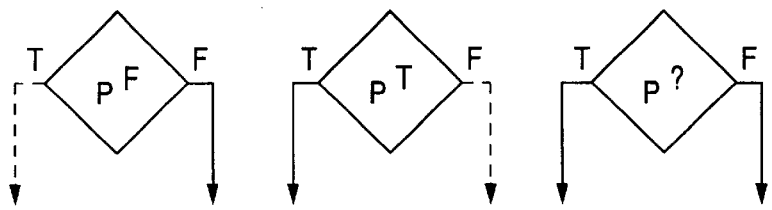
FIG. 9
```
{   int v, a=5; b=6;
    v=11= a + b;
    if (b > 6) T ...
    if (random (1,5) < 0) F...
}
```
FIG. 10a
```
{   int v, a=5; b=6;
    if (...) ...
        ⋮    (b is unchanged)
    if (b < 7) T a++1
    v=11= (a > 5) 7v=b=b; v=b
}
```
FIG. 10b

```
class C {
    method M1 (T1 a) {
        S_1^{M1};... S_k^{M1};
    }
    method M2 (T1 b; T2 c) {
        S_1^{k1};... S_m^{k2};
    }
}

{ C x=new C;
  x.M1(a); x.M2(b, c); }
```

$\xrightarrow{\tau}$

```
class C' {
    method M (Ti a; T2 c; int V) {
        if (V==p) {S_1^{M1};...S_k^{M1};}
        else      {S_1^{M1};...S_m^{k2};}
    }
}

{ C' x=new C';
  x.M(a, c, V^{=p});
  x.M(b, c, V^{=g}); }
```

FIG. 18

```
class C {
    method m (int x)
        {S_1 ... S_k}
}

{ C x = new C;
  x.m(8); ... x.m(7);
}
```

$\xrightarrow{\tau}$

```
class C1 {
    method m (int x)
        {S_1^a ;...S_n^a }
    method m1 (int x)
        {S_1^c ;...S_n^c }
}
class O2 inherits C1 {
    method M (int x)
        {S_1^b ... S_k^b }
}

{ C1 x ;
  if (P7) x=new C1 else x=new C2;
  x.m(5); ...; x.m1(7);
}
```

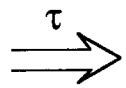

```
                              for(I=1, I<=n, I+=64)
  for (i=1,i<=n,i++)             for (J=1,J<=n,J+=64)
    for (j=1, j<=n,j++)     τ       for (i=I,i<=min(I+63,n),i++)
      a[1,j]=b[j,i]         ⟹          for (j_J,j<=min(J+65,n),j++)
                                            a[i,j]=b[j,i]
```

FIG. 20b

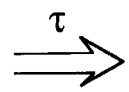

```
                              for (i=2,i<(n-2),i+=2) {
                                 a[i] += n[i-1]=a[i+1];
  for(i=2,i<(n-1),i++)     τ      a[i+1] += a[i]=a[i+2];
    a[i] +=a[1-i]==[i+1]   ⟹   };
                              if (((n-2) % 2) == 1)
                                 x[n-1] += a[n-2]=a[n]
```

FIG. 20c

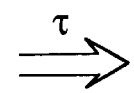

```
  for(i=1,i<n,i++) {       τ   for (i=1,i<n,i++)
    a[i] += c;              ⟹    a[i] += c;
    x[i+1]=d+x[i+1]=a[i]         for (i=1, i<n, i++)
  }                                x[i+i] <d+x[i+1]=a[i]
```

FIG. 21a

| g(V) | f(p,q) | |
|---|---|---|
| p  q | V | 2p + q |
| 0  0 | False | 0 |
| 0  1 | True  | 1 |
| 1  0 | True  | 2 |
| 1  1 | False | 3 |

FIG. 21b

|  | p | |
|---|---|---|
| VAL[p,q] | 0 | 1 |
| q  0 | 0 | 1 |
|    1 | 1 | 0 |

FIG. 21c

|  |  | A | | | |
|---|---|---|---|---|---|
| AND[A,B] | | 0 | 1 | 2 | 3 |
| B | 0 | 3 | 0 | 0 | 0 |
|   | 1 | 3 | 1 | 2 | 3 |
|   | 2 | 0 | 2 | 1 | 3 |
|   | 3 | 3 | 0 | 0 | 3 |

FIG. 21d

|  |  | A | | | |
|---|---|---|---|---|---|
| OR[A,B] | | 0 | 1 | 2 | 3 |
| B | 0 | 3 | 1 | 2 | 3 |
|   | 1 | 1 | 1 | 2 | 2 |
|   | 2 | 2 | 2 | 1 | 1 |
|   | 3 | 0 | 1 | 2 | 0 |

```
(1)  bool A,B,C;                          (1')  short a1,a2,b1,b2,c1,c2;
(2)  A = True;                            (2')  a1=0; a2=1;
(3)  B = False;                           (3')  b1=0; b2=0;
(4)  C = False;                     T     (4')  c1=1; c2=1;
(5)  C = A & B;                     ⟹    (5')  x=AND[2*a1+a2,2*b1+b2]; c1=x/2; c2=x%2;
(6)  C = A & B;                           (6')  c1=(a1 ^ a2) & (b1 ^ b2); c2=0
(7)  C = A | B;                           (7')  x=OR[2*a1+a2,2*b1+b2]; c1=x/2; c2=x%2;
(8)  if (A) ...;                          (8')  x=2*a1+a2; if ((x==1) || (x==2)) ...;
(9)  if (B) ...;                          (9')  if (b1 ^ b2) ...;
(10) if (C) ...;                          (10') if (VAL[c1,c2]) ...;
```

FIG. 21e

```
String G (int n) {
    int i=0,k;
    String B;
    while (i) {
        L1:  if (n==1) {S[i++]="A";k=0;goto L6};
        L2:  if (n==2) {S[i++]="B";k= -2 ;goto L6};
        L3:  if (n==3) {S[i++]="C";goto L8};
        L4:  if (n==4) {S[i++]="K";goto L9};
        L5:  if (n==5) {S[i++]="C";goto L11};
             if (n>12) goto L1;
        L6:  if (k++<=2) {S[i++]="A";goto L6} else goto L8;
        L8:  return S;
        L9:  S[i++]="C"; goto L10;
        L10: S[i++]="B"; goto L8;
        L11: S[i++]="C"; goto L12;
        L12: goto L10;
    }
}
```

FIG. 22

FIG. 23a $$Z(X + r, Y) = 2^{32} \cdot Y + (r + X) = Z(X,Y) + r$$
$$Z(X, Y + r) = 2^{32} \cdot (Y + r) + X = Z(X,Y) + r \cdot 2^{32}$$
$$Z(X \cdot r, Y) = 2^{32} \cdot Y + X \cdot r = Z(X,Y) + (r - 1) \cdot X$$
$$Z(X, Y \cdot r) = 2^{32} \cdot Y \cdot r + X = Z(X,Y) + (r - 1) \cdot 2^{32} \cdot Y$$

FIG. 23b (1) int X=45, Y=95;                 (1') long Z=1677590661119551045;
(2) X += 5;                         (2') Z += 5;
(3) Y += 11;          $\tau \Longrightarrow$   (3') Z += 47244640256;
(4) X *= c;                         (4') Z += (c-1)* (Z & 4294967295);
(5) Y *= d;                         (5') Z += (d-1)* (Z & 18446744069414584320);

```
Node g, h;
method P(...,Node f) {
 /* 1 */  g = g.Move();
          h = h.Move();
 /* 2 */  h = h.Insert(new Node);
             ⋮
 /* 3 */  x.R(...,f.Move());
             ⋮
 /* 4 */  if (f==g) ? ...
             ⋮
 /* 5 */  if (g==h) F ...
             ⋮
 /* 6 */  f.Token=False;
          g.Token=True;
             ⋮
 /* 7 */  if (f.Token) ? ...
             ⋮
 /* 8 */  f.Token=True;
          h.Token=False;
             ⋮
 /* 9 */  if (f.Token)ᵀ ...
}
```

```
thread S {                thread T {                int X, Y;
  int R;                    int R;                  const C = sqrt(maxint)/10;
  while (1) {               while (i) {             main () {
    R = random(1,C);          R = random(1,C);        S.run(); T.run();
    X = R*R;                  X = 7*R*R;              ...
    sleep(3);                 sleep(2);               if ((Y - 1) == X)^F <= [P]
  }                           X *= X;                 ...
}                             sleep(5);             }
                            }
                          }
```

| TARGET | OBFUSCATION OPERATION | TRANSFORMATION | QUALITY POTENCY | RESILIENCE | COST | METRICS | SECTION |
|---|---|---|---|---|---|---|---|
| Layout | | Scramble Identifiers | medium | one-way | free | | 5.5 |
| | | Change Formatting | low | one-way | free | | 5.5 |
| | | Remove Comments | high | one-way | free | | 5.5 |
| Control | Computations | Insert Dead or Irrelevant Code | | | | $\mu 1, \mu 2, \mu 3$ | 6.2.1 |
| | | Extend Loop Condition | | | | $\mu 1, \mu 2, \mu 3$ | 6.2.2 |
| | | Reducible to Non-Reducible | Depends on the quality of the opaque predicate and the nesting depth at which the construct is inserted. | | | $\mu 1, \mu 2, \mu 3$ | 6.2.3 |
| | | Add Redundant Operands | | | | $\mu 1$ | 6.2.6 |
| | | Remove Programming Idioms | medium | strong | † | $\mu 1$ | 6.2.4 |
| | | Table Interpretation | high | strong | costly | $\mu 1$ | 6.2.5 |
| | | Inline Method | medium | one-way | free | $\mu 1$ | 6.3.1 |
| | | Outline Statements | medium | strong | free | $\mu 1$ | 6.3.1 |
| | | Interleave Methods | Depends on the quality of the opaque predicate. | | | $\mu 1, \mu 2, \mu 3$ | 6.3.2 |
| | Aggregation | Clone Methods | | | | $\mu 1, \mu 7$ | 6.3.3 |
| | | Block Loop | low | weak | free | $\mu 1, \mu 2$ | 6.3.4 |
| | | Unroll Loop | low | weak | cheap | $\mu 1$ | 6.3.4 |
| | | Loop Fission | low | weak | free | $\mu 1, \mu 2$ | 6.3.4 |
| | | Reorder Statements | low | one-way | free | | 6.4 |
| | Ordering | Reorder Loops | low | one-way | free | | 6.4 |
| | | Reorder Expression | low | one-way | free | | 6.4 |

FIG. 31a-1

| TARGET | OBFUSCATION OPERATION | TRANSFORMATION | QUALITY POTENCY | QUALITY RESILIENCE | COST | METRICS | SECTION |
|---|---|---|---|---|---|---|---|
| Data | Storage & Encoding | Change Encoding | low | Depends on the complexity of the encoding function. | | $\mu 1$ | 7.1.1 |
| | | Promote Scalar to Object | low | strong | free | | 7.1.2 |
| | | Change Variable Lifetime | | strong | free | $\mu 4$ | 7.1.2 |
| | | Split Variable | | Depends on the number of variables into which the original variable is split. | | $\mu 1$ | 7.1.3 |
| | | Convert Static to Pro-cedural Data | | Depends on the complexity of the generated function. | | $\mu 1, \mu 2$ | 7.1.4 |
| | | Merge Scalar Variables | low | weak | free | $\mu 1$ | 7.2.1 |
| | Aggregation | Factor Class | medium | † | free | $\mu 1, \mu 7^{b,c,e}$ | 7.2.3 |
| | | Insert Bogus Class | medium | † | free | $\mu 1, \mu 7^{b,c}$ | 7.2.3 |
| | | Refactor Class | medium | † | free | $\mu 1, \mu 7^{b,c,e}$ | 7.2.3 |
| | | Split Array | † | weak | free | $\mu 1, \mu 2, \mu 6$ | 7.2.2 |
| | | Merge Arrays | † | weak | free | $\mu 1, \mu 3$ | 7.2.2 |
| | | Fold Array | † | weak | cheap | $\mu 1, \mu 2, \mu 3, \mu 6$ | 7.2.2 |
| | | Flatten Array | † | weak | free | | 7.2.2 |
| | Ordering | Reorder Methods & Instance Variables | low | one-way | free | | 7.3 |
| | | Reorder Arrays | low | weak | free | | 7.3 |

FIG. 31a-2

| TARGET | OBFUSCATION OPERATION | TRANSFORMATION | POTENCY | QUALITY RESILIENCE | COST | METRICS | SECTION |
|---|---|---|---|---|---|---|---|
| Preventive | Targeted | HoseMocha | low | trivial | free | $\mu 1$ | 9 |
| | Inherent | Add Aliased Formals to Prevent Slicing | medium | strong | free | $\mu 1, \mu 5$ | 9.4 |
| | | Add Variable Dependencies to Prevent Slicing | Depends on the quality of the opaque predicate. | | | $\mu 1$ | 9.4 |
| | | Add Bogus Data Dependencies | medium | weak | cheap | $\mu 1$ | 9.1.1 |
| | | Use Opaque Predicates with Side-Effects | medium | weak | free | $\mu 1$ | 9.5 |
| | | Make Opaque Predicates using Difficult Theorems | † | † | † | $\mu 1$ | 9.5 |

FIG. 31b

| OPAQUE CONSTRUCT | RESILIENCE | QUALITY COST | SECTION |
|---|---|---|---|
| Created from calls to library functions. | trivial | Depends on the cost of the library function | 6.1.1 |
| Created from local (intra-basic block) information. | trivial | free ... cheap | 6.1.1 |
| Created from global (inter-basic block) information. | weak | free ... cheap | 6.1.1 |
| Created from inter-procedural and aliasing information. | full | cheap ... costly | 8.1 |
| Created from process interaction and scheduling | full | cheap ... costly | 8.2 |

FIG. 32

OBFUSCATION TECHNIQUES FOR ENHANCING SOFTWARE SECURITY

FIELD OF THE INVENTION

The present invention relates to methods and apparatus for preventing, or at least hampering, interpretation, decoding, or reverse engineering of software. More particularly, although not exclusively, the present invention relates to methods and apparatus for increasing the structural and logical complexity of software by inserting, removing, or rearranging identifiable structure or information from the software in such a way as to exacerbate the difficulty of the process of decompilation or reverse engineering.

BACKGROUND

The nature of software renders it susceptible to analysis and copying by third parties. There have been considerable efforts to enhance software security, which have met with mixed success. Such security concerns relate to the need to prevent unauthorized copying of software and a desire to conceal programming techniques in which such techniques can be determined via reverse engineering.

Established legal avenues, such as copyright, provide a measure of legislative protection. However, enforcing legal rights created under such regimes can be expensive and time consuming. Further, the protection afforded to software under copyright does not cover programming techniques. Such techniques (i.e., the function as opposed to the form of the software) are legally difficult to protect. A reverse engineer could escape infringement by rewriting the relevant software, ab initio, based on a detailed knowledge of the function of the software in question. Such knowledge can be derived from analyzing the data structures, abstractions, and organization of the code.

Software patents provide more comprehensive protection. However, it is clearly an advantage to couple legal protection of software with technical protection.

Previous approaches to the protection of proprietary software have either used encryption-based hardware solutions or have been based on simple rearrangements of the source code structure. Hardware-based techniques are non-ideal in that they are generally expensive and are tied to a specific platform or hardware add-on. Software solutions typically include trivial code obfuscators, such as the Crema obfuscator for Java™. Some obfuscators target the lexical structure of the application and typically remove source code formatting and comments and rename variables. However, such an obfuscation technique does not provide sufficient protection against malicious reverse engineering: reverse engineering is a problem regardless of the form in which the software is distributed. Further, the problem is exacerbated when the software is distributed in hardware-independent formats that retain much or all of the information in the original source code. Examples of such formats are Java™ bytecode and the Architecture Neutral Distribution Format (ANDF).

Software development can represent a significant investment in time, effort, and skill by a programmer. In the commercial context, the ability to prevent a competitor from copying proprietary techniques can be critical.

SUMMARY

The present invention provides methods and apparatus for obfuscation techniques for software security, such as computer implemented methods for reducing the susceptibility of software to reverse engineering (or to provide the public with a useful choice). In one embodiment, a computer implemented method for obfuscating code, includes testing for completion of supplying one or more obfuscation transformations to the code, selecting a subset of the code to obfuscate, selecting an obfuscating transform to apply, applying the transformation, and returning to the completion testing step.

In an alternative embodiment, the present invention relates to a method of controlling a computer so that software running on, stored on, or manipulated by the computer exhibits a predetermined and controlled degree of resistance to reverse engineering, including applying selected obfuscating transformations to selected parts of the software, in which a level of obfuscation is achieved using a selected obfuscation transformation so as to provide a required degree of resistance to reverse engineering, effectiveness in operation of the software and size of transformed software, and updating the software to reflect the obfuscating transformations.

In a preferred embodiment, the present invention provides a computer implemented method for enhancing software security, including identifying one or more source code input files corresponding to the source software for the application to be processed, selecting a required level of obfuscation (e.g., potency), selecting a maximum execution time or space penalty (e.g., cost), reading and parsing the input files, optionally along with any library or supplemental files read directly or indirectly by the source code, providing information identifying data types, data structures, and control structures used by the application to be processed, and constructing appropriate tables to store this information, preprocessing information about the application, in response to the preprocessing step, selecting and applying obfuscating code transformations to source code objects, repeating the obfuscating code transformation step until the required potency has been achieved or the maximum cost has been exceeded, and outputting the transformed software.

Preferably, the information about the application is obtained using various static analysis techniques and dynamic analysis techniques. The static analysis techniques include inter-procedural dataflow analysis and data dependence analysis. The dynamic analysis techniques include profiling, and optionally, information can be obtained via a user. Profiling can be used to determine the level of obfuscation, which can be applied to a particular source code object. Transformations can include control transformations created using opaque constructs in which an opaque construct is any mathematical object that is inexpensive to execute from a performance standpoint, simple for an obfuscator to construct, and expensive for a deobfuscator to break. Preferably, opaque constructs can be constructed using aliasing and concurrency techniques. Information about the source application can also be obtained using pragmatic analysis, which determines the nature of language constructs and programming idioms the application contains.

The potency of an obfuscation transformation can be evaluated using software complexity metrics. Obfuscation code transformations can be applied to any language constructs: for example, modules, classes, or subroutines can be split or merged; new control and data structures can be created; and original control and data structures can be modified. Preferably, the new constructs added to the transformed application are selected to be as similar as possible to those in the source application, based on the pragmatic information gathered during preprocessing. The method can produce subsidiary files including information about which obfuscating transformations have been applied and information relating obfuscated code of the transformed application to the source software.

Preferably, the obfuscation transformations are selected to preserve the observable behavior of the software such that if P is the untransformed software, and P' is the transformed software, P and P' have the same observable behavior. More particularly, if P fails to terminate or terminates with an error condition, then P' may or may not terminate, otherwise P' terminates and produce the same output as P. Observable behavior includes effects experienced by a user, but P and P' may run with different detailed behavior unobservable by a user. For example, detailed behavior of P and P' that can be different includes file creation, memory usage, and network communication.

In one embodiment, the present invention also provides a deobfuscating tool adopted to remove obfuscations from an obfuscated application by use of slicing, partial evaluation, dataflow analysis, or statistical analysis.

BRIEF DESCRIPTION OF THE DRAWINGS

The present invention will now be described by way of example only and with reference to the drawings in which:

FIG. 7 is a table that tabulates a selection of known software complexity metrics;

FIGS. 8a and 8b illustrate the resilience of an obfuscating transformation;

FIG. 9 shows different types of opaque predicates;

FIGS. 10a and 10b provide examples of (a) trivial opaque constructs and (b) weak opaque constructs;

FIG. 18 shows a technique for interleaving two methods declared in the same class;

FIG. 19 shows a technique for creating several different versions of a method by applying different sets of obfuscating transformations to the original code;

FIGS. 20a through 20c provide examples of loop transformations including (a) loop blocking, (b) loop unrolling, and (c) loop fission;

FIG. 21 shows a variable splitting example;

FIG. 22 provides a function constructed to obfuscate strings "AAA", "BAAAA", and "CCB";

FIG. 23 shows an example merging two 32-bit variables x and y into one 64-bit variable Z;

FIGS. 28a through 28d illustrate obfuscation vs. deobfuscation in which (a) shows an original program including three statements, $S_{1-3}$, being obfuscated, (b) shows a deobfuscator identifying "constant" opaque predicates, (c) shows the deobfuscator determining the common code in the statements, and (d) shows the deobfuscator applying some final simplifications and returning the program to its original form;

FIGS. 31a and 31b provide tables of an overview of various obfuscating transforms; and FIG. 32 provides an overview of various opaque constructs.

DETAILED DESCRIPTION

The following description will be provided in the context of a Java obfuscation tool, which is currently being developed by the applicants. However, it will be apparent to one of ordinary skill in the art that the present techniques are applicable to other programming languages and the invention is not to be construed as restricted to Java™ applications. The implementation of the present invention in the context of other programming languages is considered to be within the purview of one of ordinary skill in the art. The exemplary embodiment that follows is, for clarity, specifically targeted at a Java™ obfuscating tool.

In the description below, the following nomenclature will be used. P is the input application to be obfuscated; P' is the transformed application; T is a transformation such that T transforms P into P'. P(T)P' is an obfuscating transformation if P and P' have the same observable behavior. Observable behavior is defined generally as behavior experienced by the user. Thus, P' may have side effects such as creating files that P does not, so long as these side effects are not experienced by the user. P and P' do not need to be equally efficient.

Exemplary Hardware

Figure 1:
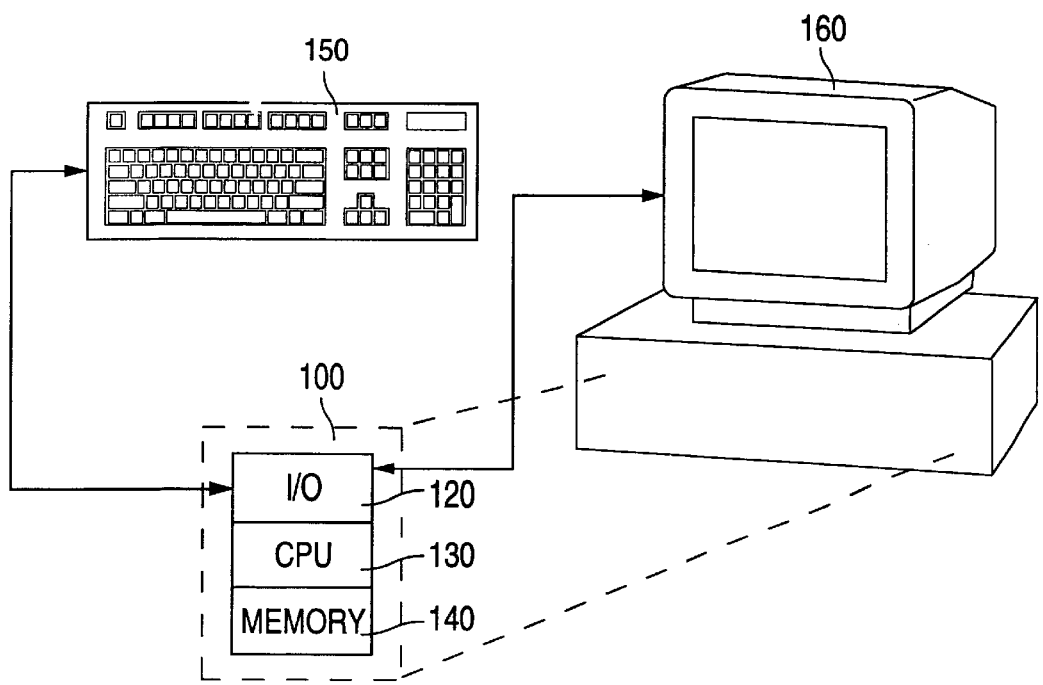
FIG. 1 illustrates a data processing system in accordance with the teachings of the present invention.

FIG. 1 illustrates a data processing system in accordance with the teachings of the present invention. FIG. 1 shows a computer 100, which includes three major elements. Computer 100 includes an input/output (I/O) circuit 120, which is used to communicate information in appropriately structured form to and from other portions of computer 100. Computer 100 includes a control processing unit (CPU) 130 in communication with I/O circuit 120 and a memory 140

(e.g., volatile and non-volatile memory). These elements are those typically found in most general purpose computers and, in fact, computer 100 is intended to be representative of a broad category of data processing devices. A raster display monitor 160 is shown in communication with I/O circuit 120 and issued to display images generated by CPU 130. Any well known variety of cathode ray tube (CRT) or other type of display can be used as display 160. A conventional keyboard 150 is also shown in communication with I/O 120. It will be appreciated by one of ordinary skill in the art that computer 100 can be part of a larger system. For example, computer 100 can also be in communication with a network (e.g., connected to a local area network (LAN)).

In particular, computer 100 can include obfuscating circuitry for enhancing software security in accordance with the teachings of the present invention, or as will be appreciated by one of ordinary skill in the art, the present invention can be implemented in software executed by computer 100 (e.g., the software can be stored in memory 140 and executed on CPU 130). For example, an unobfuscated program P (e.g., an application), stored in memory 140, can be obfuscated by an obfuscator executing on CPU 130 to provide an obfuscated program P', stored in memory 140, in accordance with one embodiment of the present invention.

OVERVIEW OF THE DETAILED DESCRIPTION

Figure 6:
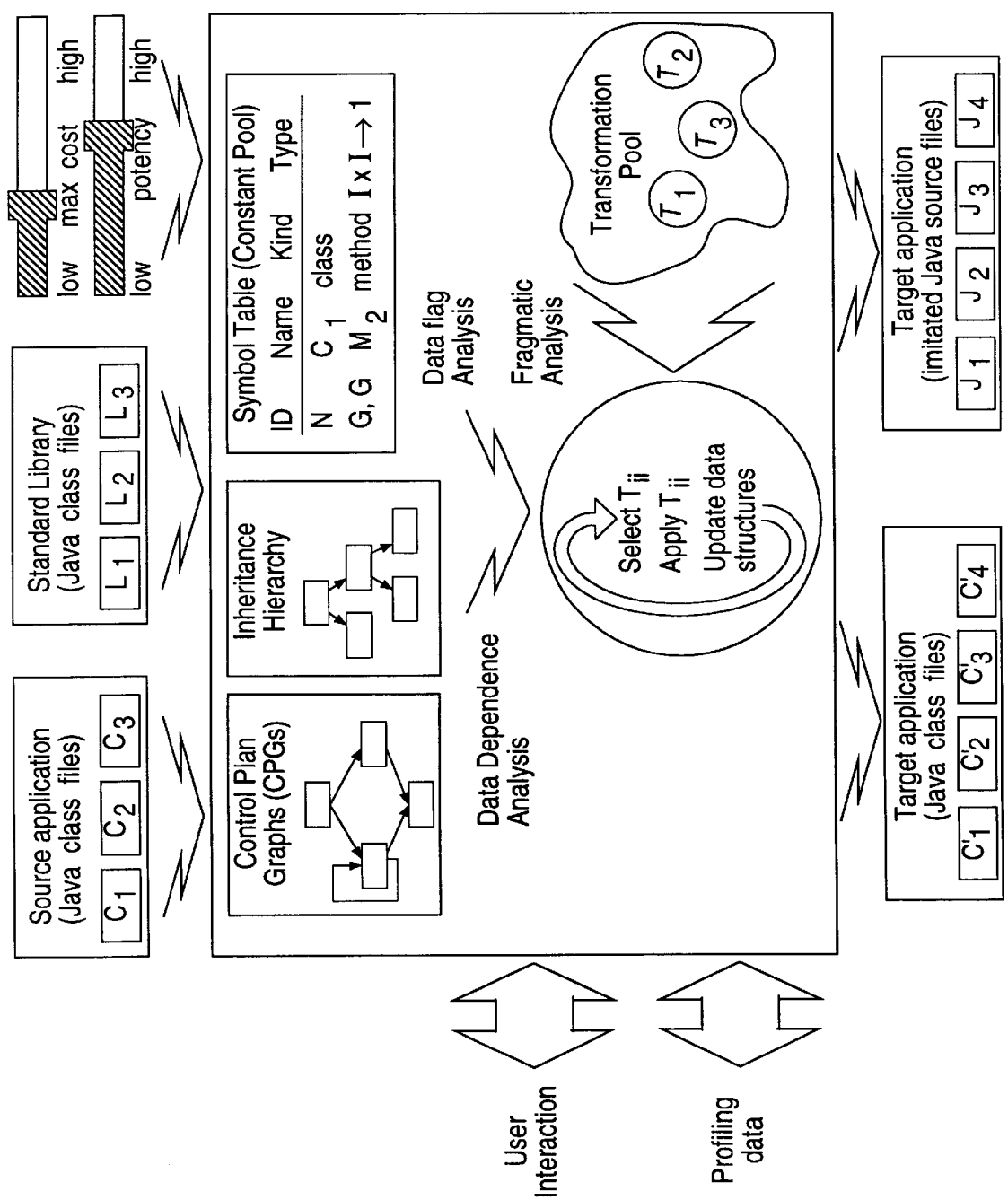
FIG. 6 illustrates the architecture of an example of an obfuscating tool suitable for use with Java™ applications.

FIG. 6 shows the architecture of a Java™ obfuscator. According to the inventive method, Java™ application class files are passed along with any library files. An inheritance tree is constructed as well as a symbol table, providing type information for all symbols and control flow graphs for all methods. The user may optionally provide profiling data files as generated by Java™ profiling tools. This information can be used to guide the obfuscator to ensure that frequently executed parts of the application are not obfuscated by very expensive transformations. Information is gathered about the application using standard compiler techniques such as interprocedural dataflow analysis and data dependence analysis. Some can be provided by the user and some by specialized techniques. The information is used to select and apply the appropriate code transformations.

Appropriate transformations are selected. The governing criteria used in selecting the most suitable transformation include the requirement that the chosen transformation blend in naturally with the rest of the code. This can be dealt with by favoring transformations with a high appropriateness value. A further requirement is that transformations which yield a high level of obfuscation with low execution time penalty should be favored. This latter point is accomplished by selecting transformations that maximize potency and resilience, and minimize cost.

An obfuscation priority is allocated to a source code object. This will reflect how important it is to obfuscate the contents of the source code object. For example, if a particular source code object contains highly sensitive proprietary material, then the obfuscation priority will be high. An execution time rank is determined for each method, which equals 1 if more time is spent executing the method than any other.

The application is then obfuscated by building the appropriate internal data structures, the mapping from each source code object to the appropriate transformation, the obfuscation priority, and the execution time rank. The obfuscating transformations are applied until the required level of obfuscation has been achieved or until the maximum execution time penalty is exceeded. The transformed application is then written.

The output of the obfuscation tool is a new application that is functionally equivalent to the original. The tool can also produce Java™ source files annotated with information about which transformations have been applied and how the obfuscated code relates to the original application.

A number of examples of obfuscating transformations will now be described, again in the context of a Java™ obfuscator.

Obfuscating transformations can be evaluated and classified according to their quality. The quality of a transformation can be expressed according to its potency, resilience, and cost. The potency of a transformation is related to how obscure P' is in relation to P. Any such metric will be relatively vague as it necessarily depends on human cognitive abilities. For the present purposes it is sufficient to consider the potency of a transformation as a measure of the usefulness of the transformation. The resilience of a transformation measures how well a transformation holds up to an attack from an automatic deobfuscator. This is a combination of two factors: programmer effort and deobfuscator effort. Resilience can be measured on a scale from trivial to one-way. One-way transformations are extreme in that they cannot be reversed. The third component is transformation execution cost. This is the execution time or space penalty incurred as a result of using the transformed application P'. Further details of transformation evaluation are discussed below in the detailed description of the preferred embodiments. The main classification of obfuscating transformations is shown in FIG. 2c with details given in FIGS. 2e through 2g.

Examples of obfuscating transforms are as follows: Obfuscating transforms may be categorized as follows: control obfuscation, data obfuscations, layout obfuscations, and preventive obfuscations. Some examples of these are discussed below.

Control obfuscations include aggregation transformations, ordering transformations, and computation transformations.

Computation transformations include: concealing real control flow behind irrelevant non-functional statements; introducing code sequences at the object code level for which there exist no corresponding high-level language constructs; and removing real control flow abstractions or introducing spurious ones.

Considering the first classification (control flow), the Cyclomatic and Nesting complexity metrics suggest that there is a strong correlation between the perceived complexity of a piece of code and the number of predicates it contains. Opaque predicates enable the construction of transformations which introduce new predicates into the program.

Referring to FIG. 11a, an opaque predicate $P^T$ is inserted into the basic block S where $S=S_1 \ldots S_n$. This splits S in half. The $P^T$ predicate is irrelevant code, because it will always evaluate to True. In FIG. 11b, S is again broken into two halves, which are transformed into two different obfuscated versions $S^a$ and $S^b$. Therefore, it will not be obvious to a reverse engineer that $S^a$ and $S^b$ perform the same function. FIG. 11c is similar to FIG. 11b, however, a bug is introduced into $S^b$. The $P^T$ predicate always selects the correct version of the code, $S^a$.

Figure 24A:
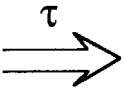
FIG. 24 illustrates an example of a data transformation for array restructuring.
Figure 24B:
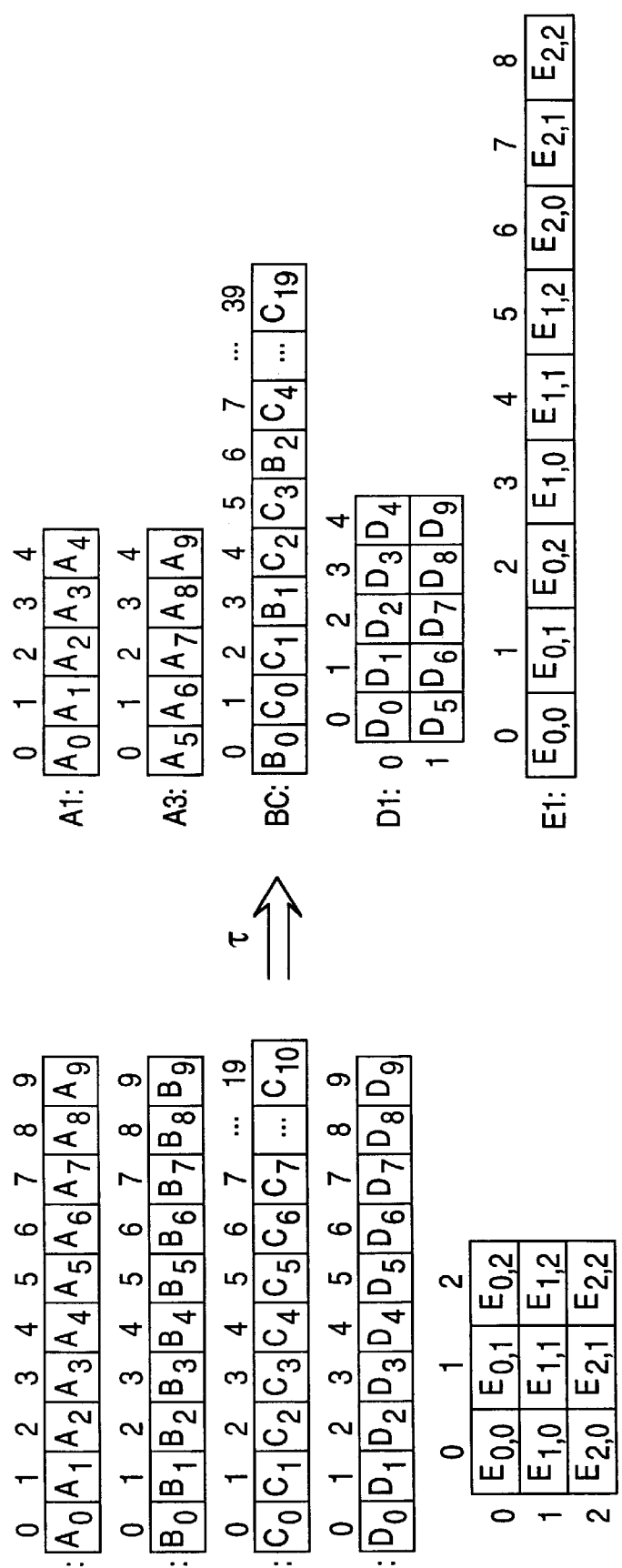

Another type of obfuscation transformation is a data transformation. An example of a data transformation is deconstructing arrays to increase the complexity of code. An array can be split into several subarrays, two or more arrays can be merged into a single array, or the dimensions of an array can be increased (flattening) or decreased (folding). FIG. 24 illustrates a number of examples of array transformations. In statements (1–2), an array A is split into two subarrays A1 and A2. A1 contains elements with even indices and A2 contains elements with odd indices. Statements (3–4) illustrate how two integer arrays B and C can be interleaved to produce an array BC. The elements from B and C are evenly spread throughout the transformed array. Statements (6–7) illustrate folding of array D into array D1. Such transformations introduce previously absent data structure or remove existing data structure. This can greatly increase the obscurity of the program as, for example, in declaring a 2-dimensional array a programmer usually does so for a purpose, with the chosen structure mapping onto the corresponding data. If that array is folded into a 1-d structure, a reverse engineer would be deprived of valuable pragmatic information.

Another example of an obfuscating transformation is a preventive transformation. In contrast to control or data transformations, the main goal of preventive transformations is not to obscure the program to a human reader, but to make known automatic deobfuscation techniques more difficult or to exploit known problems in current deobfuscators or decompilers. Such transformations are known as inherent and targeted, respectively. An example of an inherent preventive transformation is reordering a for-loop to run backward. Such reordering is possible if the loop has no loop-carried data dependencies. A deobfuscator could perform the same analysis and reorder the loop to forward execution. However, if a bogus data dependency is added to the reversed loop, the identification of the loop and its reordering would be prevented.

Further specific examples of obfuscating transformations are discussed below in the detailed description of the preferred embodiments.

DETAILED DESCRIPTION OF THE PREFERRED EMBODIMENTS

It has become more and more common to distribute software in forms that retain most or all of the information present in the original source code. An important example is Java bytecode. Because such codes are easy to decompile, they increase the risk of malicious reverse engineering attacks.

Accordingly, several techniques for technical protection of software secrets are provided in accordance with one embodiment of the present invention. In the detailed description of the preferred embodiments, we will argue that automatic code obfuscation is currently the most viable method for preventing reverse engineering. We then describe the design of a code obfuscator, an obfuscation tool that converts a program into an equivalent one that is more difficult to understand and reverse engineer.

The obfuscator is based on the application of code transformations, in many cases similar to those used by compiler optimizers. We describe a large number of such transformations, classify them, and evaluate them with respect to their potency (e.g., To what degree is a human reader confused?), resilience (e.g., How well are automatic deobfuscation attacks resisted?), and cost (e.g., How much performance overhead is added to the application?).

We finally describe various deobfuscation techniques (such as program slicing) and possible countermeasures an obfuscator could employ against them.

1 INTRODUCTION

Given enough time, effort, and determination, a competent programmer will always be able to reverse engineer any application. Having gained physical access to the application, the reverse engineer can decompile it (using disassemblers or decompilers) and then analyze its data structures and control flow. This can either be done manually or with the aid of reverse engineering tools, such as program slicers.

Reverse engineering is not a new problem. Until recently, however, it is a problem that has received relatively little attention from software developers, because most programs are large, monolithic, and shipped as stripped, native code, making them difficult (although never impossible) to reverse engineer.

However, this situation is changing as it is becoming more and more common to distribute software in forms that are easy to decompile and reverse engineer. Important examples include Java bytecode and the Architecture Neutral Distribution Format (ANDF). Java applications in particular pose a problem to software developers. They are distributed over the Internet as Java class files, a hardware-independent virtual machine code that retains virtually all the information of the original Java source. Hence, these class files are easy to decompile. Moreover, because much of the computation takes place in standard libraries, Java programs are often small in size and therefore relatively easy to reverse engineer.

The main concern of Java developers is not outright reengineering of entire applications. There is relatively little value in such behavior, because it clearly violates copyright law [29] and can be handled through litigation. Rather, developers are mostly frightened by the prospect of a competitor being able to extract proprietary algorithms and data structures from their applications in order to incorporate them into their own programs. Not only does it give the competitor a commercial edge (by cutting development time and cost), but it is also difficult to detect and pursue legally. The last point is particularly valid for small developers who may ill afford lengthy legal battles against powerful corporations [22] with unlimited legal budgets.

An overview of various forms of protection for providing legal protection or security for software is provided in FIG. 2. FIG. 2 provides a classification of (a) kinds of protection against malicious reverse engineering, (b) the quality of an obfuscating transformation, (c) information targeted by an obfuscating transformation, (d) layout obfuscations, (e) data obfuscations, (f) control obfuscations, and (g) preventive obfuscations.

The various forms of technical protection of intellectual property, which are available to software developers are discussed below. We will restrict our discussion to Java programs distributed over the Internet as Java class-files, although most of our results will apply to other languages and architecture-neutral formats as well, as will be apparent to one of ordinary skill in the art. We will argue that the only reasonable approach to the protection of mobile code is code obfuscation. We will furthermore present a number of obfuscating transformations, classify them according to effectiveness and efficiency, and show how they can be put to use in an automatic obfuscation tool.

The remainder of the detailed description of the preferred embodiments is structured as follows. In Section 2, we give an overview of different forms of technical protection against software theft and argue that code obfuscation currently affords the most economical prevention. In Section 3, we give a brief overview of the design of Kava, a code obfuscator for Java, which is currently under construction. Sections 4 and 5 describe the criteria we use to classify and evaluate different types of obfuscating transformations. Sections 6, 7, 8, and 9 present a catalogue of obfuscating transformations. In Section 10, we give more detailed obfuscation algorithms. In Section 11, we conclude with a summary of our results and a discussion of future directions of code obfuscation.

2 PROTECTING INTELLECTUAL PROPERTY

Consider the following scenario. Alice is a small software developer who wants to make her applications available to users over the Internet, presumably at a charge. Bob is a rival developer who feels that he could gain a commercial edge over Alice if he had access to her application's key algorithms and data structures.

This can be seen as a two-player game between two adversaries: the software developer (Alice) who tries to protect her code from attack, and the reverse engineer (Bob) whose task it is to analyze the application and convert it into a form that is easy to read and understand. Note that it is not necessary for Bob to convert the application back to something close to Alice's original source; all that is necessary is that the reverse engineered code be understandable by Bob and his programmers. Note also that it may not be necessary for Alice to protect her entire application from Bob; it probably consists mostly of "bread-and-butter code" that is of no real interest to a competitor.

Figure 2A:
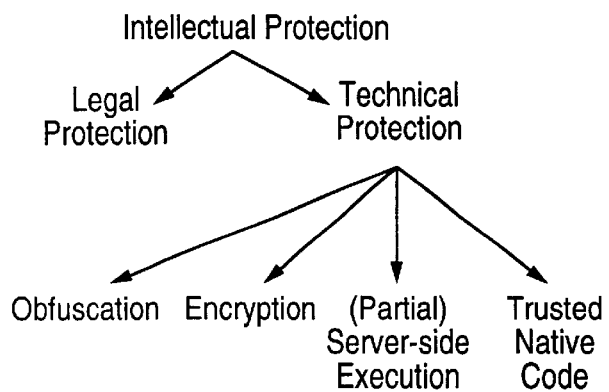
FIG. 2 illustrates a classification of software protection including categories of obfuscating transformations.

Alice can protect her code from Bob's attack using either legal or technical protection, such as shown in FIG. 2a, which is discussed above. While copyright law does cover software artifacts, economic realities make it difficult for a small company like Alice's to enforce the law against a larger and more powerful competitor. A more attractive solution is for Alice to protect her code by making reverse engineering so technically difficult that it becomes impossible or at the very least economically inviable. Some early attempts at technical protection are described by Gosler. (James R. Gosler. Software protection: Myth or reality? In CRYPTO'85—Advances in Cryptology, pages 140–157, August 1985).

Figure 3A:
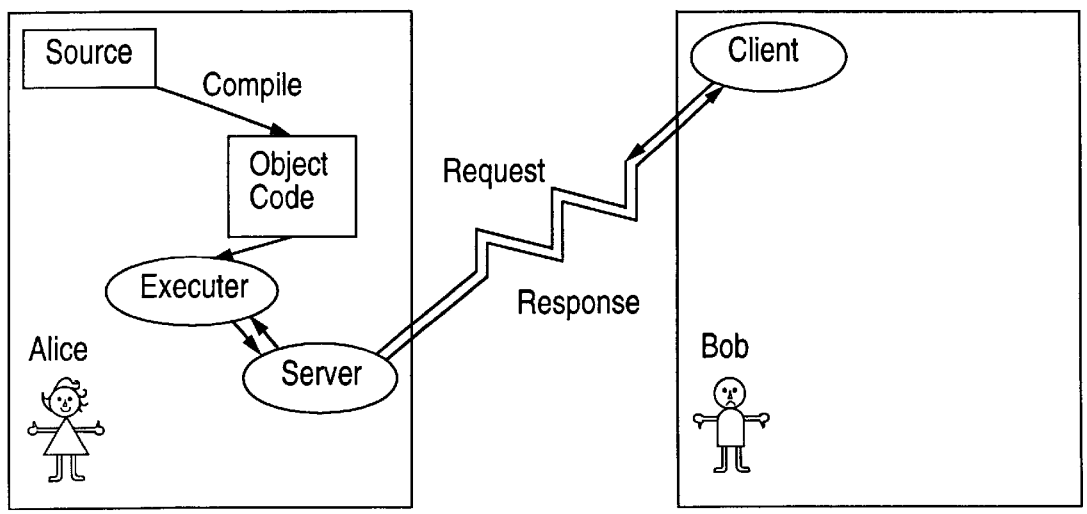
FIGS. 3a and 3b show techniques for providing software security by (a) server-side execution and (b) partial server-side execution.
Figure 3B:
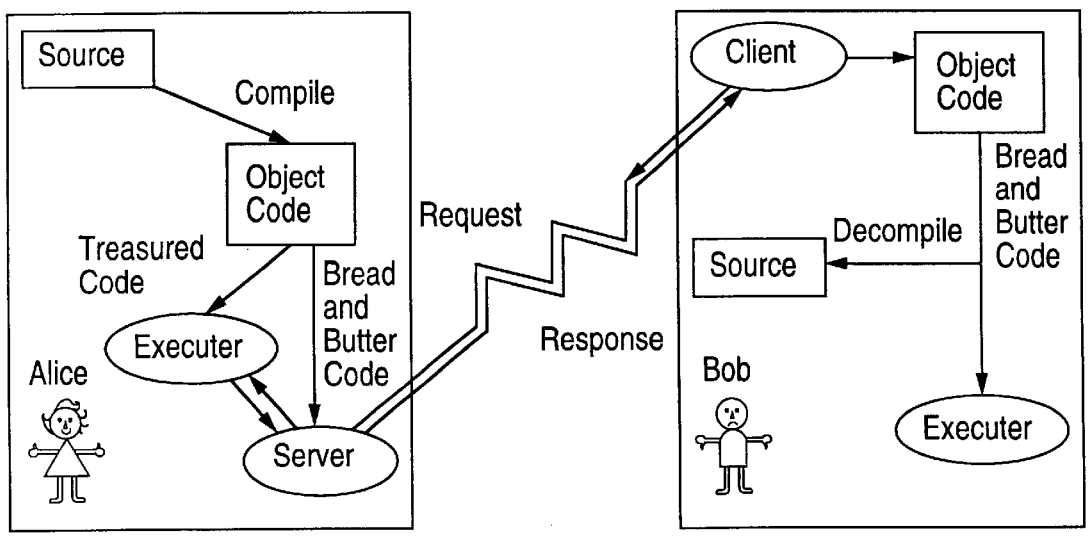

The most secure approach is for Alice not to sell her application at all, but rather sell its services. In other words, users never gain access to the application itself but rather connect to Alice's site to run the program remotely as shown in FIG. 3a, paying a small amount of electronic money every time. The advantage to Alice is that Bob will never gain physical access to the application and hence will not be able to reverse engineer it. The downside is of course that, due to limits on network bandwidth and latency, the application may perform much worse than if it had run locally on the user's site. A partial solution is to break the application into two parts: a public part that runs locally on the user's site, and a private part (that contains the algorithms that Alice wants to protect) that is run remotely, for example, as shown in FIG. 3b.

Figure 4A:
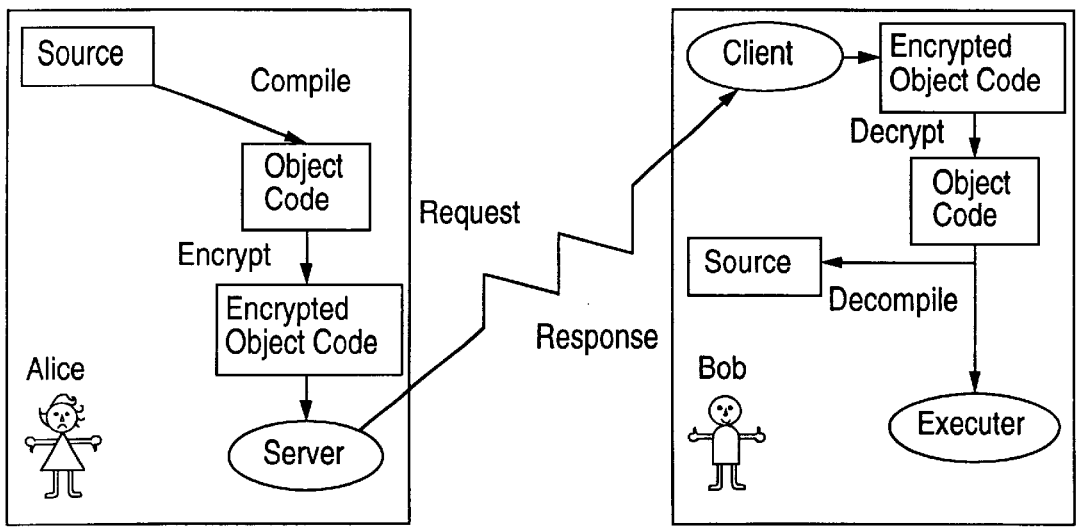
FIGS. 4a and 4b show techniques for providing software security by (a) using encryption and (b) using signed native code.

Another approach would be for Alice to encrypt her code before it is sent off to the users, for example, as shown in FIG. 4a. Unfortunately, this only works if the entire decryption/execution process takes place in hardware. Such systems are described in Herzberg (Amir Herzberg and Shlomit S. Pinter. Public protection of software. ACM Transactions on Computer Systems, 5(4):371–393, November 1987.) and Wilhelm (Uwe G. Wilhelm. Cryptographically protected objects. http://lsewww.epfl.ch/~wilhelm/CryPO. html, 1997). If the code is executed in software by a virtual machine interpreter (as is most often the case with Java bytecodes), then it will always be possible for Bob to intercept and decompile the decrypted code.

Figure 4B:
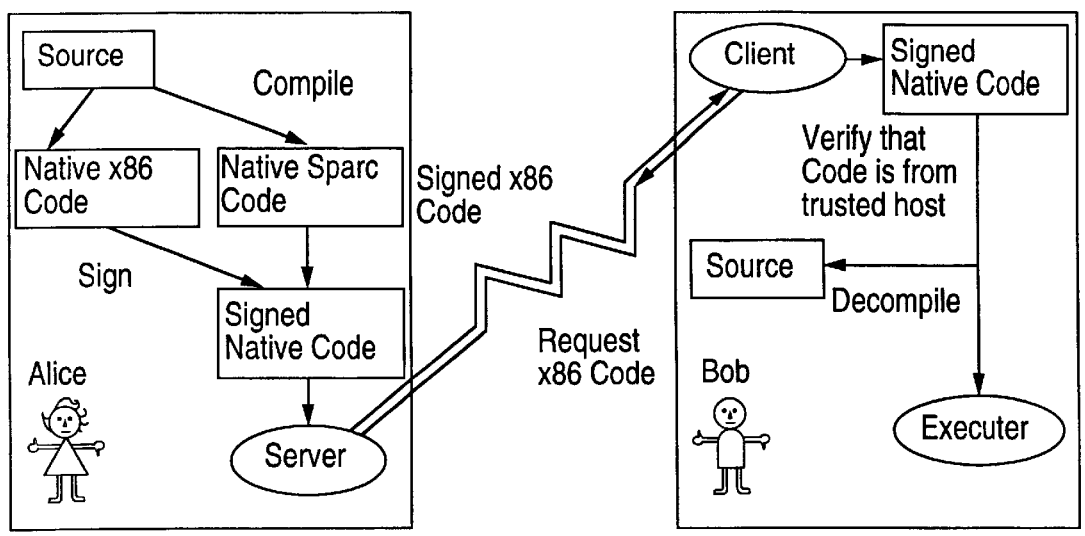

The Java™ programming language has gained popularity mainly because of its architecture neutral bytecode. While this clearly facilitates mobile code, it does decrease the performance by an order of magnitude in comparison to native code. Predictably, this has lead to the development of just-in-time compilers that translate Java bytecodes to native code on-the-fly. Alice could make use of such translators to create native code versions of her application for all popular architectures. When downloading the application, the user's site would have to identify the architecture/operating system combination it is running, and the corresponding version would be transmitted, for example, as shown in FIG. 4b. Only having access to the native code will make Bob's task more difficult, although not impossible. There is a further complication with transmitting native code. The problem is that—unlike Java bytecodes, which are subjected to bytecode verification before execution, —native codes cannot be run with complete security on the user's machine. If Alice is a trusted member of the community, the user may accept her assurances that the application does not do anything harmful at the user's end. To make sure that no one tries to contaminate the application, Alice would have to digitally sign the codes as they are being transmitted, to prove to the user that the code was the original one written by her.

Figure 5:
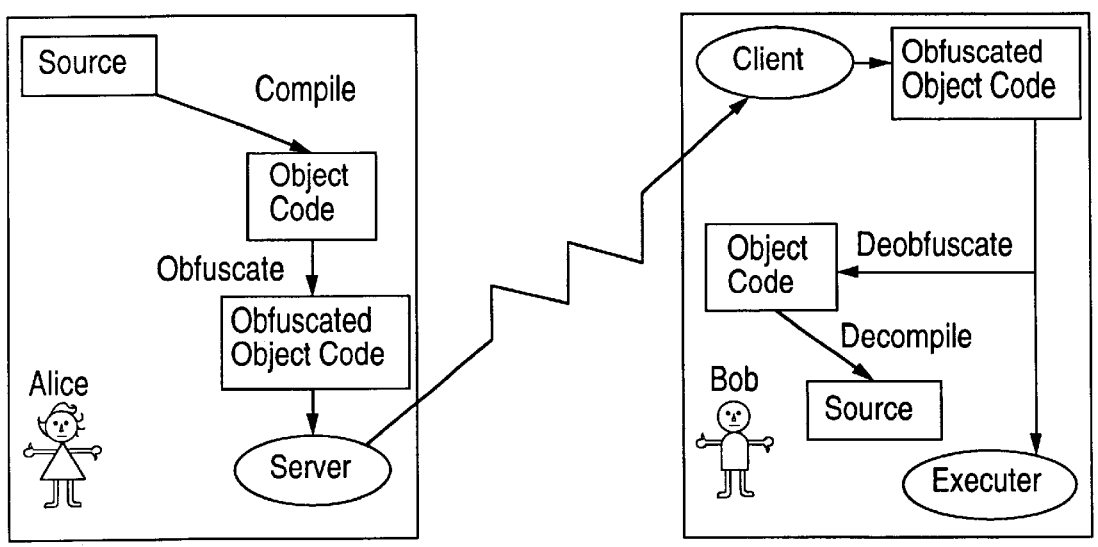
FIG. 5 shows a technique for providing software security through obfuscation.

The final approach we are going to consider is code obfuscation, for example, as shown in FIG. 5. The basic idea is for Alice to run her application through an obfuscator, a program that transforms the application into one that is functionally identical to the original but which is much more difficult for Bob to understand. It is our belief that obfuscation is a viable technique for protecting software trade secrets that has yet to receive the attention that it deserves.

Unlike server-side execution, code obfuscation can never completely protect an application from malicious reverse engineering efforts. Given enough time and determination, Bob will always be able to dissect Alice's application to retrieve its important algorithms and data structures. To aid this effort, Bob may try to run the obfuscated code through an automatic deobfuscator that attempts to undo the obfuscating transformations.

Hence, the level of security from reverse engineering that an obfuscator adds to an application depends on, for example, (a) the sophistication of the transformations employed by the obfuscator, (b) the power of the available deobfuscation algorithms, and (c) the amount of resources (time and space) available to the deobfuscator. Ideally, we would like to mimic the situation in current public-key cryptosystems, in which there is a dramatic difference in the cost of encryption (finding large primes is easy) and decryption (factoring large numbers is difficult). We will see that there are, in fact, obfuscating transformations that can be applied in polynomial time but which require exponential time to deobfuscate, as discussed below.

3 THE DESIGN OF A JAVA OBFUSCATOR

FIG. 6 shows an architecture of Kava, the Java obfuscator. The main input to the tool is a set of Java class files and the obfuscation level required by the user. The user may optionally provide files of profiling data, as generated by Java profiling tools. This information can be used to guide the obfuscator to make sure that frequently executed parts of the application are not obfuscated by very expensive transformations. Input to the tool is a Java application, given as a set of Java class files. The user also selects the required level of obfuscation (e.g., potency) and the maximum execution time/space penalty that the obfuscator is allowed to add to the application (the cost). Kava reads and parses the class files along with any library files referenced directly or indirectly. A complete inheritance tree is constructed, as well as a symbol table giving type information for all symbols, and control flow graphs for all methods.

Kava contains a large pool of code transformations, which are described below. Before these can be applied, however, a preprocessing pass collects various types of information about the application in accordance with one embodiment. Some kinds of information can be gathered using standard compiler techniques such as inter-procedural dataflow analysis and data dependence analysis, some can be provided by the user, and some are gathered using specialized techniques. Pragmatic analysis, for example, analyzes the application to see what sort of language constructs and programming idioms it contains.

The information gathered during the preprocessing pass is used to select and apply appropriate code transformations. All types of language constructs in the application can be the subject of obfuscation: for example, classes can be split or merged, methods can be changed or created, new control and data structures can be created and original ones modified. New constructs added to the application can be selected to be as similar as possible to the ones in the source application, based on the pragmatic information gathered during the preprocessing pass.

The transformation process is repeated until the required potency has been achieved or the maximum cost has been exceeded. The output of the tool is a new application— functionally equivalent to the original one—normally given as a set of Java class files. The tool will also be able to produce Java source files annotated with information about which transformations have been applied, and how the obfuscated code relates to the original source. The annotated source will be useful for debugging.

4 CLASSIFYING OBFUSCATING TRANSFORMATIONS

In the remainder of this detailed description of the preferred embodiments we will describe, classify, and evaluate various obfuscating transformations. We start by formalizing the notion of an obfuscating transformation:

Definition 1 (Obfuscating Transformation) Let $P-^T->P'$ be a legal obfuscating transformation in which the following conditions must hold:

If P fails to terminate or terminates with an error condition, then P' may or may not terminate.

Otherwise, P' must terminate and produce the same output as P.

Observable behavior is defined loosely as "behavior as experienced by the user." This means that P' may have side-effects (such as creating files or sending messages over the Internet) that P does not, as long as these side effects are not experienced by the user. Note that we do not require P and P' to be equally efficient. In fact, many of our transformations will result in P' being slower or using more memory than P.

The main dividing line between different classes of obfuscation techniques is shown in FIG. 2c. We primarily classify an obfuscating transformation according to the kind of information it targets. Some simple transformations target the lexical structure (the layout) of the application, such as source code formatting, and names of variables. In one embodiment, the more sophisticated transformations that we are interested in, target either the data structures used by the application or its flow of control.

Secondly, we classify a transformation according to the kind of operation it performs on the targeted information. As can be seen from FIGS. 2d through 2g, there are several transformations that manipulate the aggregation of control or data. Such transformations typically break up abstractions created by the programmer, or construct new bogus abstractions by bundling together unrelated data or control.

Similarly, some transformations affect the ordering of data or control. In many cases the order in which two items are declared or two computations are performed has no effect on the observable behavior of the program. There can, however, be much useful information embedded in the chosen order, to the programmer who wrote the program as well as to a reverse engineer. The closer two items or events are in space or time, the higher the likelihood that they are related in one way or another. Ordering transformations try to explore this by randomizing the order of declarations or computations.

5 EVALUATING OBFUSCATION TRANSFORMATIONS

Before we can attempt to design any obfuscating transformations, we should be able to evaluate the quality of such a transformation. In this section we will attempt to classify transformations according to several criteria: how much obscurity they add to the program (e.g., potency), how difficult they are to break for a deobfuscator (e.g., resilience), and how much computational overhead they add to the obfuscated application (e.g., cost).

5.1 Measures of Potency

We will first define what it means for a program P' to be more obscure (or complex or unreadable) than a program P. Any such metric will, by definition, be relatively vague, because it must be based (in part) on human cognitive abilities.

Fortunately, we can draw upon the vast body of work in the Software Complexity Metrics branch of Software Engineering. In this field, metrics are designed with the intent to aid the construction of readable, reliable, and maintainable software. The metrics are frequently based on counting various textual properties of the source code and combining these counts into a measure of complexity. While some of the formulas that have been proposed have been derived from empirical studies of real programs, others have been purely speculative.

The detailed complexity formulas found in the metrics' literature can be used to derive general statements, such as: "if programs P and P' are identical except that P' contains more of property q than P, then P' is more complex than P." Given such a statement, we can attempt to construct a transformation that adds more of the q-property to a program, knowing that this is likely to increase its obscurity.

FIG. 7 is a table that tabulates some of the more popular complexity measures, in which E(x) is the complexity of a software component x, F is a function or method, C is a class, and P is a program. When used in a software construction project the typical goal is to minimize these measures. In contrast, when obfuscating a program we generally want to maximize the measures.

The complexity metrics allow us to formalize the concept of potency and will be used below as a measure of the usefulness of a transformation. Informally, a transformation is potent if it does a good job confusing Bob, by hiding the intent of Alice's original code. In other words, the potency of a transformation measures how much more difficult the obfuscated code is to understand (for a human) than the original code. This is formalized in the following definition:

Definition 2 (Transformation Potency) Let T be a behavior-conserving transformation, such that $P-^T->P'$ transforms a source program P into a target program P'. Let E(P) be the complexity of P, as defined by one of the metrics of FIG. 7.

$T_{pot}(P)$, the potency of T with respect to a program P, is a measure of the extent to which T changes the complexity of P. It is defined as $$T_{pot}(P)^{def}=E(P')/E(P)-1.$$

T is a potent obfuscating transformation if $T_{pot}(P)>0$.

For the purposes of this discussion, we will measure potency on a three-point scale, (low, medium, high).

The observations in Table 1 make it possible for us to list some desirable properties of a transformation T. In order for T to be a potent obfuscating transformation, it should increase overall program size ($u_1$) and introduce new classes and methods ($u^a{}_7$).

introduce new predicates ($u_2$) and increase the nesting level of conditional and looping constructs ($U_3$).

increase the number of method arguments ($U_5$) and inter-class instance variable dependencies ($u^d{}_7$).

increase the height of the inheritance tree ($u^{b,c}{}_7$)

increase long-range variable dependencies ($U_4$).

5.2 Measures of Resilience

At first glance it would seem that increasing $T_{pot}(P)$ would be trivial. To increase the $u_2$ metric, for example, all we have to do is to add some arbitrary if-statements to P:

```
main( ) {            main( ) {
S1;                  S1;
S2;         =T=>     if (5==2) S1;
                     S2; }
                     if (1>2) S2;
                     }
```

Unfortunately, such transformations are virtually useless, because they can easily be undone by simple automatic techniques. It is therefore necessary to introduce the concept of resilience, which measures how well a transformation holds up under attack from an automatic deobfuscator. For example, the resilience of a transformation T can be seen as the combination of two measures:

Programmer Effort: the amount of time required to construct an automatic deobfuscator that is able to effectively reduce the potency of T, and Deobfuscator Effort: the execution time and space required by such an automatic deobfuscator to effectively reduce the potency of T.

It is important to distinguish between resilience and potency. A transformation is potent if it manages to confuse a human reader, but it is resilient if it confuses an automatic deobfuscator.

We measure resilience on a scale from trivial to one way, as shown in FIG. 8a. One-way transformations are special, in the sense that they can never be undone. This is typically because they remove information from the program that was useful to the human programmer, but which is not necessary in order to execute the program correctly. Examples include transformations that remove formatting, and scramble variable names.

Other transformations typically add useless information to the program that does not change its observable behavior, but which increases the "information load" on a human reader. These transformations can be undone with varying degrees of difficulty.

FIG. 8b shows that deobfuscator effort is classified as either polynomial time or exponential time. Programmer effort, the work required to automate the deobfuscation of a transformation T, is measured as a function of the scope of T. This is based on the intuition that it is easier to construct counter-measures against an obfuscating transformation that only affects a small part of a procedure, than against one that may affect an entire program.

The scope of a transformation is defined using terminology borrowed from code optimization theory: T is a local transformation if it affects a single basic block of a control flow graph (CFG), it is global if it affects an entire CFG, it is inter-procedural if it affects the flow of information between procedures, and it is an interprocess transformation if it affects the interaction between independently executing threads of control.

Definition 3 (Transformation Resilience) Let T be a behavior-conserving transformation, such that $P=^T>=>P'$ transforms a source program P into a target program P'. $T_{res}(P)$ is the resilience of T with respect to a program P.

$T_{res}(P)$ is a one-way transformation if information is removed from P such that P cannot be reconstructed from P'. Otherwise, $$T_{res}{}^{def}=\text{Resilience }(T_{Deobfuscator\ effort},T_{Programmer\ effort}),$$

in which Resilience is the function defined in the matrix in FIG. 8b.

5.3 Measures of Execution Cost

Figure 2B:
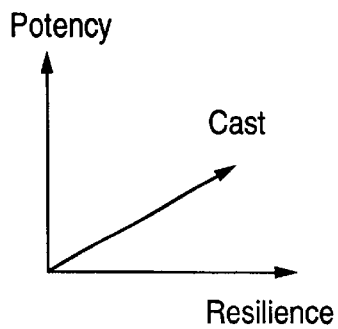

In FIG. 2b, we see that potency and resilience are two of the three components describing the quality of a transformation. The third component, the cost of a transformation, is the execution time or space penalty that a transformation incurs on an obfuscated application. We classify the cost on a four-point scale (free, cheap, costly, dear), in which each point is defined below:

Definition 5 (Transformation Cost) Let T be a behavior-conserving transformation, such that $T_{cost}(P) \in \{\text{dear, costly, cheap, free}\}$ with. $T_{cost}(P)$=free, if executing P' requires $O(1)$ more resources than P; otherwise $T_{cost}(P)$=cheap, if executing P' requires $O(n)$ more resources than P; otherwise $T_{cost}(P)$=costly, if executing P' requires $O(n^p)$, with p>1, more resources than P; otherwise $T_{cost}(P)$=dear (i.e., executing P' requires exponentially more resources than P).

It should be noted that the actual cost associated with a transformation depends on the environment in which it is applied. For example, a simple assignment statement a=5 inserted at the top-most level of a program will only incur a constant overhead. The same statement inserted inside an inner loop will have a substantially higher cost. Unless noted otherwise, we always provide the cost of a transformation as if it had been applied at the outermost nesting level of the source program.

5.4 Measures of Quality

We can now give a formal definition of the quality of an obfuscating transformation:

Definition 6 (Transformation Quality) $T_{qual}(P)$, the quality of a transformation T, is defined as the combination of the potency, resilience, and cost of T: $T_{qual}(P)=(T_{pot}(P), T_{res}(P), T_{cost}(P))$.

5.5 Layout Transformations

Before we explore novel transformations, we will briefly consider the trivial layout transformations, which, for example, are typical of current Java obfuscators such as Crema. (Hans Peter Van Vliet. Crema—The Java obfuscator. http://web.inter.nl.net/users/H.P.van. Vliet/crema.html, January 1996). The first transformation removes the source code formatting information sometimes available in Java class files. This is a one-way transformation, because once the original formatting is gone it cannot be recovered; it is a transformation with low potency, because there is very little semantic content in formatting, and no great confusion is introduced when that information is removed; finally, this is a free transformation, because the space and time complexity of the application is not affected.

Scrambling identifier names is also a one-way and free transformation. However, it has a much higher potency than formatting removal, because identifiers contain a great deal of pragmatic information.

6 CONTROL TRANSFORMATIONS

In this and the next few sections we will present a catalogue of obfuscating transformations. Some have been derived from well-known transformations used in other areas such as compiler optimization and software reengineering, others have been developed for the sole purpose of obfuscation, in accordance with one embodiment of the present invention.

In this section we will discuss transformations that attempt to obscure the control-flow of the source application. As indicated in FIG. 2f, we classify these transformations as affecting the aggregation, ordering, or computations of the flow of control. Control aggregation transformations break up computations that logically belong together or merge computations that do not. Control ordering transformations randomize the order in which computations are carried out. Computation transformations can insert new (redundant or dead) code, or make algorithmic changes to the source application.

For transformations that alter the flow of control, a certain amount of computational overhead will be unavoidable. For Alice this means that she may have to choose between a highly efficient program, and one that is highly obfuscated. An obfuscator can assist her in this trade-off by allowing her to choose between cheap and expensive transformations.

6.1 Opaque Predicates

The real challenge when designing control-altering transformations is to make them not only cheap, but also resistant to attack from deobfuscators. To achieve this, many transformations rely on the existence of opaque variables and opaque predicates. Informally, a variable V is opaque if it has some property q that is known a priori to the obfuscator, but which is difficult for the deobfuscator to deduce. Similarly, a predicate P (a Boolean expression) is opaque if a deobfuscator can deduce its outcome only with great difficulty, while this outcome is well known to the obfuscator.

Being able to create opaque variables and predicates that are difficult for a deobfuscator to crack is a major challenge to a creator of obfuscation tools, and the key to highly resilient control transformations. We measure the resilience of an opaque variable or predicate (i.e., its resistance to deobfuscation attacks) on the same scale as transformation resilience (i.e., trivial, weak, strong, full, one-way). Similarly, we measure the added cost of an opaque construct on the same scale as transformation cost (i.e., free, cheap, costly, dear).

Definition 7 (Opaque Constructs) A variable V is opaque at a point p in a program, if V has a property q at p, which is known at obfuscation time. We write this as $V^q_p$ or $V^q$ if p is clear from the context. A predicate P is opaque at p if its outcome is known at obfuscation time. We write $p^F_p (P^T_p)$ if P always evaluates to False (True) at p, and $P^?_p$ if P sometimes evaluates to True and sometimes to False. Again, p will be omitted if clear from the context. FIG. 9 shows different types of opaque predicates. Solid lines indicate paths that may sometimes be taken, and dashed lines indicate paths that will never be taken.

Below we give some examples of simple opaque constructs. These are easy to construct for the obfuscator and equally easy to crack for the deobfuscator. Section 8 provides examples of opaque constructs with much higher resilience.

6.1.1 Trivial and Weak Opaque Constructs

An opaque construct is trivial if a deobfuscator can crack it (i.e.,deduce its value) by a static local analysis. An analysis is local if it is restricted to a single basic block of a control flow graph. FIGS. 10a and 10b provide examples of (a) trivial opaque constructs and (b) weak opaque constructs.

We also consider an opaque variable to be trivial if it is computed from calls to library functions with simple, well-understood semantics. For a language like the Java™ language which requires all implementations to support a standard set of library classes, such opaque variables are easy to construct. A simple example is int $v^s$ [1,5]=random (1,5), in which random(a, b) is a library function that returns an integer in the range a . . . b. Unfortunately, such opaque variables are equally easy to deobfuscate. All that is required is for the deobfuscator-designer to tabulate the semantics of all simple library functions, and then pattern-match on the function calls in the obfuscated code.

An opaque construct is weak if a deobfuscator can crack it by a static global analysis. An analysis is global if it is restricted to a single control flow graph.

6.2 Computation Transformations

Computation Transformations fall into three categories: hide the real control-flow behind irrelevant statements that do not contribute to the actual computations, introduce code sequences at the object code level for which there exist no corresponding high-level language constructs, or remove real control-flow abstractions or introduce spurious ones.

6.2.1 Insert Dead or Irrelevant Code

The $u_2$ and $u_3$ metrics suggest that there is a strong correlation between the perceived complexity of a piece of code and the number of predicates it contains. Using opaque predicates, we can devise transformations that introduce new predicates in a program.

Figure 11:
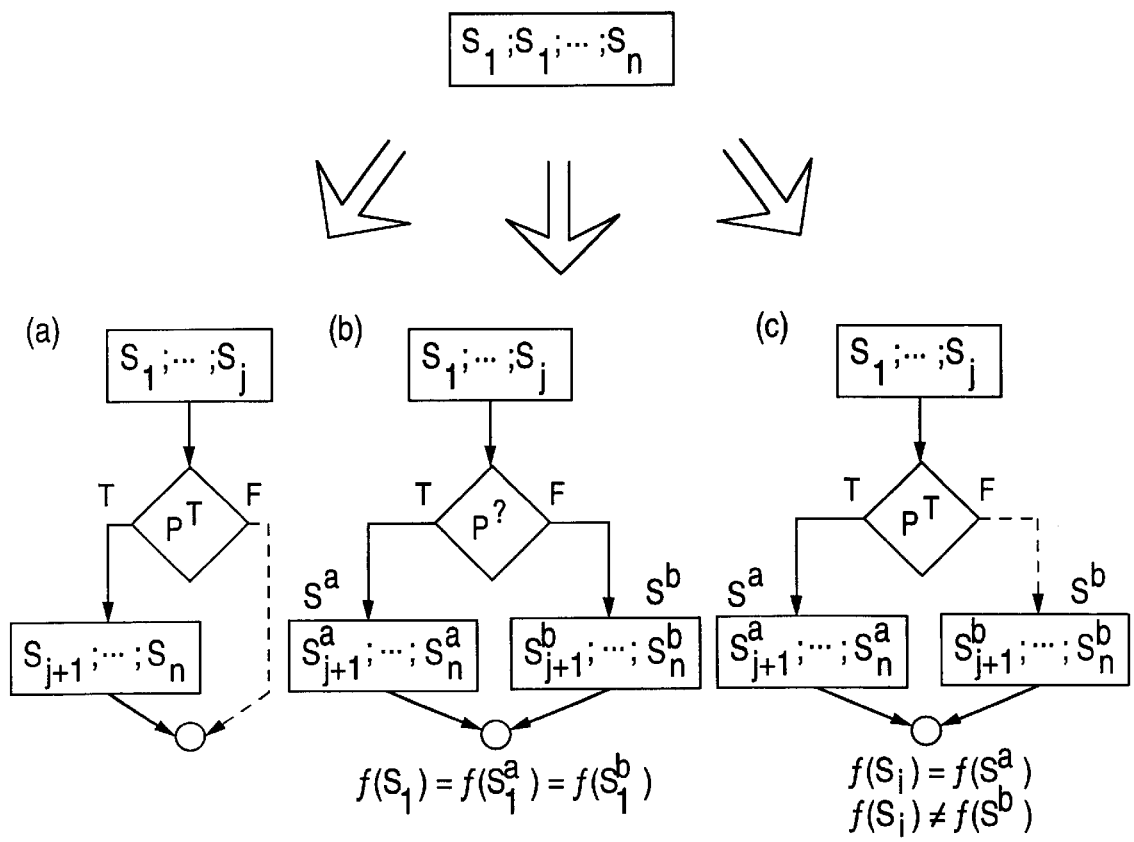
FIG. 11 illustrates an example of a computation transformation (branch insertion transformation)

Consider the basic block S=$S_1$ . . . Sn in FIG. 11. In FIG. 11a, we insert an opaque predicate $P^T$ into S, essentially splitting it in half. The $P^T$ predicate is irrelevant code, because it will always evaluate to True. In FIG. 11b, we again break S into two halves, and then proceed to create two different obfuscated versions $S^a$ and $S^b$ of the second half. $S^a$ and $S^b$ will be created by applying different sets of obfuscating transformations to the second half of S. Hence, it will not be directly obvious to a reverse engineer that $S^a$ and $S^b$ in fact perform the same function. We use a predicate $P^?$ to select between $S^a$ and $S^b$ at runtime.

FIG. 11c is similar to FIG. 11b, but this time we introduce a bug into $S^b$. The $P^T$ predicate always selects the correct version of the code, $S^a$.

6.2.2 Extend Loop Conditions

Figure 12:
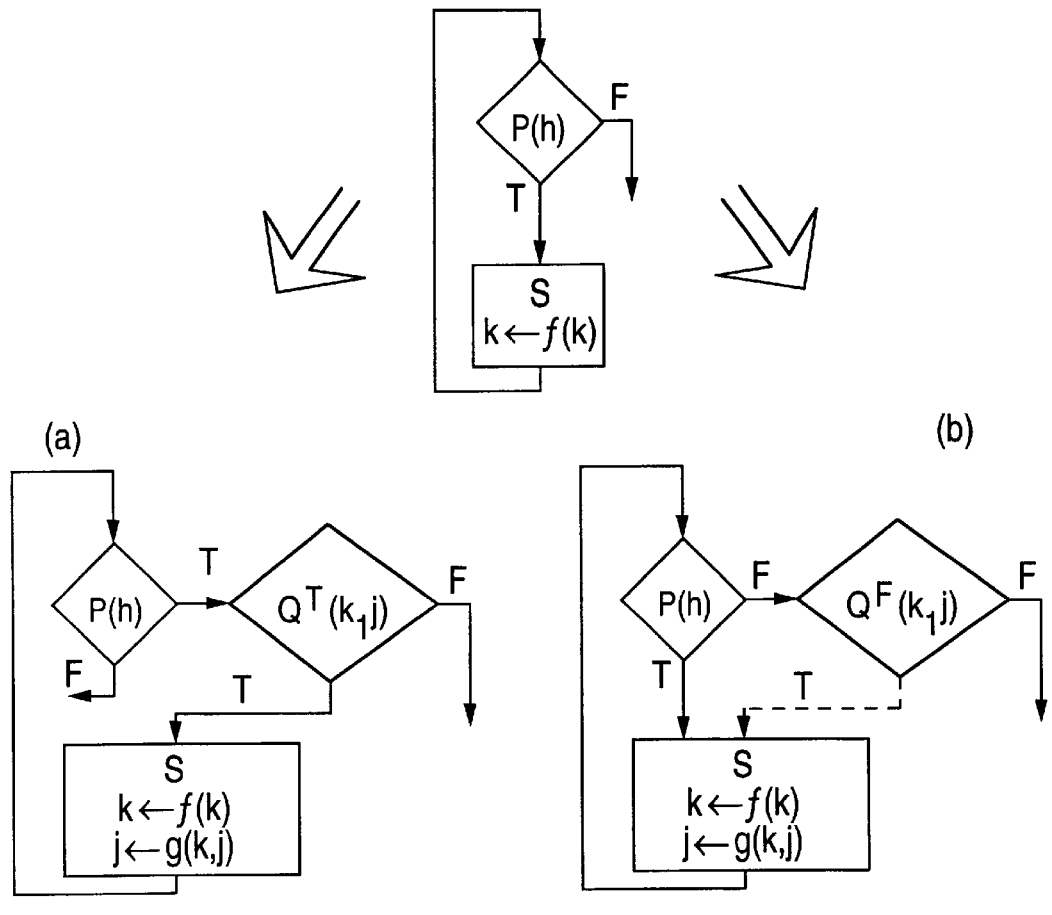
FIGS. 12a through 12d illustrate a loop condition insertion transformation.

FIG. 12 shows how we can obfuscate a loop by making the termination condition more complex. The basic idea is to extend the loop condition with a $P^T$ or $P^F$ predicate that will not affect the number of times the loop will execute. The predicate we have added in FIG. 12d, for example, will always evaluate to True because $x^2 (x+1)^2 = 0 \pmod 4$.

6.2.3 Convert a Reducible to a Non-Reducible Flow Graph

Often, a programming language is compiled to a native or virtual machine code, which is more expressive than the language itself. When this is the case, it allows us to devise language-breaking transformations. A transformation is language-breaking if it introduces virtual machine (or native code) instruction sequences that have no direct correspondence with any source language construct. When faced with such instruction sequences a deobfuscator will either have to try to synthesize an equivalent (but convoluted) source language program or give up altogether.

For example, the Java™ bytecode has a goto instruction, but the Java™ language has no corresponding goto statement. This means that the Java™ bytecode can express arbitrary control flow, whereas the Java™ language can only (easily) express structured control flow. Technically, we say that the control flow graphs produced from Java™ programs will always be reducible, but the Java™ bytecode can express non-reducible flow graphs.

Since expressing non-reducible flow graphs becomes very awkward in languages without gotos, we construct a transformation that converts a reducible flow graph to a non-reducible one. This can be done by turning a structured loop into a loop with multiple headers. For example, in FIG. 13a, we add an opaque predicate $P^F$ to a while loop, to make it appear that there is a jump into the middle of the loop. In fact, this branch will never be taken.

A Java™ decompiler would have to turn a non-reducible flow graph into one which either duplicates code or which contains extraneous Boolean variables. Alternatively, a deobfuscator could guess that all non-reducible flow graphs have been produced by an obfuscator, and simply remove the opaque predicate. To counter this we can sometimes use the alternative transformation shown in FIG. 13b. If a deobfuscator blindly removes $p^F$, the resulting code will be incorrect.

Figure 13:
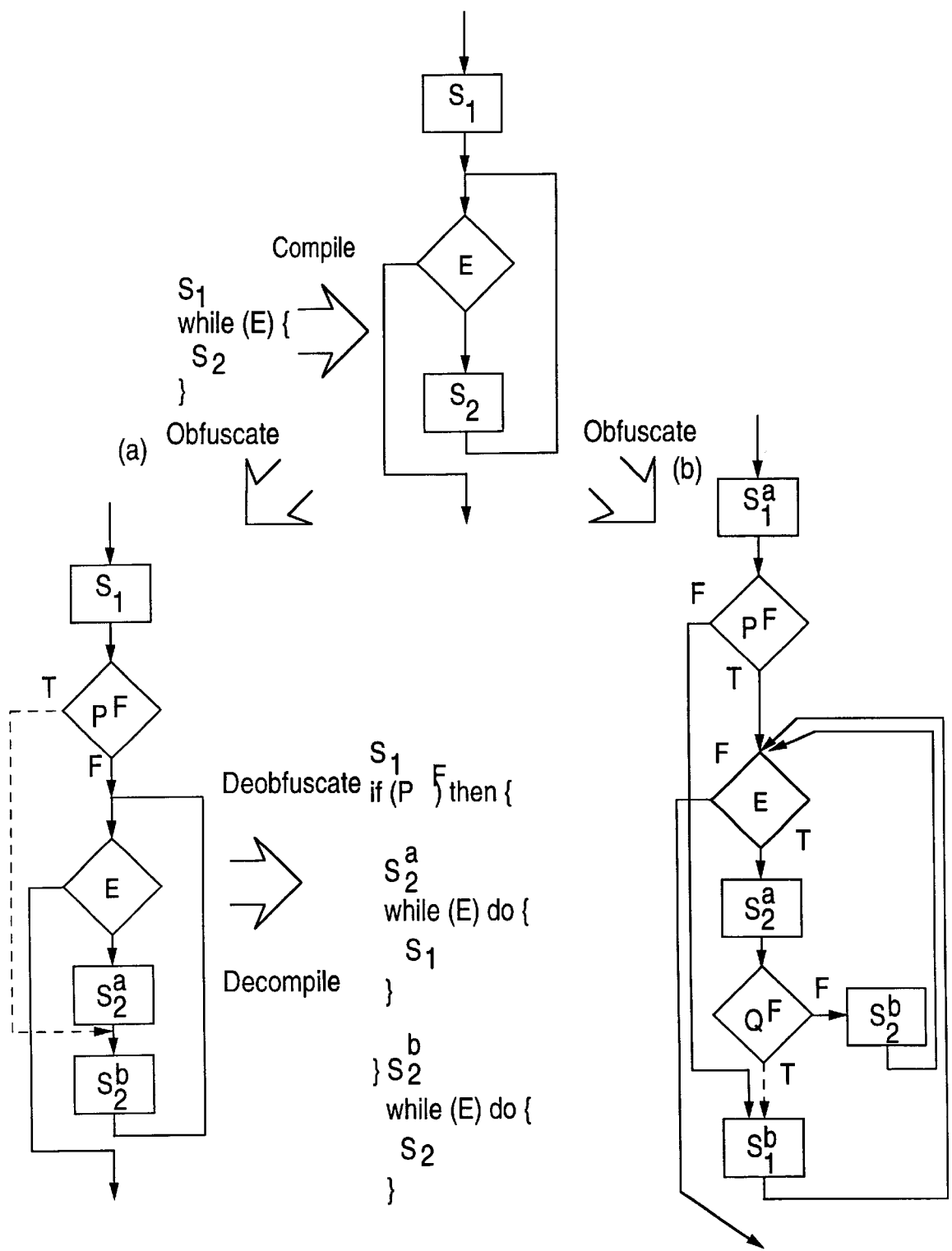
FIG. 13 illustrates a transformation that transforms reducible flowgraphs into non-reducible flowgraphs.

In particular, FIGS. 13a and 13b illustrate a transformation for transforming a Reducible flow graph to a Non-Reducible Flow graph. In FIG. 13a, we split the loop body S2 into two parts ($S^a_2$ and $S^b_2$), and insert a bogus jump to the beginning of $S^b_2$. In FIG. 13b, we also break S1 into two parts, $S^a_1$ and $S^b_1$. $S^b_1$ is moved into the loop and an opaque predicate $P^T$ ensures that $S^b_1$ is always executed before the loop body. A second predicate $Q^F$ ensures that $S^b_1$ is only executed once.

6.2.4 Remove Library Calls and Programming Idioms

Most programs written in Java rely heavily on calls to the standard libraries. Because the semantics of the library functions are well known, such calls can provide useful clues to a reverse engineer. The problem is exacerbated by the fact that references to Java library classes are always by name, and these names cannot be obfuscated.

In many cases the obfuscator will be able to counter this by simply providing its own versions of the standard libraries. For example, calls to the Java Dictionary class (which uses a hash table implementation) could be turned into calls to a class with identical behavior, but implemented as, for example, a red-black tree. The cost of this transformation is not so much in execution time, but in the size of the program.

A similar problem occurs with cliches (or patterns), common programming idioms that occur frequently in many applications. An experienced reverse engineer will search for such patterns to jump-start his understanding of an unfamiliar program. As an example, consider linked lists in Java™. The Java™ library has no standard class that provides common list operations such as insert, delete, and enumerate. Instead, most Java™ programmers will construct lists of objects in an ad hoc fashion by linking them together on a next field. Iterating through such lists is a very common pattern in Java™ programs. Techniques invented in the field of automatic program recognition (see Linda Mary Wills. Automated program recognition: a feasibility demonstration. Artificial Intelligence, 45(1–2):113–172, 1990, incorporated herein by reference) can be used to identify common patterns and replace them with less obvious ones. In the linked list case, for example, we might represent the standard list data structure with a less common one, such as cursors into an array of elements.

6.2.5 Table Interpretation

One of the most effective (and expensive) transformations is table interpretation. The idea is to convert a section of code (Java bytecode in this example) into a different virtual machine code. This new code is then executed by a virtual machine interpreter included with the obfuscated application. Obviously, a particular application can contain several interpreters, each accepting a different language and executing a different section of the obfuscated application.

Because there is usually an order of magnitude slow down for each level of interpretation, this transformation should be reserved for sections of code that make up a small part of the total runtime or which need a very high level of protection.

6.2.6 Add Redundant Operands

Once we have constructed some opaque variables we can use algebraic laws to add redundant operands to arithmetic expressions. This will increase the $u_1$ metric. Obviously, this technique works best with integer expressions where numerical accuracy is not an issue. In the obfuscated statement (1') below we make use of an opaque variable P whose value is 1. In statement (2') we construct an opaque subexpression P/Q whose value is 2. Obviously, we can let P and Q take on different values during the execution of the program, as long as their quotient is 2 whenever statement (2') is reached.

| (1) X=X+V; | $=^T=>$ | (1') $X=X+V*P^{-1}$ ; |
|---|---|---|
| (2) Z=L+1; | | (2') $Z=L+(P^{-2Q}/Q^{-P/2})/2$. |

6.2.7 Parallelize Code

Automatic parallelization is an important compiler optimization used to increase the performance of applications running on multi-processor machines. Our reasons for wanting to parallelize a program, of course, are different. We want to increase parallelism not to increase performance, but to obscure the actual flow of control. There are two possible operations available to us:

1. We can create dummy processes that perform no useful task, and
2. We can split a sequential section of the application code into multiple sections executing in parallel.

If the application is running on a single-processor machine, we can expect these transformations to have a significant execution time penalty. This may be acceptable in many situations, because the resilience of these transformations is high: static analysis of parallel programs is very difficult, because the number of possible execution paths through a program grows exponentially with the number of executing processes. Parallelization also yields high levels of potency: a reverse engineer will find a parallel program much more difficult to understand than a sequential one.

Figure 14:
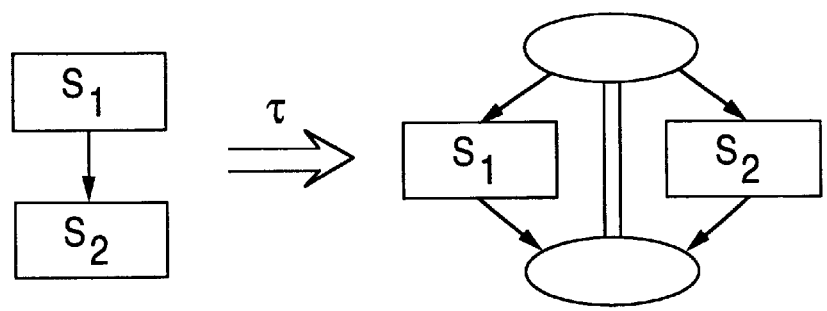
FIG. 14 shows that a section of code can be parallelized if it contains no data dependencies.

As shown in FIG. 14, a section of code can be easily parallelized if it contains no data dependencies. For example, if $S_1$ and $S_2$ are two data-independent statements they can be run in parallel. In a programming language like the Java™ language that has no explicit parallel constructs, programs can be parallelized using calls to thread (lightweight process) libraries.

Figure 15:
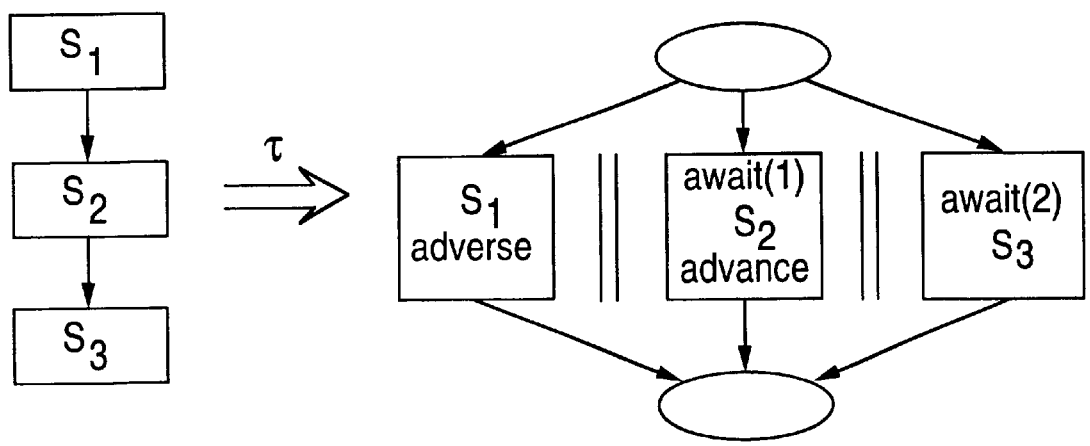
FIG. 15 shows that a section of code that contains no data dependencies can be split into concurrent threads by inserting appropriate synchronization primitives.

As shown in FIG. 15, a section of code that contains data dependencies can be split into concurrent threads by inserting appropriate synchronization primitives, such as await and advance (see Michael Wolfe. High Performance Compilers For Parallel Computing. Addison-Wesley, 1996. ISBN 0-8053-2730-4, incorporated herein by reference). Such a program will essentially be running sequentially, but the flow of control will be shifting from one thread to the next.

6.3 Aggregation Transformations

Programmers overcome the inherent complexity of programming by introducing abstractions. There is abstraction on many levels of a program, but the procedural abstraction is the most important one. For this reason, obscuring procedure and method calls can be important to the obfuscator. Below, we will consider several ways in which methods and method invocations can be obscured: inlining, outlining, interleaving, and cloning. The basic idea behind all of these is the same: (1) code that the programmer aggregated into a method (presumably because it logically belonged together) should be broken up and scattered over the program and (2) code that seems not to belong together should be aggregated into one method.

6.3.1 Inline and Outline Methods

Figure 16:
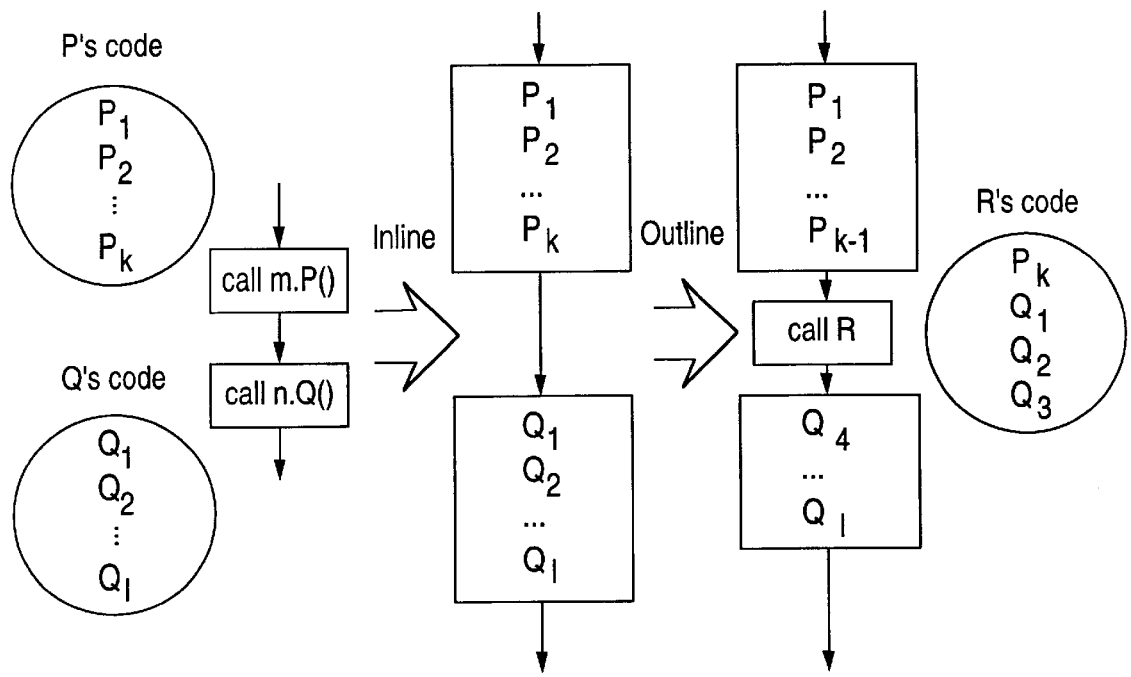
FIG. 16 shows how procedures P and Q are inlined at their call-sites and then removed from the code.

Inlining is, of course, a important compiler optimization. It is also an extremely useful obfuscation transformation, because it removes procedural abstractions from the program. Inlining is a highly resilient transformation (it is essentially one-way), because once a procedure call has been replaced with the body of the called procedure and the procedure itself has been removed, there is no trace of the abstraction left in the code. FIG. 16 shows how procedures P and Q are inlined at their call-sites, and then removed from the code.

Outlining (turning a sequence of statements into a subroutine) is a very useful companion transformation to inlining. We create a bogus procedural abstraction by extracting the beginning of Q's code and the end of P's code into a new procedure R.

Figure 17:
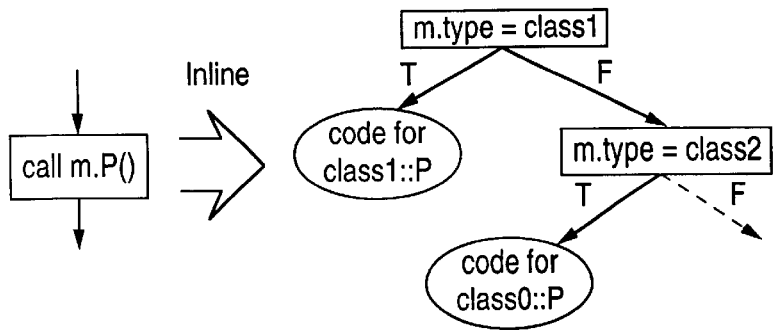
FIG. 17 illustrates inlining method calls.

In object-oriented languages such as the Java™ language, inlining may, in fact, not always be a fully one-way transformation. Consider a method invocation m.P( ). The actual procedure called will depend on the run-time type of m. In cases when more than one method can be invoked at a particular call site, we inline all possible methods (see Jeffrey Dean. Whole-Program Optimization of Object-Oriented Languages. PhD thesis, University of Washington, 1996, incorporated herein by reference) and select the appropriate code by branching on the type of m). Hence, even after inlining and removal of methods, the obfuscated code may still contain some traces of the original abstractions. For example, FIG. 17 illustrates inlining method calls. Unless we can statically determine the type of m, all possible methods to which m.P( ) could be bound must be inlined at the call site.

6.3.2 Interleave Methods

The detection of interleaved code is an important and difficult reverse engineering task.

FIG. 18 shows how we can interleave two methods declared in the same class. The idea is to merge the bodies and parameter lists of the methods and add an extra parameter (or global variable) to discriminate between calls to the individual methods. Ideally, the methods should be similar in nature to allow merging of common code and parameters. This is the case in FIG. 18, in which the first parameter of M1 and M2 have the same type.

6.3.3 Clone Methods

When trying to understand the purpose of a subroutine a reverse engineer will of course examine its signature and body. However, equally important to understanding the behavior of the routine are the different environments in which it is being called. We can make this process more difficult by obfuscating a method's call sites to make it appear that different routines are being called, when, in fact, this is not the case.

FIG. 19 shows how we can create several different versions of a method by applying different sets of obfuscating transformations to the original code. We use method dispatch to select between the different versions at runtime.

Method cloning is similar to the predicate insertion transformations in FIG. 11, except that here we are using method dispatch rather than opaque predicates to select between different versions of the code.

6.3.4 Loop Transformations

A large number of loop transformations have been designed with the intent to improve the performance of (in particular) numerical applications. See Bacon [2] for a comprehensive survey. Some of these transformations are useful to us, because they also increase the complexity metrics, which are discussed above with respect to FIG. 7. Loop Blocking, as shown in FIG. 20a, is used to improve the cache behavior of a loop by breaking up the iteration space so that the inner loop fits in the cache. Loop unrolling, as shown in FIG. 20b, replicates the body of a loop one or more times. If the loop bounds are known at compile time the loop can be unrolled in its entirety. Loop fission, as shown in FIG. 20c, turns a loop with a compound body into several loops with the same iteration space.

All three transformations increase the $u_1$ and $u_2$ metrics, because they increase the source application's total code size and number of conditions. The loop blocking transformation also introduces extra nesting, and hence also increases the $u_3$ metric.

Applied in isolation, the resilience of these transformations is quite low. It does not require much static analysis for a deobfuscator to reroll an unrolled loop. However, when the transformations are combined, the resilience rises dramatically. For example, given the simple loop in FIG. 20b, we could first apply unrolling, then fission, and finally blocking. Returning the resulting loop to its original form would require a fair amount of analysis for the deobfuscator.

6.4 Ordering Transformations

Programmers tend to organize their source code to maximize its locality. The idea is that a program is easier to read and understand if two items that are logically related are also physically close in the source text. This kind of locality works on every level of the source: for example, there is locality among terms within expressions, statements within basic blocks, basic blocks within methods, methods within classes, and classes within files. All kinds of spatial locality can provide useful clues to a reverse engineer. Therefore, whenever possible, we randomize the placement of any item in the source application. For some types of items (methods within classes, for example) this is trivial. In other cases (such as statements within basic blocks) a data dependency analysis (see David F. Bacon, Susan L. Graham, and Oliver J. Sharp. Compiler transformations for high-performance computing. ACM Computing Surveys, 26(4):345–420, December 1994. http://www.acm.org/pubs/toc/Abstracts/0360-0300/197406.html. and Michael Wolfe. High Performance Compilers For Parallel Computing. Addison-Wesley, 1996. ISBN 0-8053-2730-4, incorporated herein by reference) is performed to determine which reorderings are technically valid.

These transformations have low potency (they do not add much obscurity to the program), but their resilience is high, in many cases one-way. For example, when the placement of statements within a basic block has been randomized, there will be no traces of the original order left in the resulting code.

Ordering transformations can be particularly useful companions to the "Inline-Outline" transformation of Section 6.3.1. The potency of that transformation can be enhanced by (1) inlining several procedure calls in a procedure P, (2) randomizing the order of the statements in P, and (3) outlining contiguous sections of P's statements. This way, unrelated statements that were previously part of several different procedures are brought together into bogus procedural abstractions.

In certain cases it is also possible to reorder loops, for example by running them backwards. Such loop reversal transformations are common in high-performance compilers (David F. Bacon, Susan L. Graham, and Oliver J. Sharp. Compiler transformations for high-performance computing. ACM Computing Surveys, 26(4):345–420, December 1994. http://www.acm.org/pubs/toc/Abstracts/0360-0300/197406.html.).

7 Data Transformations

In this section we will discuss transformations that obscure the data structures used in the source application. As indicated in FIG. 2e, we classify these transformations as affecting the storage, encoding, aggregation, or ordering of the data.

7.1 Storage and Encoding Transformations

In many cases there is a "natural" way to store a particular data item in a program. For example, to iterate through the elements of an array we probably would choose to allocate a local integer variable of the appropriate size as the iteration variable. Other variable types might be possible, but they would be less natural and probably less efficient.

Furthermore, there is also often a "natural" interpretation of the bit-patterns that a particular variable can hold which is based on the type of the variable. For example, we would normally assume that a 16-bit integer variable storing the bit-pattern 0000000000001100 would represent the integer value 12. Of course, these are mere conventions and other interpretations are possible.

Obfuscating storage transformations attempt to choose unnatural storage classes for dynamic as well as static data. Similarly, encoding transformations attempt to choose unnatural encodings for common data types. Storage and encoding transformations often go hand-in-hand, but they can sometimes be used in isolation.

7.1.1 Change Encoding

As a simple example of an encoding transformation we will replace an integer variable i by $i_0 = c_1 * i + c_2$, where $c_1$ and $c_2$ are constants. For efficiency, we could choose $c_1$ to be a power of two. In the example below, we let $c_1 = 8$ and $c_2 = 3$:

```
{                    =T=>    {
int i=1;                     int i=11;
while (i < 1000)             while (i < 8003)
   ...A[i]...;                  ..A[(i-3)/8]...;
   i++;                         i+=8;
}                            }
```

Obviously, overflow (and, in case of floating point variables, accuracy) issues need to be addressed. We could either determine that because of the range of the variable (the range can be determined using static analysis techniques or by querying the user) in question no overflow will occur, or we could change to a larger variable type.

There will be a trade-off between resilience and potency on one hand, and cost on the other. A simple encoding function such as $i_0 = c_1 + i + c_2$ in the example above, will add little extra execution time but can be deobfuscated using common compiler analysis techniques (Michael Wolfe. High Performance Compilers For Parallel Computing. Addison-Wesley, 1996. ISBN 0-8053-2730-4. and David F. Bacon, Susan L. Graham, and Oliver J. Sharp. Compiler transformations for high-performance computing. ACM Computing Surveys, 26(4):345–420, December 1994. http://www.acm.org/pubs/toc/Abstracts/0360-0300/197406.html).

7.1.2 Promote Variables

There are a number of simple storage transformations that promote variables from a specialized storage class to a more general class. Their potency and resilience are generally low, but used in conjunction with other transformations they can be quite effective. For example, in Java, an integer variable can be promoted to an integer object. The same is true of the other scalar types which all have corresponding "packaged" classes. Because Java™ supports garbage collection, the objects will be automatically removed when they are no longer referenced. Here is an example:

```
{                          {
int I=1;                   int i = new int(1);
while (i < 9)  =T=>        while (i.value < 9)
   ...A[i]...;                ...A[i.value]...;
   i++;                       i.value++;
}                          }
```

It is also possible to change the lifetime of a variable. The simplest such transform turns a local variable into a global one which is then shared between independent procedure invocations. For example, if procedures P and Q both reference a local integer variable, and P and Q cannot both be active at the same time (unless the program contains threads, this can be determining by examining the static call graph) then the variable can be made global and shared between them:

```
void P() {           int C;
int I; ...I...       void P()
}                       ...C...
                        56
void Q() {  =T=>     while (i.value<9)
int k;...k...           ...C...
}           }
```

This transformation increases the $u_5$ metric, because the number of global data structures referenced by P and Q is increased.

7.1.3 Split Variables

Boolean variables and other variables of restricted range can be split into two or more variables. We will write a variable V split into k variables $p_1, \ldots, p_k$ as $V=[p_1, \ldots, p_k]$. Typically, the potency of this transformation will grow with k. Unfortunately, so will the cost of the transformation, so we usually restrict k to 2 or 3.

To allow a variable V of type T to be split into two variables p and q of type U requires us to provide three pieces of information: (1) a function f(p; q) that maps the values of p and q into the corresponding value of V, (2) a function g(V) that maps the value of V into the corresponding values of p and q, and (3) new operations (corresponding to the primitive operations on values of type T) cast in terms of operations on p and q. In the remainder of this section we will assume that V is of type Boolean, and p and q are small integer variables.

FIG. 21a shows a possible choice of representation for split Boolean variables. The table indicates that if V has been split into p and q, and if, at some point in the program, p=q=0 or p=q=1, then that corresponds to V being False. Similarly, p=0, q=1 or p=1, q=0 corresponds to True.

Given this new representation, we have to devise substitutions for various built-in Boolean operations (e.g., &, or). One approach is to provide a run-time lookup table for each operator. Tables for "AND" and "OR" are shown in FIGS. 21c and 21d, respectively. Given two Boolean variables $V_1=[p, q]$ and $V_2=[r, s]$, $V_1 \& V_2$ is computed as AND[2p+q, 2r+s].

In FIG. 21e, we show the result of splitting three Boolean variables A=[a1,a2], B=[b1,b2], and C=[c1,c2]. An interesting aspect of our chosen representation is that there are several possible ways to compute the same Boolean expression. Statements (3') and (4') in FIG. 21e, for example, look different, although they both assign False to a variable. Similarly, while statements (5') and (6') are completely different, they both compute A & B.

The potency, resilience, and cost of this transformation all grow with the number of variables into which the original variable is split. The resilience can be further enhanced by selecting the encoding at run-time. In other words, the run-time look-up tables of FIGS. 21b through 21d are not constructed at compile-time (which would make them susceptible to static analyses) but by algorithms included in the obfuscated application. This, of course, would prevent us from using in-line code to compute primitive operations, as done in statement (6') in FIG. 21e.

7.1.4 Convert Static to Procedural Data

Static data, particularly character strings, contain much useful pragmatic information to a reverse engineer. A technique for obfuscating a static string is to convert it into a program that produces the string. The program—which could be a DFA or a Trie traversal—could possibly produce other strings as well.

As an example, consider a function G of FIG. 22, which is constructed to obfuscate the strings "AAA", "BAAAA", and "CCB". The values produced by G are G(1)="AAA", G(2)="BAAAA", G(3)=G(5)="CCB", and G(4)="XCB" (which is not actually used in the program). For other argument values, G may or may not terminate.

Aggregating the computation of all static string data into just one function is, of course, highly undesirable. Much higher potency and resilience is achieved if the G-function was broken up into smaller components that were embedded into the "normal" control flow of the source program.

It is interesting to note that we can combine this technique with the table interpretation transformation of Section 6.2.5. The intent of that obfuscation is to convert a section of Java bytecode into code for another virtual machine. The new code will typically be stored as static string data in the obfuscated program. For even higher levels of potency and resilience, however, the strings could be converted to programs that produce them, as discussed above.

7.2 Aggregation Transformations

In contrast to imperative and functional languages, object-oriented languages are more data-oriented than control-oriented. In other words, in an object-oriented program, the control is organized around the data structures, rather than the other way around. This means that an important part of reverse-engineering an object-oriented application is trying to restore the program's data structures. Conversely, it is important for an obfuscator to try to hide these data structures.

In most object-oriented languages, there are just two ways to aggregate data: in arrays and in objects. In the next three sections we will examine ways in which these data structures can be obfuscated.

7.2.1 Merge Scalar Variables

Two or more scalar variables $V_1 \ldots V_k$ can be merged into one variable $V_M$, provided the combined ranges of $V_1 \ldots V_k$ will fit within the precision of $V_M$. For example, two 32-bit integer variables could be merged into one 64-bit variable. Arithmetic on the individual variables would be transformed into arithmetic on $V_M$. As a simple example, consider merging two 32-bit integer variables X and Y into a 64-bit variable Z. Using the merging formula, $$Z(X, Y) = 2^{32} * Y + X$$

we get the arithmetic identities in FIG. 23a. Some simple examples are given in FIG. 23b.

In particular, FIG. 23 shows merging two 32-bit variables X and Y into one 64-bit variable Z. Y occupies the top 32 bits of Z, X the bottom 32 bits. If the actual range of either X or Y can be deduced from the program, less intuitive merges could be used. FIG. 23a gives rules for addition and multiplication with X and Y. FIG. 23b shows some simple examples. The example could be further obfuscated, for example by merging (2') and (3') into Z+=47244640261.

The resilience of variable merging is quite low. A deobfuscator only needs to examine the set of arithmetic operations being applied to a particular variable in order to guess that it actually consists of two merged variables. We can increase the resilience by introducing bogus operations that could not correspond to any reasonable operations on the individual variables.

In the example in FIG. 23b, we could insert operations that appear to merge Z's two halves, for example, by rotation: if ($P^F$) Z=rotate(Z,5)

A variant of this transformation is to merge $V_1 \ldots V_k$ into an array $V_A = 1 \ldots k$
$V_1 \ldots V_k$ of the appropriate type. If $V_1 \ldots V_k$ are object reference variables, for example, then the element type of VA can be any class that is higher in the inheritance hierarchy than any of the types of $V_1 \ldots V_k$.

7.2.2 Restructure Arrays

A number of transformations can be devised for obscuring operations performed on arrays: for example, we can split an array into several sub-arrays, merge two or more arrays into one array, fold an array (increasing the number of dimensions), or flatten an array (decreasing the number of dimensions).

FIG. 24 shows some examples of array restructuring. In statements (1–2) an array A is split up into two sub-arrays A1 and A2. A1 holds the elements of A that have even indices, and A2 holds the elements with odd indices.

Statements (3–4) of FIG. 24 show how two integer arrays B and C can be interleaved into a resulting array BC. The elements from B and C are evenly spread over the resulting array.

Statements (6–7) demonstrate how a one-dimensional array D can be folded into a two-dimensional array D1. Statements (8–9), finally, demonstrate the reverse transformation: a two-dimensional array E is flattened into a one-dimensional array E1.

Array splitting and folding increase the $u_6$ data complexity metric. Array merging and flattening, on the other hand, seem to decrease this measure. While this may seem to indicate that these transformations have only marginal or even negative potency, this, in fact, is deceptive. The problem is that the complexity metrics of FIG. 7 fail to capture an important aspect of some data structure transformations: they introduce structure where there was originally none or they remove structure from the original program. This can greatly increase the obscurity of the program. For example, a programmer who declares a two-dimensional array does so for a purpose: the chosen structure somehow maps cleanly to the data that is being manipulated. If that array is folded into a one-dimensional structure, a reverse engineer will have been deprived of much valuable pragmatic information.

7.2.3 Modify Inheritance Relations

In current object-oriented language such as the Java™ language, the main modularization and abstraction concept is the class. Classes are essentially abstract data types that encapsulate data (instance variables) and control (methods). We write a class as C=(V, M), where V is the set of C's instance variables and M its methods.

In contrast to the traditional notion of abstract data types, two classes $C_1$ and $C_2$ can be composed by aggregation ($C_2$ has an instance variable of type $C_1$) as well as by inheritance ($C_2$ extends $C_1$ by adding new methods and instance variables). We write inheritance as $C_2=C_1 \cup C'_2$. $C_2$ is said to inherit from $C_1$, its super- or parent class. The U operator is the function that combines the parent class with the new properties defined in $C'_2$. The exact semantics of U depends on the particular programming language. In languages such as Java, U is usually interpreted as union when applied to the instance variables and as overriding when applied to methods.

Figure 25A:
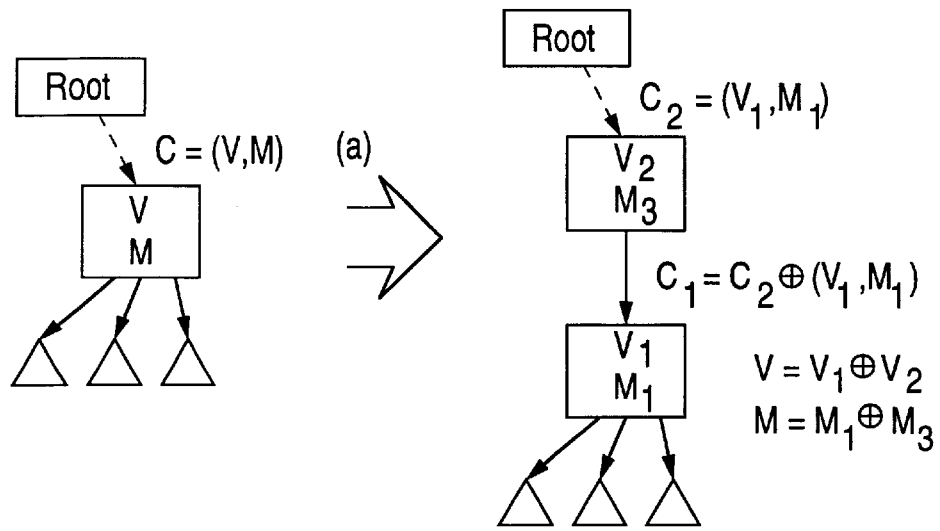
FIG. 25 illustrates modifications of an inheritance hierarchy.
Figure 25B:
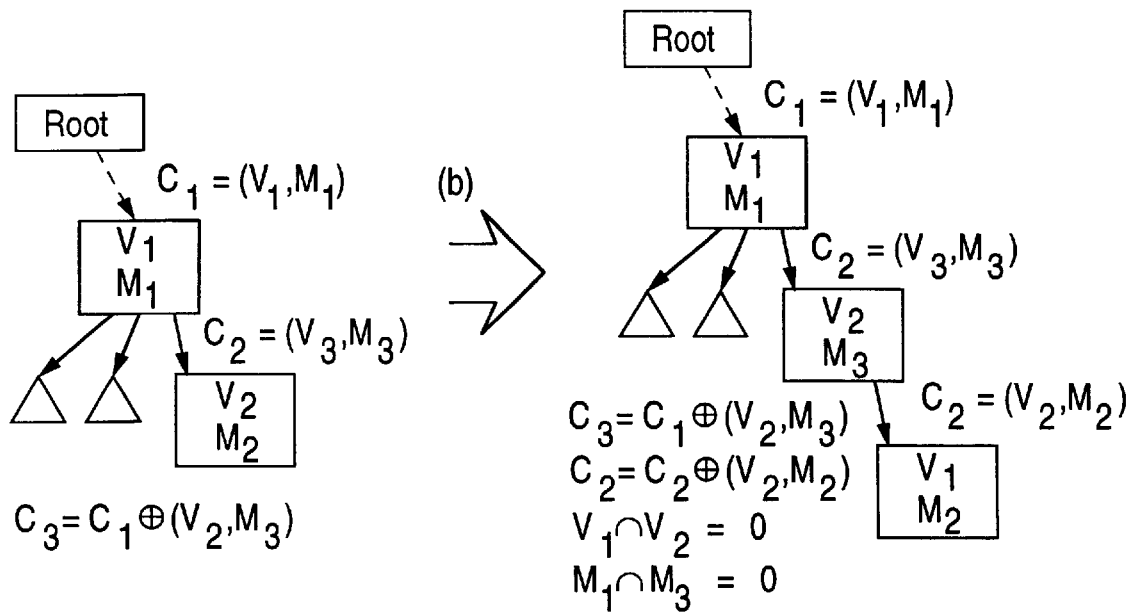

According to metric $U_7$, the complexity of a class $C_1$ grows with its depth (distance from the root) in the inheritance hierarchy and the number of its direct descendants. For example, there are two basic ways in which we can increase this complexity: we can split up (factor) a class as shown in FIG. 25a or insert a new, bogus, class as shown in FIG. 25b.

A problem with class factoring is its low resilience; there is nothing stopping a deobfuscator from simply merging the factored classes. To prevent this, factoring and insertion are normally combined as shown in FIG. 25d. Another way of increasing the resilience of these types of transformations is to make sure that new objects are created of all introduced classes.

Figure 25C:
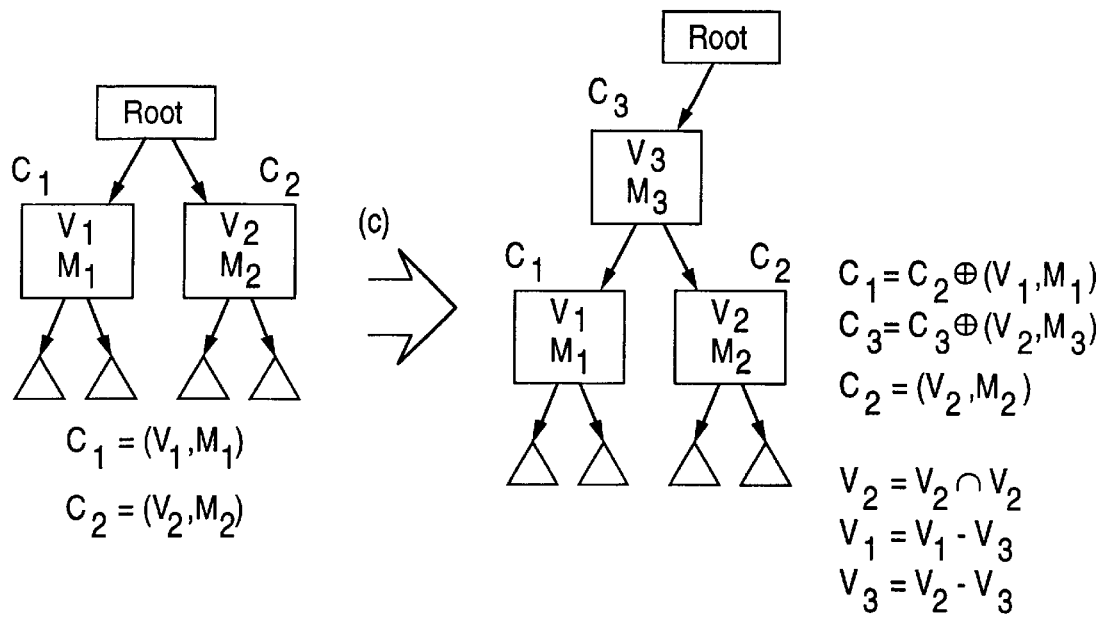
Figure 25D:
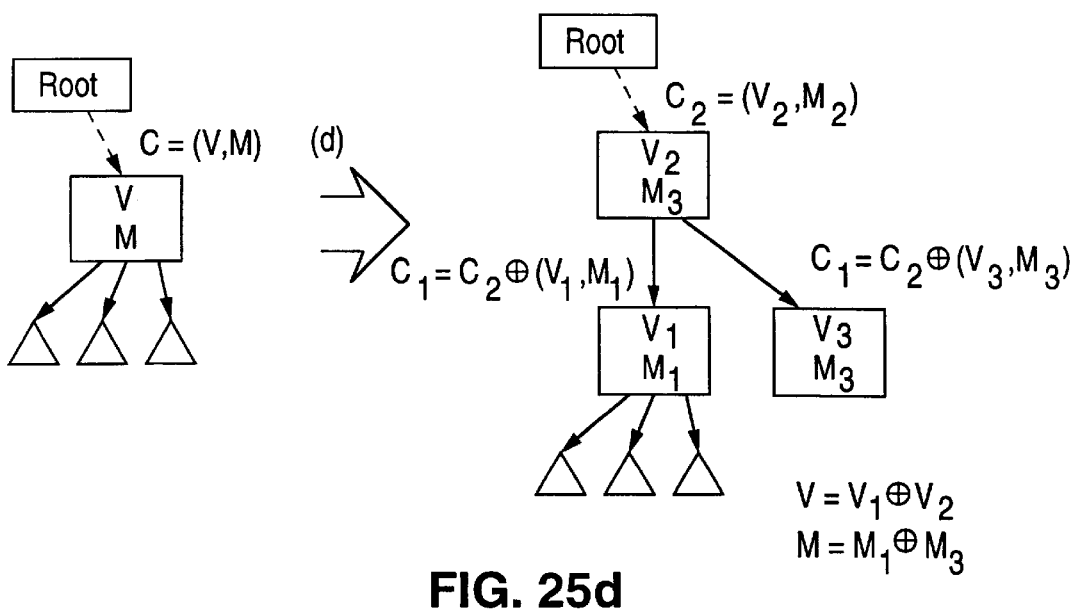

FIG. 25c shows a variant of class insertion, called false refactoring. Refactoring is a (sometimes automatic) technique for restructuring object-oriented programs whose structure has deteriorated (see William F. Opdyke and Ralph E. Johnson. Creating abstract superclasses by refactoring. In Stan C. Kwasny and John F. Buck, editors, Proceedings of the 21st Annual Conference on Computer Science, pages 66–73, New York, N.Y., USA, February 1993. ACM Press. ftp://st.cs.uiuc.edu/pub/papers/refactoring/refact oring-superclasses.ps, incorporated herein by reference). Refactoring is a two-step process. First, it is detected that two, apparently independent classes, in fact implement similar behavior. Secondly, features common to both classes are moved into a new (possibly abstract) parent class. False refactoring is a similar operation, only it is performed on two classes $C_1$ and $C_2$ that have no common behavior. If both classes have instance variables of the same type, these can be moved into the new parent class $C_3$. $C_3$'s methods can be buggy versions of some of the methods from $C_1$ and $C_2$.

7.3 Ordering Transformations

In Section 6.4 we showed that (when possible) randomizing the order in which computations are performed is a useful obfuscation. Similarly, it is useful to randomize the order of declarations in the source application.

Particularly, we randomize the order of methods and instance variables within classes and formal parameters within methods. In the latter case, the corresponding actuals will of course have to be reordered as well. The potency of these transformations is low and the resilience is one-way.

In many cases it will also be possible to reorder the elements within an array. Simply put, we provide an opaque encoding function f(i) which maps the i:th element in the original array into its new position of the reordered array:

```
{                              {
int i=1, A[1000];              int i=1, A[1000];
while (i < 1000)    =T=>       while (i < 1000)
   ...A[i]...;                    ...A[f(i)]...;
   i++;                           i++;
}                              }
```

8 OPAQUE VALUES AND PREDICATES

As we have seen, opaque predicates are the major building block in the design of transformations that obfuscate control flow. In fact, the quality of most control transformations is directly dependent on the quality of such predicates.

In Section 6.1 we gave examples of simple opaque predicates with trivial and weak resilience. This means that the opaque predicates can be broken (an automatic deobfuscator could determine their value) using local or global static analysis. Obviously, we generally require a much higher resistance to attack. Ideally, we would like to be able to construct opaque predicates that require worst case exponential time (in the size of the program) to break but only polynomial time to construct. In this section we will present two such techniques. The first one is based on aliasing and the second is based on lightweight processes.

8.1 Opaque Constructs Using Objects and Aliases

Inter-procedural static analysis is significantly complicated whenever there is a possibility of aliasing. In fact, precise, flow-sensitive alias analysis is undecidable in languages with dynamic allocation, loops, and if-statements.

In this section we will exploit the difficulty of alias analysis to construct opaque predicates that are cheap and resilient to automatic deobfuscation attacks.

8.2 Opaque Constructs Using Threads

Parallel programs are more difficult to analyze statically than their sequential counterparts. The reason is their interleaving semantics: n statements in a parallel region PAR $S_1$, $S_2$, ... $S_n$, ENDPAR can be executed in n! different ways. In spite of this, some static analyses over parallel programs can be performed in polynomial time [18], while others require all n! interleavings to be considered.

In Java, parallel regions are constructed using lightweight processes known as threads. Java threads have (from our point of view) two very useful properties: (1) their scheduling policy is not specified strictly by the language specification and will hence depend on the implementation, and (2) the actual scheduling of a thread will depend on asynchronous events, such as generated by user interaction, and network traffic. Combined with the inherent interleaving semantics of parallel regions, this means that threads are very difficult to analyze statically.

We will use these observations to create opaque predicates (see FIG. 32) that will require worst-case exponential time to break. The basic idea is very similar to the one used in Section 8.2: a global data structure V is created and occasionally updated, but kept in a state such that opaque queries can be made. The difference is that V is updated by concurrently executing threads.

Figure 26:
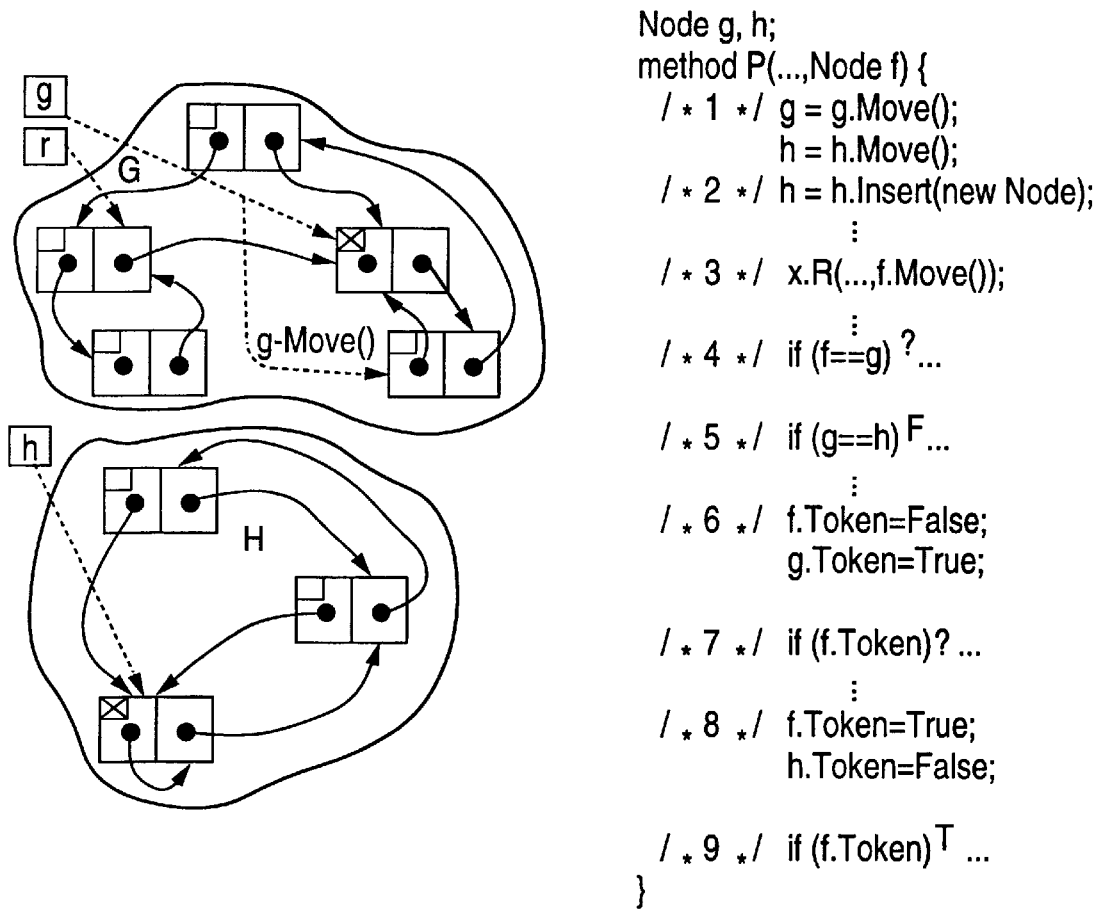
FIG. 26 illustrates opaque predicates constructed from objects and aliases.

Obviously, V can be a dynamic data structure such as the one created in FIG. 26. The threads would randomly move the global pointers g and h around in their respective components, by asynchronously executing calls to move and insert. This has the advantage of combining data races with interleaving and aliasing effects, for very high degrees of resilience.

Figures 27, 28:
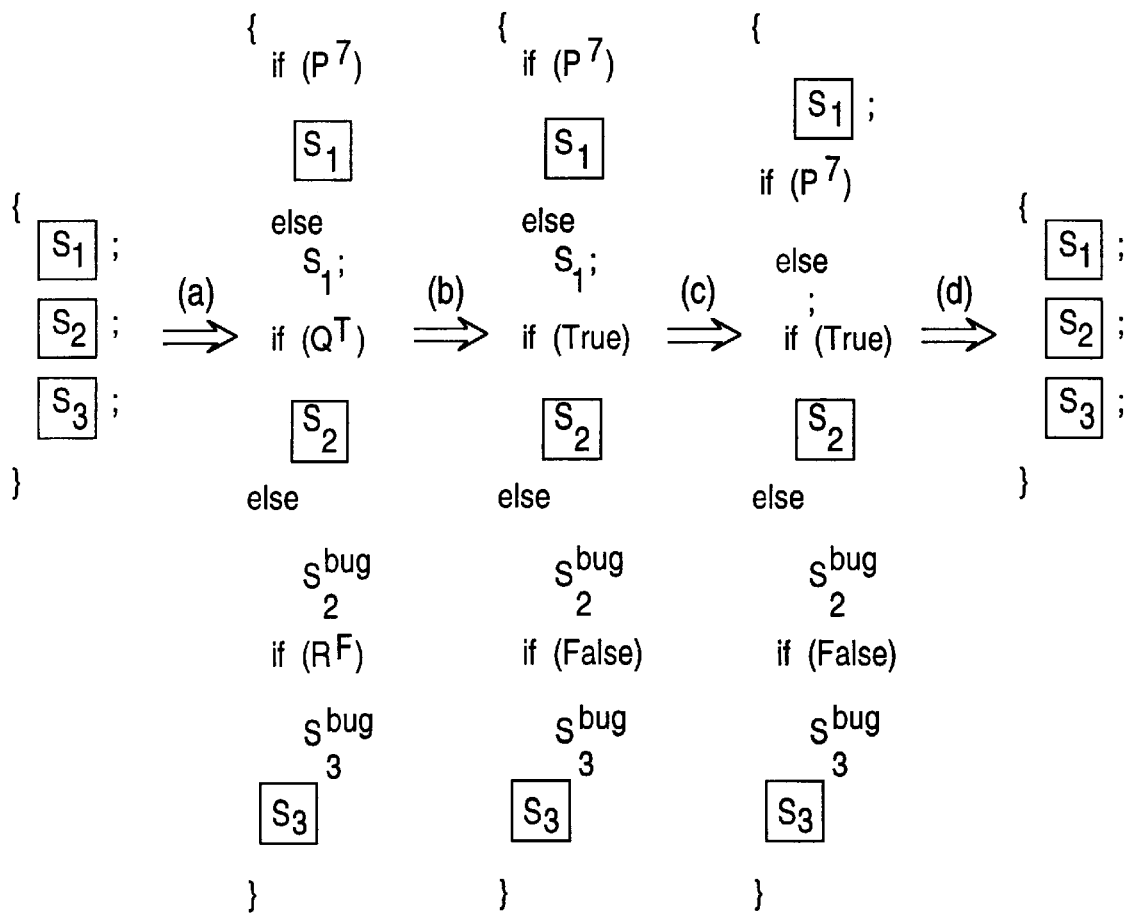
FIG. 27 provides an example of opaque constructs using threads.

In FIG. 27, we illustrate these ideas with a much simpler example where V is a pair of global integer variables X and Y. It is based on the well-known fact from elementary number theory that, for any integers x and y, $7y^2-1$ does not equal $x^2$.

9 DEOBFUSCATION AND PREVENTIVE TRANSFORMATIONS

Many of our obfuscating transformations (particularly the control transformations of Section 6.2) can be said to embed a bogus program within a real program. In other words, an obfuscated application really consists of two programs merged into one: a real program which performs a useful task and a bogus program which computes useless information. The sole purpose of the bogus program is to confuse potential reverse engineers by hiding the real program behind irrelevant code.

The opaque predicate is the main device the obfuscator has at its disposal to prevent the bogus inner program from being easily identified and removed. For example, in FIG. 28a, an obfuscator embeds bogus code protected by opaque predicates within three statements of a real program. A deobfuscator's task is to examine the obfuscated application and automatically identify and remove the inner bogus program. To accomplish this, the deobfuscator must first identify and then evaluate opaque constructs. This process is illustrated in FIGS. 28b through 28d.

Figure 29:
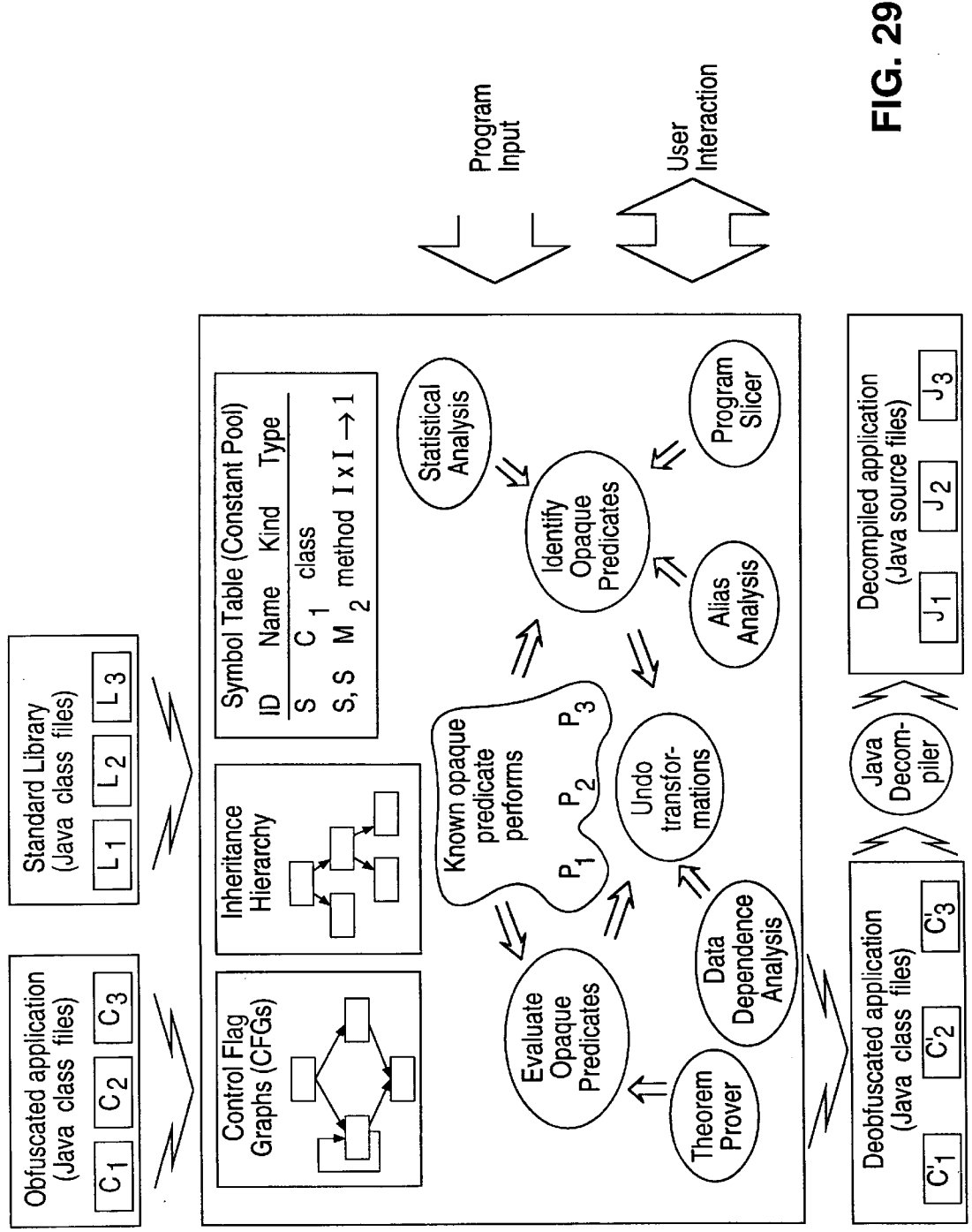
FIG. 29 shows an architecture of a Java™ deobfuscation tool.

FIG. 29 shows the anatomy of a semi-automatic deobfuscation tool. It incorporates a number of techniques that are well known in the reverse engineering community. In the remainder of this section we will briefly review some of these techniques and discuss various counter-measures (so called preventive transformations) that an obfuscator can employ to make deobfuscation more difficult.

9.1 Preventive Transformations

Preventive transformations, which are discussed above with respect to FIG. 2g, are quite different in flavor from control or data transformations. In contrast to these, their main goal is not to obscure the program to a human reader. Rather, they are designed to make known automatic deobfuscation techniques more difficult (inherent preventive transformations), or to explore known problems in current deobfuscators or decompilers (targeted preventive transformations).

9.1.1 Inherent Preventive Transformations

Inherent preventive transformations will generally have low potency and high resilience.

Most importantly, they will have the ability to boost the resilience of other transformations. As an example, assume that we have reordered a for-loop to run backwards, as suggested in section 6.4. We were able to apply this transformation only because we could determine that the loop had no loop-carried data dependencies. Naturally, there is nothing stopping a deobfuscator from performing the same analysis and then returning the loop to forward execution. To prevent this, we can add a bogus data dependency to the reversed loop:

```
{                   {
for(i=1;i<=10;i++)  =T=>   int B[50];
   A[i]=i                  for(i=10;i<=1; i --)
}                             A[i]=i;
                              B[i]+=B [i*i/2]
                        }
```

The resilience this inherent preventive transformation adds to the loop reordering transformation depends on the complexity of the bogus dependency and the state-of-the-art in dependency analysis [36].

9.1.2 Targeted Preventive Transformations

As an example of a targeted preventive transformation, consider the HoseMocha program (Mark D. LaDue. HoseMocha. http://www.xynyx.demon.nl/java/HoseMocha.java, January 1997). It was designed specifically to explore a weakness in the Mocha (Hans Peter Van Vliet. Mocha—The Java decompiler. http://web.inter.nl.net/users/H. P.van.Vliet/mocha.html, January 1996) decompiler. HoseMocha inserts extra instructions after every return-statement in every method in the source program. This transformation has no effect on the behavior of the application, but it is enough to make Mocha crash.

9.2 Identifying and Evaluating Opaque Constructs

The most difficult part of deobfuscation is identifying and evaluating opaque constructs. Note that identification and evaluation are distinct activities. An opaque construct can be local (contained within a single basic block), global (contained within a single procedure), or inter-procedural (distributed throughout the entire program). For example, if $(x*x==(7^F*y*y-1))$ is a local opaque predicate, whereas R=X*X; ... ; S=7*y*y-1; ... ; if $(R==S^F)$ ... is global. If the computation of R and S were performed in different procedures, the construct would be inter-procedural. Obviously, identification of a local opaque predicate is easier than identification of an inter-procedural one.

9.3 Identification by Pattern Matching

A deobfuscator can use knowledge of the strategies employed by known obfuscators to identify opaque predicates. A designer of a deobfuscator could examine an obfuscator (either by decompiling it or simply by examining the obfuscated code it generates) and construct pattern-matching rules that can identify commonly used opaque predicates. This method will work best for simple local predicates, such as $x*x==(7*y*y-1)$ or random $(1^F,5)<0$ To thwart attempts at pattern matching, the obfuscator should avoid using canned opaque constructs. It is also important to choose opaque constructs that are syntactically similar to the constructs used in the real application.

9.4 Identification by Program Slicing

A programmer will generally find the obfuscated version of a program more difficult to understand and reverse engineer than the original one. The main reasons are that in the obfuscated program (a) live "real" code will be interspersed with dead bogus code, and (b) logically related pieces of code will have been broken up and dispersed over the program. Program slicing tools can be used by a reverse engineer to counter these obfuscations. Such tools can interactively aid the engineer to decompose a program into manageable chunks called slices. A slice of a program P with respect to a point p and a variable v consists of all the statements of P that could have contributed to v's value at p. Hence, a program slicer would be able to extract from the obfuscated program the statements of the algorithm that computes an opaque variable v, even if the obfuscator has dispersed these statements over the entire program.

There are several strategies available to an obfuscator to make slicing a less useful identification tool: Add parameter aliases A parameter alias is two formal parameters (or a formal parameter and a global variable) that refer to the same memory location. The cost of precise inter-procedural slicing grows with the number of potential aliases in a program, which in turn grows exponentially with the number of formal parameters. Hence, if the obfuscator adds aliased dummy parameters to a program it will either substantially slow down the slicer (if precise slices are required), or force the slicer to produce imprecise slices (if fast slicing is required).

Add variable dependencies, as popular slicing tools such as Unravel (James R. Lyle, Dolorres R. Wallace, James R. Graham, Keith B. Gallagher, Joseph P. Poole, and David W Binkley. Unravel: A CASE tool to assist evaluation of high integrity software. Volume 1: Requirements and design. Technical Report NIS-TIR 5691, U.S. Department of Commerce, August 1995) work well for small slices, but will sometimes require excessive time to compute larger ones. For example, when working on a 4000 line C program, Unravel in some cases required over 30 minutes to compute a slice. To force this behavior, the obfuscator should attempt to increase slice sizes, by adding bogus variable dependencies. In the example below, we have increased the size of the slice computing x by adding two statements which apparently contribute to x's value, but which, in fact, do not.

```
main( )    {        =T=>      main( ) {
int x=1;                      int x=1;
x = x * 3;                        if (PF) x++;
}                                 x = x + V0 ;
                                  x = x * 3;
                              }
```

9.5 Statistical Analysis

A deobfuscator can instrument an obfuscated program to analyze the outcome of all predicates. We will call any deobfuscation method that examines the run-time characteristics of an obfuscated application in this way, Statistical Analysis. The deobfuscator would alert the reverse engineer to any predicate that always returns the same truth value over a large number of test runs, because they may turn out to be an opaque $P^T$ ($P^F$) predicate. The deobfuscator could not blindly replace such predicates with True (False), because this would be too dangerous. Many applications will contain "real" predicates that check for conditions that only happen under exceptional circumstances, and to the deobfuscator they will appear to behave identically to an opaque predicate. As an example, consider pif (Leap Year) . . . .

Figure 30:
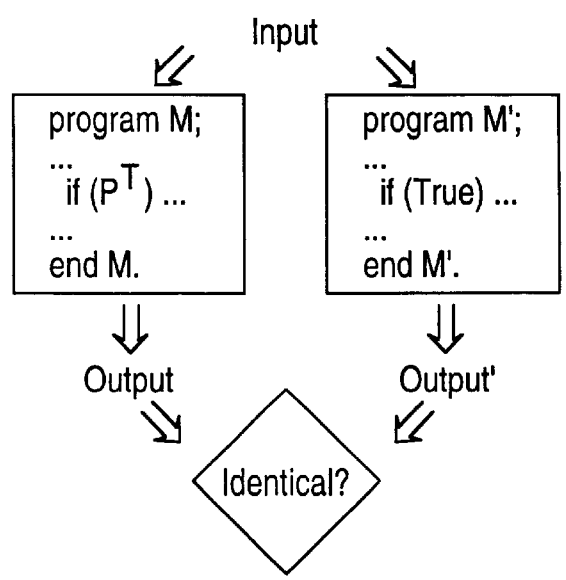
FIG. 30 shows an example of statistical analysis used for evaluation.

Statistical analysis can also be used for evaluation. When a potential opaque predicate (e.g., $P^T$) in a program M has been identified, we guess its value (True), and make a version M' of the obfuscated program where the opaque predicate has been replaced by the guessed value. We then run M and M' in parallel on the same input, and compare to see that they produce identical output. If the outputs are the same, we can conclude that the predicate was part of the bogus, not the real, application, as shown in FIG. 30.

We have to make sure that our chosen inputs adequately cover all paths in the program. Again, if the program contains paths that are rarely taken (if (Leap Year) . . . ) this will be difficult. Furthermore, generating large numbers of correct input/output data is very difficult, particularly when internal structure of the application is unknown, or the input is entered (as is often the case with Java programs) through a complex graphical user interface.

To prevent identification by statistical analysis, the obfuscator may choose to favor transformations that insert $P^?$ predicates (such as the one shown in FIG. 11b) over those that insert $P^T$ or $P^F$ predicates.

Another possible counter-measure against statistical analysis is to design opaque predicates in such a way that several predicates have to be cracked at the same time. One way of doing this is to let the opaque predicates have side-effects. In the example below the obfuscator has determined (through some sort of static flow analysis) that statements $S_1$ and $S_2$ must always execute the same number of times. The statements are obfuscated by introducing opaque predicates which are calls to functions $Q_1$ and $Q_1$. $Q_1$ and $Q_2$ increment and decrement a global variable k:

```
{         =T=>   {
S1;              int k=0;
S2;              bool Q1 (x) {
}                  k+=2^31 ; return (pT1 ) }
                 bool Q2 (x) {
                   k-=2^31 ; return (PT2) }
                 {
                 if (Q1 (j) T ) S1 ;
                 ...
                 if (Q2 (k) T ) S2 ;
                 }
```

If the deobfuscator tries to replace one (but not both) predicates with True, k will overflow. As a result, the deobfuscated program will terminate with an error condition.

9.6 Evaluation by Data-Flow Analysis

Deobfuscation is similar to many types of code optimization. Removing if (False) . . . is dead code elimination and moving identical code from if-statement branches (e.g., $S_1$ and $S_0^1$ in FIG. 28) is code hoisting, both common code optimization techniques.

When an opaque construct has been identified we can attempt to evaluate it. In simple cases constant propagation using a reaching definition data-flow analysis can be sufficient: x=5; . . . ; y=7; . . . ; if (x*x==(7*y*y−1)) . . . .

9.7 Evaluation by Theorem Proving

If data-flow analysis is not powerful enough to break the opaque predicate, a deobfuscator can attempt to use a theorem prover. Whether this is doable or not depends on the power of state-of-the-art theorem provers (which is difficult to ascertain) and the complexity of the theorem that needs to be proven. Certainly, theorems that can be proved by induction (such as $x^2(x+1)=0 \pmod 4$), are well within reach of current theorem provers.

To make things more difficult, we can use theorems which are know to be difficult to prove, or for which no known proof exists. In the example below the deobfuscator will have to prove that the bogus loop always terminates in order to determine that $S_2$ is live code:

```
{           =T=>    {
  S1;                 S1;
  S2;                 n = random(1,2^32);
}                     do
                        n = ((n%2)!=0)?3*n+1:n/2
                      while (n>1);
                      S2;
                    }
```

This is known as the Collatz problem. A conjecture says that the loop will always terminate. Although there is no known proof of this conjecture, the code is known to terminate for all numbers up to $7*10^{11}$. Thus, this obfuscation is safe (the original and obfuscated code behave identically), but is difficult to deobfuscate.

9.8 Deobfuscation and Partial Evaluation

Deobfuscation also resembles partial evaluation. A partial evaluator splits a program into two parts: the static part which can be precomputed by the partial evaluator, and the dynamic part which is executed at runtime. The dynamic part would correspond to our original, unobfuscated, program. The static part would correspond to our bogus inner program, which, if it were identified, could be evaluated and removed at deobfuscation time.

Like all other static inter-procedural analysis methods, partial evaluation is sensitive to aliasing. Hence, the same preventive transformations that were discussed in relation to slicing also applies to partial evaluation.

10 Obfuscation Algorithms

Given the obfuscator architecture of Section 3, the definition of obfuscation quality in Section 5, and the discussion of various obfuscating transformations in Section 6 through Section 9, we are now in a position to present more detailed algorithms, in accordance with one embodiment of the present invention.

The top-level loop of an obfuscation tool can have this general structure:

```
WHILE NOT Done (A) DO
    S:=SelectCode(A);
    T:=SelectTransform(S);
    A:=Apply(T,S);
END;
```

SelectCode returns the next source code object to be obfuscated. SelectTransform returns the transformation which should be used to obfuscate the particular source code object. Apply applies the transformation to the source code object and updates the application accordingly. Done determines when the required level of obfuscation has been attained. The complexity of these functions will depend on the sophistication of the obfuscation tool. At the simplistic end of the scale, SelectCode and SelectTransform could simply return random source code object/transformations, and Done could terminate the loop when the size of the application exceeds a certain limit. Normally, such behavior is insufficient.

Algorithm 1 gives a description of a code obfuscation tool with a much more sophisticated selection and termination behavior. In one embodiment, the algorithm makes use of several data structures, which are constructed by Algorithms 5, 6, and 7:

$P_s$ For each source code object S, $P_s(S)$ is the set of language constructs the programmer used in S. $P_s(S)$ is used to find appropriate obfuscating transformations for S.

A For each source code object S, $A(S)=\{T_i \rightarrow V_1; \ldots ; T_n \rightarrow V_n\}$ is a mapping from transformations $T_i$ to values $V_i$, describing how appropriate it would be to apply $T_i$ to S. The idea is that certain transformations may be inappropriate for a particular source code object S, because they introduce new code which is "unnatural" to S. The new code would look out of place in S and hence would be easy to spot for a reverse engineer. The higher the appropriateness value $V_i$ the better the code introduced by transformation $T_i$ will fit in.

For each source code object S, I(S) is the obfuscation priority of S. I(S) describes how important it is to obfuscate the contents of S. If S contains an important trade secret then I(S) will be high, if it contains mainly "bread-and-butter" code I(S) will be low.

R For each routine M, R(M) is the execution time rank of M.R(M)=1 if more time is spent executing M than any other routine.

The primary input to Algorithm 1 is an application A and a set of obfuscating transformations $\{T_1; T_2; \ldots \}$. The algorithm also requires information regarding each transformation, particularly three quality functions $T_{res}(S)$, $T_{pot}(S)$, and $T_{cost}(S)$ (similar to their namesakes in Section 5, but returning numerical values) and a function $P_t$:

$T_{res}(S)$ returns a measure of the resilience of transformation T when applied to source code object S (i.e., how well T will withstand an attack from an automatic deobfuscator).

$T_{pot}(S)$ returns a measure of the potency of transformation T when applied to source code object S (i.e., how much more difficult S will be for a human to understand after having been obfuscated by T).

$T_{cost}(S)$ returns a measure of the execution time and space penalty added by T to S.

$P_t$ maps each transformation T to the set of language constructs that T will add to the application.

Points 1 to 3 of Algorithm 1 load the application to be obfuscated, and builds appropriate internal data structures. Point 4 builds $P_s(S)$, $A(S)$, $I(S)$, and $R(M)$. Point 5 applies obfuscating transformations until the required obfuscation level has been attained or until the maximum execution time penalty is exceeded. Point 6, finally, rewrites the new application A'.

Algorithm 1 (Code Obfuscation)

input:
  a) An application A made up of source code or object code files C1; C2; . . .
  b) The standard libraries L1; L2; . . . defined by the language.
  c) A set of obfuscating transformations {T1; T2; . . . }.
  d) A mapping Pt which, for each transformation T gives the set of language constructs that T will add to the application.
  e) Three functions $T_{res}(S)$, $T_{pot}(S)$, $T_{cost}(S)$ expressing the quality of a transformation T with respect to a source code object S.
  f) A set of input data I={I1; I2; . . . } to A.
  g) Two numeric values AcceptCost>0 and ReqObf>0. AcceptCost is a measure of the maximum extra execution time/space penalty the user will accept. ReqObf is a measure of the amount of obfuscation required by the user.
output: An obfuscated application A' made up of source code or object code files.
1. Load the application $C_1$; $C_2$; . . . to be obfuscated. The obfuscator could either
  (a) load source code files, in which case the obfuscator would have to contain a complete compiler front-end performing lexical, syntactic, and semantic analysis, (a less powerful obfuscator that restricts itself to purely syntactic transformation could manage without semantic analysis) or
  (b) load object code files. If the object code retains most or all of the information in the source code (as is the case with Java class files), this method is preferable.
2. Load library code files L1; L2; . . . referenced directly or indirectly by the application.
3. Build an internal representation of the application. The choice of internal representation depends on the structure of the source language and the complexity of the transformations the obfuscator implements. A typical set of data structures might include:
  (a) A control-flow graph for each routine in A.
  (b) A call-graph for the routines in A.
  (c) An inheritance graph for the classes in A.
4. Construct mappings $R(M)$ and $P_s(S)$ (using Algorithm 5), $I(S)$ (using Algorithm 6), and $A(S)$ (using Algorithm 7).
5. Apply the obfuscating transformations to the application. At each step we select a source code object S to be obfuscated and a suitable transformation T to apply to S. The process terminates when the required obfuscation level has been reached or the acceptable execution time cost has been exceeded.
  REPEAT
    S: SelectCode(I);
    T: SelectTransform(S, A);
    Apply T to S and update relevant data structures from point 3;
  UNTIL Done(ReqObf, AcceptCost, S, T, I).
6. Reconstitute the obfuscated source code objects into a new obfuscated application, A'.

Algorithm 2 (SelectCode)

input: The obfuscation priority mapping I as computed by Algorithm 6.
output: A source code object S.

I maps each source code object S to I(S), which is a measure of how important it is to obfuscate S. To select the next source code object to obfuscate, we can treat I as a priority queue. In other words, we select S so that I(S) is maximized.

Algorithm 3 (SelectTransform)

input:
  a) A source code object S.
  b) The appropriateness mapping A as computed by Algorithm 7.
output: A transformation T.

Any number of heuristics can be used to select the most suitable transformation to apply to a particular source code object S. However, there are two important issues to consider. Firstly, the chosen transformation must blend in naturally with the rest of the code in S. This can be handled by favoring transformations with a high appropriateness value in A(S). Secondly, we want to favor transformations which yield a high 'bang-for-the-buck' (i.e. high levels of obfuscation with low execution time penalty). This is accomplished by selecting transformations that maximize potency and resilience, and minimize cost. These heuristics are captured by the following code, where w1, w2, w3 are implementation-defined constants:

Return a transform T, such that T→V is within A(S), and $(w1*T_{pot}(S)+w2*T_{res}(S)+w3*V)/T_{cost}(S)$ is maximized.

Algorithm 4 (Done)

input:
  a) ReqObf, the remaining level of obfuscation.
  b) AcceptCost, the remaining acceptable execution time penalty.
  c) A source code object S.
  d) A transformation T
  e) The obfuscation priority mapping I.
output:
  a) An updated ReqObf.
  b) An updated AcceptCost.
  c) An updated obfuscation priority mapping I.
  d) A Boolean return value which is TRUE if the termination condition has been reached.

The Done function serves two purposes. It updates the priority queue I to reflect the fact that the source code object S has been obfuscated, and should receive a reduced priority value. The reduction is based on a combination of the resilience and potency of the transformation. Done also updates Reqobf and AcceptCost, and determines whether the termination condition has been reached. $w_1$, $w_2$, $w_3$, $w_4$ are implementation-defined constants:

$I(S):=I(S)-(w_2T_{pos}(S)+w_2T_{res}(S));$
$ReqObf:=ReqObf-(w_2T_{pos}(S)+w_2T_{res}(S));$
$AcceptCost:=AcceptCost-T_{cost}(s);$
RETURN AcceptCost<=0 OR ReqObf<=0.

Algorithm 5 (Pragmatic Information)

input:
  a) An application A.
  b) A set of input data I={I1; I2, ... } to A.

output:
  a) A mapping R(M) which, for every routine M in A, gives the execution time rank of M
  b) A mapping P s (S), which, for every source code object S in A, gives the set of language constructs used in S.

Compute pragmatic information. This information will be used to choose the right type of transformation for each particular source code object.
1. Compute dynamic pragmatic information (i.e., run the application under a profiler on the input data set I provided by the user. Compute R(M) (the execution time rank of M) for each routine/basic block, indicating where the application spends most of its time.
2. Compute static pragmatic information $P_s(S)$. $P_s(S)$ provides statistics on the kinds of language constructs the programmer used in S.
  FOR S:=each source code object in A DO
    O:=The set of operators that S uses;
    C:=The set of high-level language constructs (WHILE statements, exceptions, threads, etc.) that S uses;
    L:=The set of library classes/routines that S references;
    Ps(S):=O U C U L;
  END FOR.

Algorithm 6 (Obfuscation Priority)

input:
  a) An application A.
  b) R(M), the rank of M.

output: A mapping I(S) which, for each source code object S in A, gives the obfuscation priority of S.

I(S) can be provided explicitly by the user, or it can be computed using a heuristic based on the statistical data gathered in Algorithm 5. Possible heuristics might be:
1. For any routine M in A, let I(M) be inversely proportional to the rank of M, R(M). I.e. the idea is that "if much time is spent executing a routine M, then M is probably an important procedure that should be heavily obfuscated."
2. Let I(S) be the complexity of S, as defined by one of the software complexity metrics in Table 1. Again, the (possibly flawed) intuition is that complex code is more likely to contain important trade secrets than simple code.

Algorithm 7 (Obfuscation Appropriateness)

input:
  a) An application A.
  b) A mapping P t which, for each transformation T, gives the set of language constructs T will add to the application.
  c) A mapping P s (S) which, for each source code object S in A, gives the set of language constructs used in S.

output: A mapping A(S) which, for each source code object S in A and each transformation T, gives the appropriateness of T with respect to S.

Compute the appropriateness set A(S) for each source code object S. The mapping is based primarily on the static pragmatic information computed in Algorithm 5.
  FOR S:=each source code object in A DO
    FOR T each transformation DO
      V:=degree of similarity between Pt(T) and Ps(S);
      A(S):=A(S) U {T→V};
    END FOR
  END FOR

11 SUMMARY AND DISCUSSION

We have observed that it may under many circumstances be acceptable for an obfuscated program to behave differently than the original one. In particular, most of our obfuscating transformations make the target program slower or larger than the original. In special cases we even allow the target program to have different side-effects than the original, or not to terminate when the original program terminates with an error condition. Our only requirement is that the observable behavior (the behavior as experienced by a user) of the two programs should be identical.

Allowing such weak equivalence between original and obfuscated program is a novel and very exciting idea. Although various transformations are provided and described above, many other transformations will be apparent to one of ordinary skill in the art and can be used to provide obfuscation for enhanced software security in accordance with the present invention.

There is also great potential for much future research to identify transformations not yet known. In particular, we would like to see the following areas investigated:
1. New obfuscating transformations should be identified.
2. The interaction and ordering between different transformations should be studied.
   This is similar to work in code optimization, where the ordering of a sequence of optimizing transformations has always been a difficult problem.
3. The relationship between potency and cost should be studied. For a particular kind of code we would like to know which transformations would give the best "bang-for-the-buck" (i.e., the highest potency at the lowest execution overhead).

For an overview of all the transformations that have been discussed above, see FIG. 31. For an overview of the opaque constructs that have been discussed above, see FIG. 32. However, the present invention should not be limited to the exemplary transformations and opaque constructs discussed above.

11.1 The Power of Obfuscation

Encryption and program obfuscation bear a striking resemblance to each other. Not only do both try to hide information from prying eyes, they also purport to do so for a limited time only. An encrypted document has a limited shelf-life: it is safe only for as long as the encryption algorithm itself withstands attack, and for as long as advances in hardware speed do not allow messages for the chosen key-length to be routinely decrypted. The same is true for an obfuscated application; it remains secret only for as long as sufficiently powerful deobfuscators have yet to be built.

For evolving applications this will not be a problem, as long as the time between releases is shorter than the time it takes for the deobfuscator to catch up with the obfuscator. If this is the case, then by the time an application can be automatically deobfuscated it is already outdated and of no interest to a competitor.

However, if an application contains trade secrets that can be assumed to survive several releases, then these should be protected by means other than obfuscation. Partial server-side execution (FIG. 2(b)) seems the obvious choice, but has the drawback that the application will execute slowly or (when the network connection is down) not at all.

11.2 Other Uses of Obfuscation

It is interesting to note that there may be potential applications of obfuscation other than as discussed above. One possibility is to use obfuscation in order to trace software pirates. For example, a vendor creates a new obfuscated version of his application for every new customer (We can generate different obfuscated versions of the same application by introducing an element of randomness into the SelectTransform algorithm (Algorithm 3). Different seeds to the random number generator will produce different versions.) and keeps a record of to whom each version was sold. This is probably only reasonable if the application is being sold and distributed over the net. If the vendor finds out that his application is being pirated, all he needs to do is to get a copy of the pirated version, compare it against the data base, and see who bought the original application. It is, in fact, not necessary to store a copy of every obfuscated version sold. It suffices to keep the random number seed that was sold.

Software pirates could themselves make (illicit) use of obfuscation. Because the Java obfuscator we outlined above works at the bytecode level, there is nothing stopping a pirate from obfuscating a legally bought Java application. The obfuscated version could then be resold. When faced with litigation the pirate could argue that he is, in fact, not reselling the application that he originally bought (after all, the code is completely different!), but rather a legally reengineered version.

Conclusion

In conclusion, the present invention provides a computer implemented method and apparatus for preventing, or at least hampering, reverse engineering of software. While this may be effected at the expense of execution time or program size with the resulting transformed program behaving differently at a detailed level, it is believed that the present technique provides significant utility in appropriate circumstances. In one embodiment, the transformed program has the same observable behavior as the untransformed program. Accordingly, the present invention allows for such weak equivalence between the original and obfuscated program.

While the present discussion has been primarily in the context of hampering reverse engineering of software, other applications are contemplated such as watermarking software objects (including applications). This exploits the potentially distinctive nature of any single obfuscation procedure. A vendor would create a different obfuscated version of an application for every customer sold. If pirate copies are found, the vendor need only compare it against the original obfuscation information database to be able to trace the original application.

The particular obfuscation transformations described herein are not exhaustive. Further obfuscation regimes may be identified and used in the present novel obfuscation tool architecture.

Where in the foregoing description reference has been made to elements or integers having known equivalents, then such equivalents are included as if they were individually set forth.

Although the present invention has been described by way of example and with reference to particular embodiments. It is to be understood that modifications and improvements can be made without departing from the scope of the present invention.

What is claimed is:

1. A computer implemented method for obfuscating code, comprising:
    identifying one or more source code input files corresponding to source code for the code of an application to be processed;
    selecting a required level of obfuscation (the potency);
    selecting a maximum execution time or space penalty (the cost);
    reading and parsing the input files;
    providing information identifying data types, data structures, and control structures used by the application to be processed;
    selecting and applying obfuscating transformations to source code objects until the required potency has been achieved or the maximum cost has been exceeded; and
    outputting the transformed code of the application, wherein the transformed code provides weak equivalence to the untransformed code.

2. The method of claim 1, wherein at least one transformation comprises an opaque construct, the opaque construct being constructed using aliasing and concurrency techniques.

3. The method of claim 1, further comprising:
    outputting information about obfuscating transformations applied to the obfuscated code and information relating obfuscated code of a transformed application to source code of the application.

4. The method of claim 1, wherein at least one transformation is selected to preserve the observable behavior of the code of an application.

5. The method of claim 1, further comprising:
    deobfuscating the code, the deobfuscating the code comprising removing any obfuscations from the obfuscated code of an application by use of slicing, partial evaluation, dataflow analysis, or statistical analysis.

6. A computer program embodied on a computer-readable medium for obfuscating code, comprising:
    logic that identifies one or more source code input files corresponding to source code for the code of an application to be processed;
    logic that selects a required level of obfuscation (the potency);
    logic that selects a maximum execution time or space penalty (the cost);
    logic that reads and parses the input files;
    logic that provides information identifying data types, data structures, and control structures used by the application to be processed;
    logic that selects and applies obfuscating transformations to source code objects until the required potency has been achieved or the maximum cost has been exceeded; and
    logic that outputs the transformed code of the application, wherein the transformed code provides weak equivalence to the untransformed code.

7. The computer program of claim 6, wherein at least one transformation comprises an opaque construct, the opaque construct being constructed using aliasing and concurrency techniques.

8. The computer program of claim 6, further comprising:
logic that outputs information about obfuscating transformations applied to the obfuscated code and information relating obfuscated code of a transformed application to source code of the application.

9. The computer program of claim 6, wherein at least one transformation is selected to preserve the observable behavior of the code of an application.

10. The computer program of claim 6, further comprising:
logic that deobfuscates the code, the deobfuscating the code comprising removing any obfuscations from the obfuscated code of an application by use of slicing, partial evaluation, dataflow analysis, or statistical analysis.

11. An apparatus for obfuscating code, comprising:
means for identifying one or more source code input files corresponding to source code for the code of an application to be processed;
means for selecting a required level of obfuscation (the potency);
means for selecting a maximum execution time or space penalty (the cost);
means for reading and parsing the input files;
means for providing information identifying data types, data structures, and control structures used by the application to be processed;
means for selecting and applying obfuscating transformations to source code objects until the required potency has been achieved or the maximum cost has been exceeded; and
means for outputting the transformed code of the application, wherein the transformed code provides weak equivalence to the untransformed code.

12. The apparatus of claim 11, wherein the transformation comprises an opaque construct, the opaque construct being constructed using aliasing and concurrency techniques.

13. The apparatus of claim 11, further comprising:
means for outputting information about obfuscating transformations applied to the obfuscated code and information relating obfuscated code of a transformed application to source code of the application.

14. The apparatus of claim 11, wherein at least one transformation is selected to preserve the observable behavior of the code of an application.

15. The apparatus of claim 11, further comprising:
means for deobfuscating the code, the deobfuscating the code comprising removing any obfuscations from the obfuscated code of an application by use of slicing, partial evaluation, dataflow analysis, or statistical analysis.

16. The apparatus of claim 11, wherein the code comprises Java™ bytecode.

17. The apparatus of claim 11, wherein at least one transformation provides a data obfuscation, a control obfuscation, or a preventive obfuscation.

18. A computer-implemented method for obfuscating computer code, the method including:
loading the computer code that is to be obfuscated into a memory unit;
selecting one or more obfuscation transformations to apply to the computer code, wherein at least one obfuscation transformation is one of:
a transformation that includes converting at least one reducible control flow graph to a non-reducible control flow graph;
a transformation that includes splitting at least one loop;
a transformation that includes identifying a programming idiom that is used in the computer code, and replacing at least one programming construct that exemplifies the programming idiom with an equivalent programming construct that does not exemplify the programming idiom;
a transformation that includes promoting at least one variable to a more general type;
a transformation that includes merging two variables into a single variable;
a transformation that includes splitting a variable into at least two variables; and
a transformation that includes replacing at least one string with a call to a procedure that produces the string; and
generating obfuscated computer code by applying the one or more obfuscation transformations to the computer code, wherein the obfuscated computer code is more resistant to reverse engineering, decompilation, or attack than the computer code.

19. A method as in claim 18, further including:
evaluating the obfuscated computer code to obtain a metric indicative of a level of obfuscation associated with the obfuscated computer code; and
applying additional obfuscation transformations to the obfuscated computer code if the metric is less than a predefined level.

20. A method as in claim 18, further including:
performing a preprocessing pass on the computer code, wherein the preprocessing pass serves to gather information about the computer code, and wherein performing the preprocessing pass includes performing at least one of (a) data flow analysis, and (b) data dependence analysis on the computer code; and
using the information gathered in the preprocessing pass in selecting the one or more obfuscation transformations to apply to the computer code.

21. A method as in claim 18, in which the computer code that is to be obfuscated is characterized by an absence of annotations pre-inserted for the purpose of facilitating a subsequent application of obfuscation transformations to the computer code.

22. A computer-implemented method for obfuscating computer code, the method including:
loading the computer code that is to be obfuscated into a memory module;
performing a preprocessing pass on the computer code, the preprocessing pass serving to gather information about the computer code for use in selecting and applying one or more obfuscation transformations to the computer code;
selecting one or more obfuscation transformations to apply to the computer code;
generating obfuscated computer code by applying the one or more obfuscation transformations to the computer code;
evaluating the obfuscated computer code to obtain an obfuscation level associated with the computer code; and
applying additional obfuscation transformations to the obfuscated computer code if the obfuscation level is less than a predefined amount;

wherein the obfuscated computer code is rendered more resistant to reverse engineering, decompilation, or attack than the computer code.

23. A method as in claim 22, in which performing a preprocessing pass on the computer code includes:
constructing one or more control flow graphs for one or more routines contained in the computer code.

24. A method as in claim 22, in which performing a preprocessing pass on the computer code includes constructing an inheritance graph for a plurality of classes contained in the computer code.

25. A method as in claim 22, in which selecting one or more obfuscation transformations includes:
obtaining an obfuscation metric for each of a plurality of obfuscation transformations;
obtaining a cost metric for each of the plurality of obfuscation transformations; and
choosing one or more obfuscation transformations for which the obfuscation metric is maximized and the cost metric is minimized.

26. A method as in claim 25, in which the obfuscation metric for a given obfuscation transformation is based, at least in part, on a measure of potency and a measure of resilience of the given obfuscation transformation.

27. A method as in claim 25, in which the cost metric of a given obfuscation transformation is based, at least in part, on an execution time penalty and a space penalty associated with the given obfuscation transformation.

28. A method as in claim 22, in which selecting one or more obfuscation transformations to apply to the computer code includes:
evaluating an appropriateness metric for one or more obfuscation transformations; and
selecting one or more obfuscation transformations for which the appropriateness metric is higher than the appropriateness metric for one or more other obfuscation transformations.

29. A method as in claim 28, in which evaluating an appropriateness metric for a given obfuscation transformation includes:
comparing one or more programming constructs used by the given obfuscation transformation to one or more programming constructs used by at least a portion of the computer code; and
assigning a value to the appropriateness metric based on a degree of similarity between the programming constructs used by the given obfuscation transformation and the programming constructs used by the portion of the computer code.

30. A method as in claim 22, in which the computer code includes one or more object code files and one or more library code files referenced by the one or more object code files.

31. A method as in claim 22, further including:
receiving obfuscation control information as input.

32. A method as in claim 31, in which the obfuscation control information includes one or more parameters relating to an acceptable obfuscation cost and/or a desired level of obfuscation.

33. A method as in claim 31, in which the obfuscation control information includes one or more parameters relating to a maximum acceptable execution time penalty and a maximum acceptable space penalty associated with the computer code after obfuscation.

34. A method as in claim 31, in which the obfuscation control information includes one or more parameters indicative of a desired level of obfuscation potency and/or resilience.

35. A method as in claim 22, further including:
receiving as input an obfuscation priority, the obfuscation priority being associated with at least a portion of the computer code, wherein the obfuscation priority comprises a metric of the importance of obfuscating the portion of the computer code with which it is associated.

36. A method as in claim 22, in which the computer code includes a plurality of routines, the method further including:
assigning an execution time rank to one or more routines; and
associating an obfuscation priority with each of the one or more routines, wherein the obfuscation priority associated with a given routine is inversely proportional to the execution time rank of the given routine.

37. A method as in claim 22, further including:
receiving profiling data as input, the profiling data providing some assistance in identifying relatively frequently-executed portions of the computer code; and
using the profiling data to control, at least in part, application of obfuscation transformations to the computer code.

38. A method as in claim 22, further including:
generating a file of annotated computer code, the file of annotated computer code providing an indication of how the one or more obfuscation transformations were applied to the computer code.

39. A method as in claim 22, in which the one or more obfuscation transformations include a transformation that includes converting at least one reducible control flow graph to an irreducible control flow graph.

40. A method as in claim 22, in which the one or more obfuscation transformations include a transformation that includes removing at least one programming idiom from the computer code.

41. A method as in claim 22, in which the one or more obfuscation transformations include a transformation that includes splitting an array into at least two arrays.

42. A method as in claim 22, in which the one or more obfuscation transformations include a transformation that includes merging two arrays into a single array.

43. A method as in claim 22, in which the one or more obfuscation transformations include a transformation that includes restructuring an array so that it has a different number of dimensions.

44. A method as in claim 22, in which the one or more obfuscation transformations include a transformation that includes adding at least one opaque programming construct to the computer code.

45. A method as in claim 22, in which the one or more obfuscation transformations include a transformation that includes interleaving programming statements from at least two different subroutines.

46. A method as in claim 22, in which the one or more obfuscation transformations include a transformation that includes:
selecting a subroutine in the computer code;
adding an obfuscated version of the subroutine to the computer code; and
replacing a call to the subroutine with a call to the obfuscated version of the subroutine;
wherein the computer code, after application of the one or more obfuscation transformations, includes:
the subroutine;

at least one call to the subroutine;

the obfuscated version of the subroutine; and at least one call to the obfuscated version of the subroutine.

47. A method as in claim 46, in which the subroutine comprises a method, procedure, function, or routine.

48. A method as in claim 22, in which the one or more obfuscation transformations include a transformation that includes unrolling at least one loop contained in the computer code.

49. A method as in claim 22, in which the one or more obfuscation transformations include a transformation that includes splitting at least one loop contained in the computer code.

50. A method as in claim 22, in which the one or more obfuscation transformations include a transformation that includes promoting at least one variable to a more general type.

51. A method as in claim 22, in which the one or more obfuscation transformations include a transformation that includes merging two variables into a single variable.

52. A method as in claim 22, in which the one or more obfuscation transformations include a transformation that includes splitting a variable into at least two variables.

53. A method as in claim 22, in which the one or more obfuscation transformations include a transformation that includes inserting a bogus class.

54. A method as in claim 22, in which the one or more obfuscation transformations include a transformation that includes replacing at least one string with a call to a procedure that produces the string.

55. A method as in claim 22, in which the one or more obfuscation transformations include a transformation that includes scrambling at least one identifier.

56. A method as in claim 22, in which the one or more obfuscation transformations include a transformation that includes inserting dead or irrelevant code.

57. A method as in claim 22, in which the one or more obfuscation transformations include a transformation that includes inlining at least one method, procedure, or function call.

58. A method as in claim 22, in which the one or more obfuscation transformations include a transformation that includes outlining computer code into at least one method, procedure, or function.

59. A computer program product for obfuscating a computer program or a computer program module, the computer program product including:

computer code for gathering information about the computer program or module by performing a preprocessing pass on the computer program or module;

computer code for performing a plurality of obfuscation transformations;

computer code for selecting an obfuscation transformation to apply to the computer program or module, wherein the selecting is based, at least in part, on the information gathered about the computer program or module during the preprocessing pass;

computer code for applying one or more obfuscation transformations to the computer program or module;

computer code for calculating a metric indicative of the degree to which the computer program or module is obfuscated;

computer code for comparing the metric to a threshold;

computer code for applying additional obfuscation transformations to the computer program or module if the metric is less than the threshold; and a computer readable medium that stores the computer codes.

60. A computer program product as in claim 59, further including:

computer code for receiving user-input regarding a desired level of obfuscation; and computer code for using, at least in part, the desired level of obfuscation to set the threshold.

61. A computer program product as in claim 59, in which the computer code for gathering information about the computer program or module includes:

computer code for performing data dependency analysis on the computer program or module.

62. A computer program product as in claim 59, in which the computer code for performing a plurality of obfuscation transformations includes computer code for implementing at least one opaque construct.

63. A computer program product as in claim 62, in which the at least one opaque construct is generated using at least one of (a) aliasing, or (b) concurrency techniques.

64. A computer-implemented method for obfuscating computer code, the method including:

loading the computer code that is to be obfuscated into a memory module;

performing a preprocessing pass on the computer code, wherein the preprocessing pass serves to gather information about the computer code, and wherein performing the preprocessing pass includes performing at least one of (a) data flow analysis, or (b) data dependence analysis on the computer code;

selecting one or more obfuscation transformations to apply to the computer code, the one or more obfuscation transformations being selected, at least in part, using the information gathered in the preprocessing pass; and generating obfuscated computer code by applying the one or more obfuscation transformations to the computer code.

65. A method as in claim 64, further including:

constructing one or more control flow graphs for one or more routines contained in the computer code that is to be obfuscated; and constructing an inheritance graph for a plurality of classes included in the computer code.

66. A method as in claim 64, in which selecting one or more obfuscation transformations to apply to the computer code includes:

calculating an appropriateness metric for one or more obfuscation transformations, wherein calculating the appropriateness metric for a given obfuscation transformation includes:

comparing one or more programming constructs used by the given obfuscation transformation to one or more programming constructs used by at least a portion of the computer code; and assigning a value to the appropriateness metric based on a degree of similarity between the one or more programming constructs used by the given obfuscation transformation and the one or more programming constructs used by the portion of the computer code;

selecting one or more obfuscation transformations for which the appropriateness metric is higher than the appropriateness metric for one or more other obfuscation transformations.

67. A method as in claim 64, in which the computer code that is to be obfuscated is characterized by an absence of annotations pre-inserted for the purpose of facilitating a subsequent application of obfuscation transformations to the computer code.

68. A computer-implemented method for obfuscating computer code, the method including:
   loading the computer code that is to be obfuscated into a memory module;
   selecting one or more obfuscation transformations to apply to the computer code;
   generating obfuscated computer code by applying the one or more obfuscation transformations to the computer code;
   evaluating the obfuscated computer code to obtain an obfuscation level associated therewith; and
   applying additional obfuscation transformations to the obfuscated computer code if the obfuscation level is less than a predefined level, wherein the obfuscated computer code is more resistant to reverse engineering, decompilation, or attack than the computer code.

69. A method as in claim 68, further including:
   performing a preprocessing pass on the computer code that is to be obfuscated, wherein the preprocessing pass serves to gather information about the computer code; and
   using the information gathered in the preprocessing pass in selecting the one or more obfuscation transformations to apply to the computer code.

70. A method of obfuscating a computer program or computer program module, the computer program or module containing a first variable of a first type, the method including:
   performing an alteration on at least a portion of the computer program or module, the alteration being designed to render the computer program or module at least somewhat more resistant to reverse engineering or decompilation, the alteration including:
      generating a second variable and a third variable;
      replacing a reference to the first variable with a programming construct, wherein the programming construct is designed to use the second variable and the third variable to replicate the reference to the first variable.

71. A method as in claim 70, in which the second variable is of a second type, the second type being different from the first type.

72. A method as in claim 71, in which the third variable is of a third type, the third type being different from the first type and the second type.

73. A method as in claim 71, in which the first type is boolean, and the second type is integer.

74. A method as in claim 73, in which the programming construct includes an operation on the second variable and the third variable, with a first result of the operation corresponding to a true condition of the first variable, and a second result of the operation corresponding to a false condition of the first variable.

75. A method as in claim 70, in which the programming construct further includes:
   a first operation which sets a value for the second variable; and
   a second operation which sets a value for the third variable.

76. A method as in claim 70, in which the programming construct further includes a look-up table, and in which values for the second variable and the third variable can be used to determine a boolean value from the look-up table.

77. A method as in claim 76, in which the look-up table is constructed at run-time by an algorithm incorporated into the programming construct.

78. A method of obfuscating a computer program or module, the computer program or module including a first procedure containing a first local variable of a first type and a second procedure containing a second local variable of a second type, the method including:
   performing an alteration on at least a portion of the computer program or module, the alteration being designed to render the computer program or module at least somewhat more resistant to reverse engineering or decompilation, the alteration including:
      creating a global variable;
      replacing at least one reference to the first local variable with a reference to the global variable; and
      replacing at least one reference to the second local variable with a reference to the global variable.

79. A method as in claim 78, in which the first type is the same as the second type.

80. A method as in claim 78, in which the global variable is of a more general type than the first type and the second type.

81. A method as in claim 79, in which the global variable is of the same type as the first type and the second type.

82. A method of obfuscating a computer program or module, the computer program or module including at least one reference to a first instance of an indexed data type, the first instance of the indexed data type including at least two elements, the method including:
   performing an alteration on at least a portion of the computer program or module, the alteration being designed to render the computer program or module at least somewhat more resistant to reverse engineering or decompilation, the alteration including:
      generating a second instance of the indexed data type and a third instance of the indexed data type;
      storing at least a first element from the first instance of the indexed data type in the second instance of the indexed data type;
      storing at least a second element from the first instance of the indexed data type in the third instance of the indexed data type, the second element being different from the first element;
      replacing a first reference to the first instance of the indexed data type with a reference to the second instance of the indexed data type; and
      replacing a second reference to the first instance of the indexed data type with a reference to the third instance of the indexed data type;
      wherein the reference to the second instance of the indexed data type and the reference to the third instance of the indexed data type are designed to retrieve the first element and the second element, respectively.

83. A method of obfuscating a computer program or module, the computer program or module including at least one reference to a first instance of an indexed data type and at least one reference to a second instance of the indexed data type, the method including:
   performing an alteration on at least a portion of the computer program or module, the alteration being designed to render the computer program or module at least somewhat more resistant to reverse engineering or decompilation, the alteration including:

generating a third instance of the indexed data type;

storing data from the first instance of the indexed data type and data from the second instance of the indexed data type in the third instance of the indexed data type;

replacing a reference to the first instance of the indexed data type with a reference to the third instance of the indexed data type; and replacing a reference to the second instance of the indexed data type with a reference to the third instance of the indexed data type.

84. A method as in claim 83, in which the indexed data type comprises an array.

85. A method as in claim 83, in which the reference to the first instance of the indexed data type is designed to refer to a particular location within the first instance of the indexed data type, and in which replacing the reference to the first instance of the indexed data type further includes:

inserting into the computer program or module a first programming construct used to refer to a location within the third instance of the indexed data type corresponding to the particular location within the first-instance of the indexed data type.

86. A method as in claim 85, in which the reference to the second instance of the indexed data type is designed to refer to a particular location within the second instance of the indexed data type, and in which replacing the reference to the second instance of the indexed data type further includes:

inserting into the computer program or module a second programming construct used to refer to a location within the third instance of the indexed data type corresponding to the particular location within the second instance of the indexed data type.

87. A method as in claim 86, in which:

the first programming construct uses at least a first variable; and the second programming construct uses at least a second variable.

88. A method as in claim 87, in which:

the first variable and the second variable are different, and in which the first programming construct and the second programming construct are otherwise the same.

89. A method as in claim 83, in which the first instance of the indexed data type comprises a string of characters and the second instance of the indexed data type comprises a string of characters.

90. A method of obfuscating a computer program or module, the computer program or module including a first instance of an indexed data type, the first instance having n dimensions, the method including:

performing an alteration on at least a portion of the computer program or module, the alteration being designed to render the computer program or module at least somewhat more resistant to reverse engineering or decompilation, the alteration including:

generating a second instance of the indexed data type, the second instance having m dimensions, m being different from n;

storing data from the first instance of the indexed data type into the second instance of the indexed data type; and replacing a reference to the first instance of the indexed data type with a reference to the second instance of the indexed data type, the reference to the second instance of the indexed data type being designed to retrieve a data element from the second instance of the indexed data type that corresponds to a data element in the first instance of the indexed data type to which the reference to the first instance of the indexed data type refers.

91. A method as in claim 90, in which n equals one.

92. A method of obfuscating a computer program or module, the computer program or module being designed to carry out one or more specified tasks and including a first thread, the method including:

performing an alteration on at least a portion of the computer program or module, the alteration designed to render the computer program or module at least somewhat more resistant to reverse engineering or decompilation, the alteration including:

generating a second thread;

inserting one or more programming statements into the computer program or module, the programming statements carrying out no function which contributes to the one or more specified tasks, wherein at least one or more of the programming statements are designed to run in the second thread.

93. A method as in claim 92, in which the alteration does not materially affect completion of the one or more specified tasks.

94. A method as in claim 92, in which at least one or more of the programming statements are designed to run in the first thread.

95. A method as in claim 92, in which the computer program or module and the programming statements are written in the Java programming language.

96. A method as in claim 92, in which the first thread and the second thread are synchronized through the use of synchronization primitives.

97. A method of obfuscating a computer program or module, the computer program or module being designed to carry out one or more specified tasks, the computer program or module containing at least one variable used in at least one process, the variable being set to an initial value, the method including:

performing an alteration on at least a portion of the computer program or module, the alteration being designed to render the computer program or module at least somewhat more resistant to reverse engineering or decompilation without materially affecting accomplishment of the one or more specified tasks, the alteration including:

altering the initial value of the variable to yield an altered initial value; and altering the process to take into account the altered initial value.

98. A method as in claim 97, in which the variable is an integer variable, and in which the variable is used for iteration through the process, the method further including:

incrementing or decrementing the variable for each iteration through the process; and continuing iteration until the variable reaches a predefined ending value;

wherein altering the process to take into account the altered initial value includes altering the predefined ending value.

99. A method of obfuscating a computer program or module, the computer program or module containing a variable of a first type, the method including:

performing an alteration on at least a portion of the computer program or module, the alteration being designed to render the computer program or module at least somewhat more resistant to reverse engineering or decompilation, the alteration including:
creating a variable of a second type, the second type being more general than the first type; and
replacing at least one reference in the computer program or module to the variable of the first type with a reference to the variable of the second type.

100. A method as in claim 99, in which the variable of a first type is an integer variable and the variable of the second type is an integer object.

101. A method of obfuscating a computer program or module, the computer program or module including a first character string, the method including:
performing an alteration on at least a portion of the computer program or module, the alteration being designed to render the computer program or module at least somewhat more resistant to reverse engineering or decompilation, the alteration including:
generating a programming construct designed to dynamically produce the first character string; and
replacing at least one instance of the first character string with the programming construct or a call to the programming construct.

102. A method as in claim 101, in which:
the computer program or module further includes a second character string;
and in which the programming construct accepts a variable value as an input, and produces the first character string or the second character string depending, at least in part, on the variable value.

103. A method as in claim 102, in which the programming construct comprises a computational function, computational method, procedure, subroutine, or routine.

104. A method of obfuscating a computer program or module, the computer program or module including a first variable and a second variable, the method including:
performing an alteration on at least a portion of the computer program or module, the alteration being designed to render the computer program or module at least somewhat more resistant to reverse engineering or decompilation, the alteration including:
specifying a third variable;
replacing a reference to the first variable with a programming construct, the programming construct including at least one programming statement designed to use a value of the third variable to determine a value of the first variable;
replacing a reference to the second variable with the programming construct, the programming construct including at least one programming statement designed to use the value of the third variable to determine a value of the second variable.

105. A method as in claim 104, in which the first variable and the second variable comprise scalar variables.

106. A method as in claim 104, in which the value of the first variable is stored in a first portion of the third variable and the value of the second variable is stored in a second portion of the third variable.

107. A method as in claim 104, in which the alteration further includes:
incorporating into the computer program or module an operation performed on the third variable, the operation performing no function necessary for correct execution of the computer program or module.

108. A method as in claim 107, in which the operation is incorporated into the computer program or module in such a manner that the operation is not performed during normal execution of the computer program or module.

109. A method as in claim 107, in which execution of the operation is conditioned on a second operation, the second operation including evaluation of an opaque predicate, the opaque predicate being designed to evaluate in such a manner that the operation is not executed during normal execution of the computer program or module.

110. A method as in claim 109, in which the operation includes a rotate operation performed on the third variable.

111. A method of obfuscating a computer program or module, the computer program or module including a first variable, the method including:
performing an alteration on at least a portion of the computer program or module, the alteration being designed to render the computer program or module at least somewhat more resistant to reverse engineering or decompilation, the alteration including:
specifying an instance of an indexed data type, the instance containing at least two elements; and
replacing at least one reference to the first variable with a first programming construct, the first programming construct including one or more programming statements which use, at least in part, one or more values stored in at least one of the elements of the instance of the indexed data type.

112. A method as in claim 111, in which the indexed data type comprises an array.

113. A method as in claim 111, in which the instance of the indexed data type comprises a string of characters.

114. A method as in claim 111, in which:
the computer program or module includes a second variable; and
the alteration further includes:
replacing at least one reference to the second variable with a second programming construct, the second programming construct including one or more programming statements which use, at least in part, one or more values stored in at least one of the elements of the instance of the indexed data type.

115. A method as in claim 114, in which the first programming construct and the second programming construct include retrieval of an element from the instance of the indexed data type.

116. A method of obfuscating a computer program or module, the computer program or module including a first variable value used in a first indexing operation on an instance of an indexed data type, the method including:
performing an alteration on at least a portion of the computer program or module, the alteration being designed to render the computer program or module at least somewhat more resistant to reverse engineering or decompilation, the alteration including:
creating a first opaque encoding function, the first opaque encoding function using the first variable value to compute a second variable value for use in indexing the instance of the indexed data type; and
replacing the first indexing operation with a second indexing operation, the second indexing operation using the second variable value to index the instance of the indexed data type.

117. A method as in claim 116, in which the indexed data type comprises an array.

118. A method of obfuscating a computer program or module, the computer program or module including a loop, the method including:
performing an alteration on at least a portion of the computer program or module, the alteration being designed to render the computer program or module at least somewhat more resistant to reverse engineering or decompilation, the alteration including reversing the direction of the loop.

119. A method as in claim 118, in which reversing the direction of the loop includes adding a bogus data dependency to the loop.

120. A method of obfuscating a computer program or module, the method including:
performing an alteration on at least a portion of the computer program or module, the alteration being designed to render the computer program or module at least somewhat more resistant to reverse engineering or decompilation, the alteration including:
incorporating an opaque computational function into the computer program or module, wherein evaluation of the opaque computational function depends, at least in part, on a value of a predefined variable;
including a first parallel process and a second parallel process in the computer program or module, the first parallel process and the second parallel process determining, at least in part, the value of the predefined variable; and
modifying the computer program or module so that at least one operation depends upon the opaque computational function evaluating to a predefined value.

121. A method as in claim 120, in which:
the first parallel process includes a first thread, and the second parallel process includes a second thread.

122. A method as in claim 121, in which the first and second threads execute concurrently.

123. A method as in claim 122, in which the first thread includes one or more programming statements that cause execution of the first thread to pause and to later resume.

124. A method as in claim 120, in which the opaque computational function comprises an opaque predicate.

125. A method of obfuscating a computer program or module, the method including:
performing an alteration on at least a portion of the computer program or module, the alteration being designed to render the computer program or module at least somewhat more resistant to reverse engineering or decompilation, the alteration including:
incorporating an opaque computational function into the computer program or module, including:
generating a first data structure containing first data structure elements, each first data structure element including a first field capable of pointing to at least one other first data structure element;
generating a first pointer pointing to a particular first data structure element; and
calculating a value of the opaque computational function by using, at least in part, a value of the first pointer;
altering the computer program or module so that at least one operation depend s upon the opaque computational f unction evaluating to a predefined value.

126. A method as in claim 125, in which:
each first data structure element further includes an additional field; and
in which the alteration further includes:
adding to the computer program or module a first operation that is dependent on a value of the additional field of the particular first data structure element pointed to by the first pointer.

127. A method as in claim 126, in which the additional field comprises a boolean field.

128. A method as in claim 126, in which incorporating an opaque computational function into the computer program or module further includes:
adding a programming construct to the computer program or module which alters the value of the first pointer, the programming construct causing the first pointer to point to another first data structure element reachable from the particular first data structure element previously pointed to by the first pointer.

129. A method as in claim 128, in which incorporating an opaque computational function into the computer program or module further includes adding at least one programming statement which adds a new first data structure element to the first data structure.

130. A method as in claim 129, in which incorporating an opaque computational function into the computer program or module further includes:
generating a second data structure containing second data structure elements, each second data structure element including a first field capable of pointing to at least one other second data structure element;
generating a second pointer pointing to a particular second data structure data element; and
calculating a value of the opaque computational function by using, at least in part, a value of the second pointer.

131. A method as in claim 130, in which generating a second data structure is performed at runtime, and in which generating a second pointer is performed at runtime.

132. A method as in claim 130, in which:
none of the first data structure elements point to a second data structure element; and
none of the second data structure elements point to a first data structure element.

133. A method as in claim 132, in which the opaque computational function is calculated, at least in part, by an operation which results in a first state if the value of the first pointer is equal to the value of the second pointer, and a second state if the value of the first pointer is not equal to the value of the second pointer; whereby the operation always results in the second state.

134. A method as in claim 133, in which incorporating an opaque computational function into the computer program or module further includes:
adding a second programming construct which alters the value of the second pointer, the second programming construct causing the second pointer to point to another second data structure element reachable from the particular second data structure element previously pointed to by the second pointer.

135. A method as in claim 132, in which the opaque computational function is calculated, at least in part, by an operation which results in a first state if a value associated with the first data structure element pointed to by the first pointer is equal to a value associated with the second data structure element pointed to by the second pointer, and results in a second state if the value associated with the first data structure element pointed to by the first pointer is not equal to the value associated with the second data structure element pointed to by the second pointer.

136. A method as in claim 135, in which the value associated with the first data structure element and the value associated with the second data structure element include pointers to other data elements stored in the first and second data structures.

137. A method as in claim 130, in which incorporating an opaque computational function into the computer program or module further includes generating a third pointer, the third pointer pointing to one of the first data structure elements; whereby the opaque computational function is calculated, at least in part, by an operation which results in a first state if the value of the first pointer is equal to a value of the third pointer, and results in a second state if the value of the first pointer is not equal to the value of the third pointer, whereby the operation may result in the first state or the second state.

138. A method of obfuscating a computer program or module, the method including:
    performing an alteration on at least a portion of the computer program or module, the alteration being designed to render the computer program or module at least somewhat more resistant to reverse engineering or decompilation, the alteration including:
        incorporating a first opaque computational function into the computer program or module; and
        including a first programming construct in the computer program or module, the first programming construct operable to execute a first group of one or more programming statements if the opaque computational function computes to a first value, and to execute a second group of one or more programming statements if the opaque computational function computes to a second value.

139. A method as in claim 138, in which the first group and the second group perform similar functions using programming statements which differ in at least one respect.

140. A method as in claim 139, in which the one or more programming statements contained in the first group and the one or more programming statements contained in the second group are chosen to obscure, at least in part, similarities between the functions performed by the first group and by the second group.

141. A method as in claim 138, in which the opaque computational function is calculated, at least in part, based on the value of an opaque variable.

142. A method of obfuscating a computer program or module, the computer program or module including programming statements written in a first language, the method including:
    performing an alteration on at least a portion of the computer program or module to form an altered computer program or module, the alteration being designed to render the altered computer program or module at least somewhat more resistant to reverse engineering or decompilation than the computer program or module, the alteration including:
        translating at least some of the programming statements from the first language to a second language;
        incorporating into the altered computer program or module at least one programming construct in the second language which lacks a direct correspondence with any programming construct in the first language.

143. A method as in claim 142, in which the first language comprises a source language, and in which the second language comprises an object language.

144. A method as in claim 143, in which the source language comprises Java, and the object language comprises Java bytecode.

145. A method as in claim 144, in which the programming construct in the second language consists, at least in part, of a goto instruction.

146. A method as in claim 142, in which a control flow graph associated with the computer program or module is reducible, and in which a control flow graph associated with the altered computer program or module is irreducible.

147. A process for obfuscating a computer program or module, the computer program or module including at least one call to a method in a first library class, the process including:
    creating a second library class, the second library class containing a second set of one or more methods designed to perform one or more of the same operations as a first set of one or more methods contained in the first library class, wherein the second library class is designed to obscure, at least in part, similarity to the first library class; and
    replacing in the computer program or module at least one call to a method in the first library class with a call to a method in the second library class;
    whereby the computer program or module is rendered least somewhat more resistant to reverse engineering or decompilation.

148. A process as in claim 147, in which the second library class comprises a standard library class.

149. A process as in claim 148, in which:
    the second library class comprises a standard Java library class; and
    the computer program or module is written in Java.

150. A method of obfuscating a computer program or module, the method including:
    reviewing the computer program or module to identify at least one programming idiom; and
    replacing at least one occurrence of the programming idiom with one or more alternative programming constructs designed to render the computer program or module more difficult to reverse engineer or decompile.

151. A method as in claim 150, in which the at least one programming idiom includes a linked list.

152. A method as in claim 151, in which at least one of the alternative programming constructs comprises an array of elements.

153. A method of obfuscating a computer program or module, the computer program or module including a call to a particular procedure, the particular procedure being one of a group of procedures, the method including:
    performing an alteration on at least a portion of the computer program or module, the alteration being designed to render the computer program or module at least somewhat more resistant to reverse engineering or decompilation, the alteration including:
        replacing a call to the particular procedure with the group of procedures itself, each procedure in the group of procedures being located at a different address; and
        incorporating a programming construct designed to jump to the address of the particular procedure.

154. A method as in claim 153, in which the programming construct includes an opaque computational function.

155. A method of obfuscating a computer program or module, the computer program or module including a first procedure and a second procedure, the method including:
    performing an alteration on at least a portion of the computer program or module, the alteration being designed to render the computer program or module at least somewhat more resistant to reverse engineering or decompilation, the alteration including:
        generating a third procedure, the third procedure including:

at least a portion of the first procedure;
at least a portion of the second procedure;
a parameter list for the first procedure;
a parameter list for the second procedure; and
a programming construct designed to allow a call to the third procedure to specify execution of the first procedure or the second procedure;

replacing at least one call to the first procedure with a call to the third procedure, the call to the third procedure including information used by the programming construct to cause the third procedure to execute at least a portion of the first procedure.

156. A method as in claim 155, in which:
the computer program or module is written in Java, and the first and second procedures comprise Java methods.

157. A method as in claim 155, in which the programming construct includes an opaque variable.

158. A method as in claim 155, in which the programming construct includes an opaque predicate.

159. A method of obfuscating a computer program or module, the computer program or module including a loop, the loop including a body containing at least a first programming statement and a second programming statement, the method including:

performing an alteration on at least a portion of the computer program or module, the alteration being designed to render the computer program or module at least somewhat more resistant to reverse engineering or decompilation, the alteration including:
unrolling tho loop to form an unrolled loop, the unrolling including replicating the body of the loop one or more times;
splitting the unrolled loop into at least a first programming sequence and a second programming sequence, the first programming sequence including the first programming statement; and
the second programming sequence including the second programming statement;
whereby the first programming statement and the second programming statement are performed an equivalent number of times as in the unrolled loop.

160. A method of obfuscating a computer program or computer program module, the computer program or module including at least a first class, the method including:

performing an alteration on at least a portion of the computer program or module, the alteration being designed to render the computer program or module at least somewhat more resistant to reverse engineering or decompilation, the alteration including:
generating a second class and a third class, the third class inheriting directly from the second class, and the second class and the third class being designed to replace the first class;
incorporating the second class and the third class into the computer program or module; and
removing the first class from the computer program or module.

161. A method of deobfuscating an obfuscated computer program or computer program module, the method including:

loading the obfuscated computer program or module into a memory unit;
identifying one or more opaque programming constructs included in the obfuscated computer program or module, wherein identifying the one or more opaque programming constructs includes at least one of:

(a) performing pattern matching on the obfuscated computer program or module, wherein the pattern matching includes comparing one or more known opaque programming constructs to one or more programming constructs contained in the obfuscated computer program or module;
(b) performing program slicing on the obfuscated computer program or module; and/or
(c) performing statistical analysis on the computer program or module, wherein the statistical analysis includes (i) analyzing runtime characteristics of one or more predicates contained in the computer program or module, and (ii) determining that at least one predicate evaluates to a given value at least a predefined percentage of the time the computer program or module is run;

evaluating the one or more opaque programming constructs; and
producing a deobfuscated computer program or module by replacing at least one of the one or more opaque programming constructs with equivalent, non-opaque programming constructs;
whereby the deobfuscated computer program or module is rendered easier to understand, reverse engineer, or decompile than the obfuscated computer program or module.

162. A method of deobfuscating an obfuscated computer program or computer program module, the method including:

loading the obfuscated computer program or module into a memory unit;
determining that an obfuscation transformation has been applied to the obfuscated computer program or module;
selecting one or more deobfuscation transformations to apply to the obfuscated computer program or module, the one or more deobfuscation transformations being operable to counteract at least some effects of the obfuscation transformation; and
applying the one or more deobfuscation transformations to the obfuscated computer program or module, whereby the obfuscated computer program or module is rendered more amenable to reverse engineering, decompilation, or attack.

163. A method as in claim 162, further including:
performing a preprocessing pass on the obfuscated computer program or module, the preprocessing pass serving to collect information about the obfuscated computer program or module;
using the information gathered in the preprocessing pass in selecting the one or more deobfuscation transformation to apply to the computer code.

164. A method as in claim 163, in which performing the preprocessing pass includes performing data flow analysis on the obfuscated computer program or module.

165. A method as in claim 163, in which performing the preprocessing pass includes performing an aliasing analysis on the obfuscated computer program or module.

166. A method as in claim 163, in which performing the preprocessing pass includes performing one or more of the following:
building an inheritance tree;
building a symbol table;
constructing at least one control flow graph;
and performing theorem proving.

167. A method as in claim 162, in which determining that an obfuscation transformation has been applied to the obfuscated computer program or module includes at least one of:

(a) performing pattern matching on the obfuscated computer program or module, wherein the pattern matching includes comparing one or more known opaque programming constructs to one or more programming constructs contained in the obfuscated computer program or module;

(b) performing program slicing on the obfuscated computer program or module; and (c) performing statistical analysis on the computer program or module, wherein the statistical analysis includes (i) analyzing runtime characteristics of one or more predicates contained in the computer program or module, and (ii) determining that at least one predicate evaluates to a given value at least a predefined percentage of the time the computer program or module is run.

168. A method as in claim 162, in which the deobfuscation transformation includes:

evaluating one or more opaque programming constructs contained in the computer program or module; and replacing the one or more opaque programming constructs with equivalent, non-opaque programming constructs.

169. A method of obfuscating a computer program or computer program module, the computer program or module being designed to carry out one or more specified tasks, the method including:

performing an alteration on at least a portion of the computer program or module, the alteration being designed to render the computer program or module at least somewhat more resistant to reverse engineering or decompilation, the alteration including:

inserting one or more unnecessary program statements into the computer program or module, the one or more unnecessary program statements carrying out no function which contributes to the one or more specified tasks;

and wherein the unnecessary program statements are designed to render program slicing at least somewhat more difficult or expensive to employ.

170. A method as in claim 169, in which the unnecessary program statements introduce one or more parameter aliases.

171. A method as in claim 169, in which the unnecessary program statements introduce one or more variable dependencies.

\* \* \* \* \*

UNITED STATES PATENT AND TRADEMARK OFFICE
CERTIFICATE OF CORRECTION

PATENT NO.    : 6,668,325 B1                                        Page 1 of 1
DATED         : December 23, 2003
INVENTOR(S)   : Christian Sven Collberg et al.

It is certified that error appears in the above-identified patent and that said Letters Patent is hereby corrected as shown below:

Title page,
Item [73], Assignee, "InterTrust Technologies" should read -- InterTrust Technologies Corporation --.
Item [57], ABSTRACT,
Line 12, "can be creating" should read -- can be created --.

Column 39,
Line 38, "the transformation" should read -- at least one transformation --.

Column 47,
Line 23, "first-instance" should read -- first instance --.

Column 51,
Line 56, "depend s" should read -- depends --.
Line 57, "f unction" should read -- function --.

Column 55,
Line 30, "tho loop" should read -- the loop --.

Column 56,
Lines 50-51, "one or more deobfuscation transformation" should read -- one or more deobfuscation transformations --.

Signed and Sealed this

Twenty-third Day of March, 2004

JON W. DUDAS
*Acting Director of the United States Patent and Trademark Office*